(12) United States Patent
Sorimoto

(10) Patent No.: US 10,753,441 B2
(45) Date of Patent: Aug. 25, 2020

(54) MOTION TRANSMITTING DEVICE, MOLD ASSEMBLY AND MACHINES

(71) Applicant: TECHNOCRATS CORPORATION, Hiroshima-shi, Hiroshima (JP)

(72) Inventor: Masanori Sorimoto, Hiroshima (JP)

(73) Assignee: TECHNOCRATS CORPORATION, Hiroshima (JP)

( * ) Notice: Subject to any disclaimer, the term of this patent is extended or adjusted under 35 U.S.C. 154(b) by 84 days.

(21) Appl. No.: 15/374,279

(22) Filed: Dec. 9, 2016

(65) Prior Publication Data

US 2017/0284521 A1 Oct. 5, 2017

(30) Foreign Application Priority Data

Mar. 29, 2016 (JP) ................. 2016-065928

(51) Int. Cl.
| | | |
|---|---|---|
| *F16H 25/18* | (2006.01) | |
| *B29C 45/33* | (2006.01) | |
| *B29C 45/44* | (2006.01) | |
| *B29C 33/44* | (2006.01) | |

(52) U.S. Cl.
CPC ......... *F16H 25/183* (2013.01); *B29C 33/442* (2013.01); *B29C 45/332* (2013.01); *B29C 45/44* (2013.01); *B29C 2045/445* (2013.01)

(58) Field of Classification Search
CPC ....... B29C 33/44; B29C 33/442; B29C 33/20; B29C 45/332; B29C 45/44; B29C 45/4435; B29C 2045/445; B29C 45/4471; B29C 33/485; B29C 33/48; F16H 21/04; F16H 21/10; F16H 25/183; F16H 21/44; B22D 17/2236; B22D 17/24

USPC .......... 249/74, 180; 425/190, 438, 441, 443, 425/444, 556, 577
See application file for complete search history.

(56) References Cited

U.S. PATENT DOCUMENTS 3,183,552 A * 5/1965 Farkas .................. B29C 33/442
425/163
5,018,399 A 5/1991 Sawatzki et al.
6,066,912 A 5/2000 Fitzner et al.
6,470,762 B1 10/2002 Burkart
(Continued)

FOREIGN PATENT DOCUMENTS

CN 201191382 Y 2/2009
CN 201496729 U 6/2010
(Continued)

OTHER PUBLICATIONS

English Translation of JP2010-214898 (Year: 2010).*
(Continued)

*Primary Examiner* — Bobby Rushing, Jr.

(57) ABSTRACT

A motion transmitting device comprising: a slider movable along a slider guide; and a connecting body movable along a connecting body guide, wherein the slider and the connecting body are disposed in contact with each other, each of the slider and the connecting body has a contact surface that is slidable, and the amount of displacement and/or the speed of displacement of an output end relative to an input end can be reduced or can be made equal to each other or increased through setting of the angle of a center axis line of the slider guide about a center axis line of the connecting body guide and/or the inclination angle of the contact surface.

11 Claims, 28 Drawing Sheets

(56) References Cited

U.S. PATENT DOCUMENTS

| | | | |
|---|---|---|---|
| 8,141,451 | B2 | 3/2012 | Tsubakino et al. |
| 8,606,394 | B2 | 12/2013 | Okahisa et al. |
| 8,926,316 | B2 * | 1/2015 | Sorimoto ............ B29C 45/4471 |
| | | | 425/556 |
| 9,447,854 | B2 | 9/2016 | Kim |
| 2009/0241716 | A1 | 10/2009 | Tsubakino et al. |
| 2010/0298974 | A1 | 11/2010 | Okahisa et al. |
| 2013/0152713 | A1 | 6/2013 | Kim |
| 2016/0369938 | A1 | 12/2016 | Satou |

FOREIGN PATENT DOCUMENTS

| | | | | |
|---|---|---|---|---|
| CN | 103080604 | A | | 5/2013 |
| DE | 3925226 | A1 | | 2/1990 |
| DE | 102011006323 | A1 | * 10/2012 | ........... F16H 25/183 |
| DE | 102011006323 | A1 | | 10/2012 |
| JP | 3-72412 | | | 7/1991 |
| JP | 4-341644 | | | 11/1992 |
| JP | 2005-138342 | | | 6/2005 |
| JP | 2008-307546 | | | 12/2008 |
| JP | 2009-190117 | | | 8/2009 |
| JP | 2009-243627 | | | 10/2009 |
| JP | 2010214898 | A | * | 9/2010 |
| JP | 2010-269380 | | | 12/2010 |
| JP | 2012-51003 | A | | 3/2012 |
| JP | 2014-189242 | | | 10/2014 |
| JP | 2014-226806 | | | 12/2014 |
| KR | 10-2016-0015329 | | | 2/2016 |

OTHER PUBLICATIONS

Office Action dated Jan. 9, 2018 in corresponding Korean Patent Application No. 10-2016-0170460, 17 pgs.
Extended European Search Report dated Sep. 8, 2017 in corresponding European Patent Application No. 16203627.1.
Office Action dated Jul. 2, 2018 in corresponding Korean Patent Application No. 10-2016-0170460, 14 pgs.
Chinese Office Action dated Sep. 26, 2018 in corresponding Chinese Patent Application No. 201611158975.2.
Office Action dated Apr. 9, 2019 in related Chinese Application No. 201611158975.2 with partial English translation (12 pages).
"Practice for Machine Parts Cutting," Beijing Institute of Technology Press, Aug. 31, 2011, p. 115 with partial English translation summary (5 pages).
Japanese Office Action dated Dec. 26, 2019 in corresponding Japanese Patent Application No. 2016-065928.

* cited by examiner

Fig. 4A
Fig. 4B
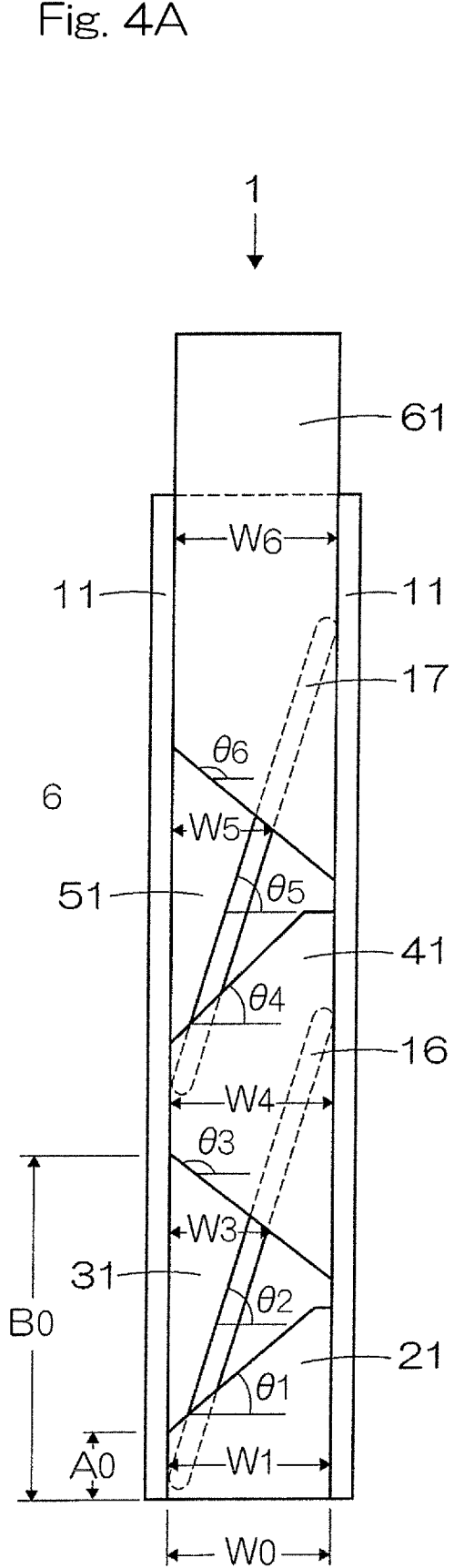
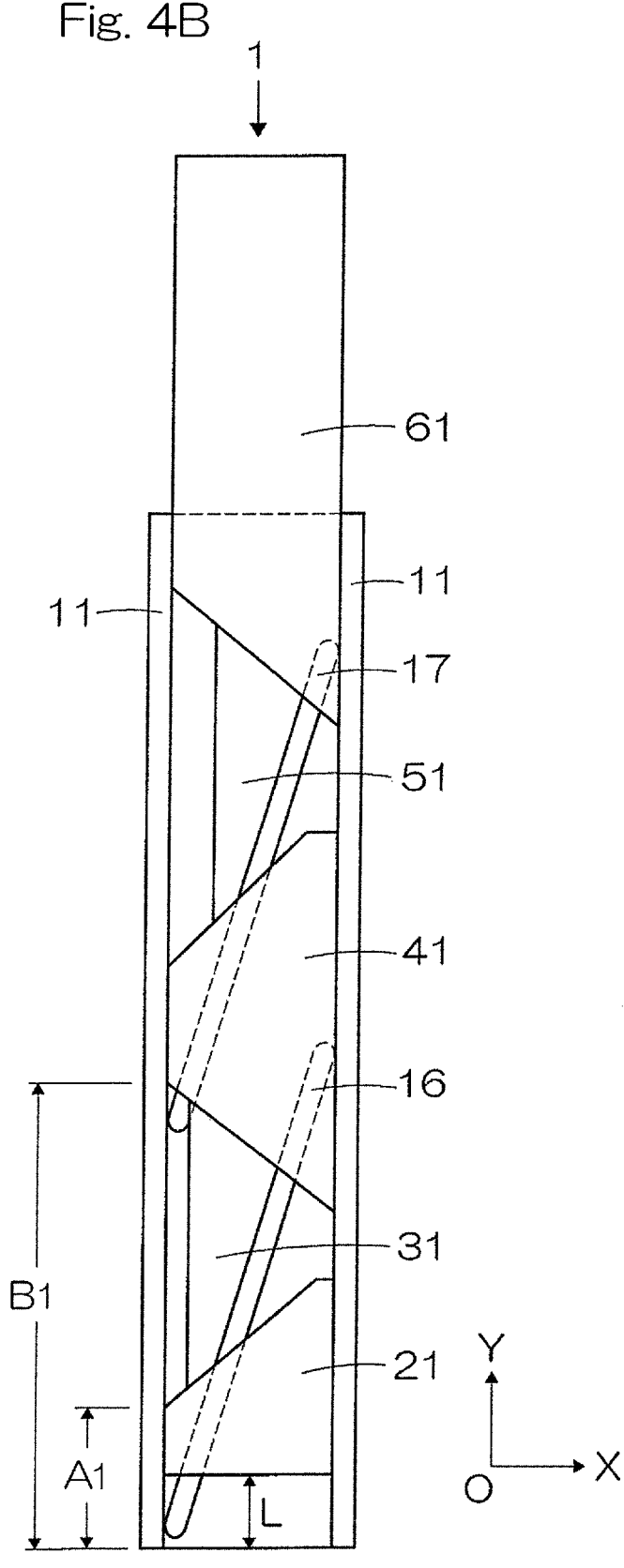

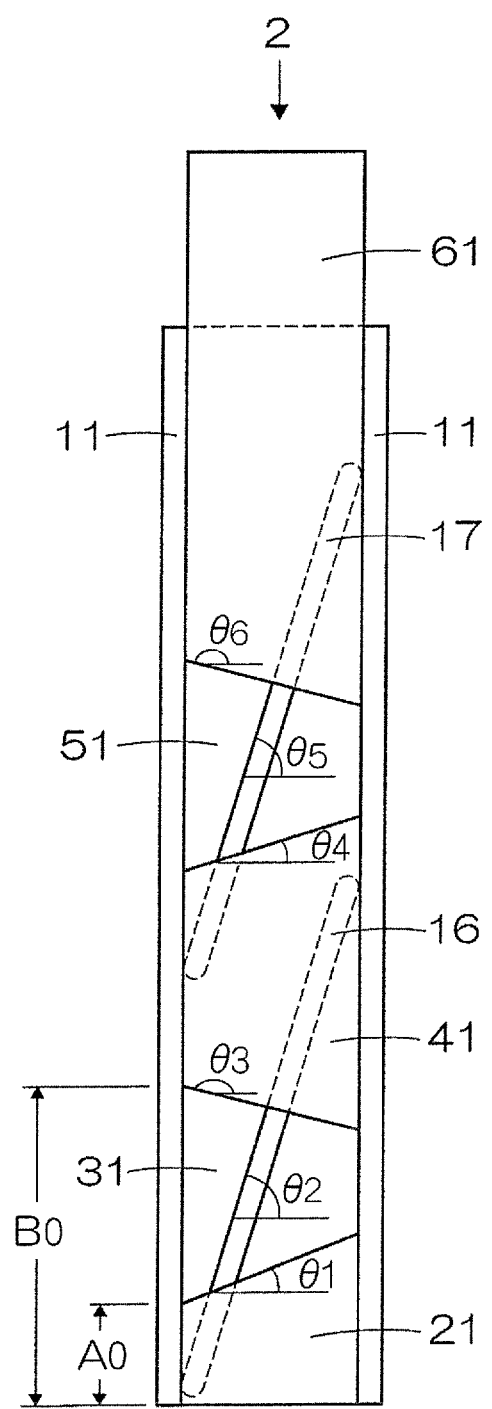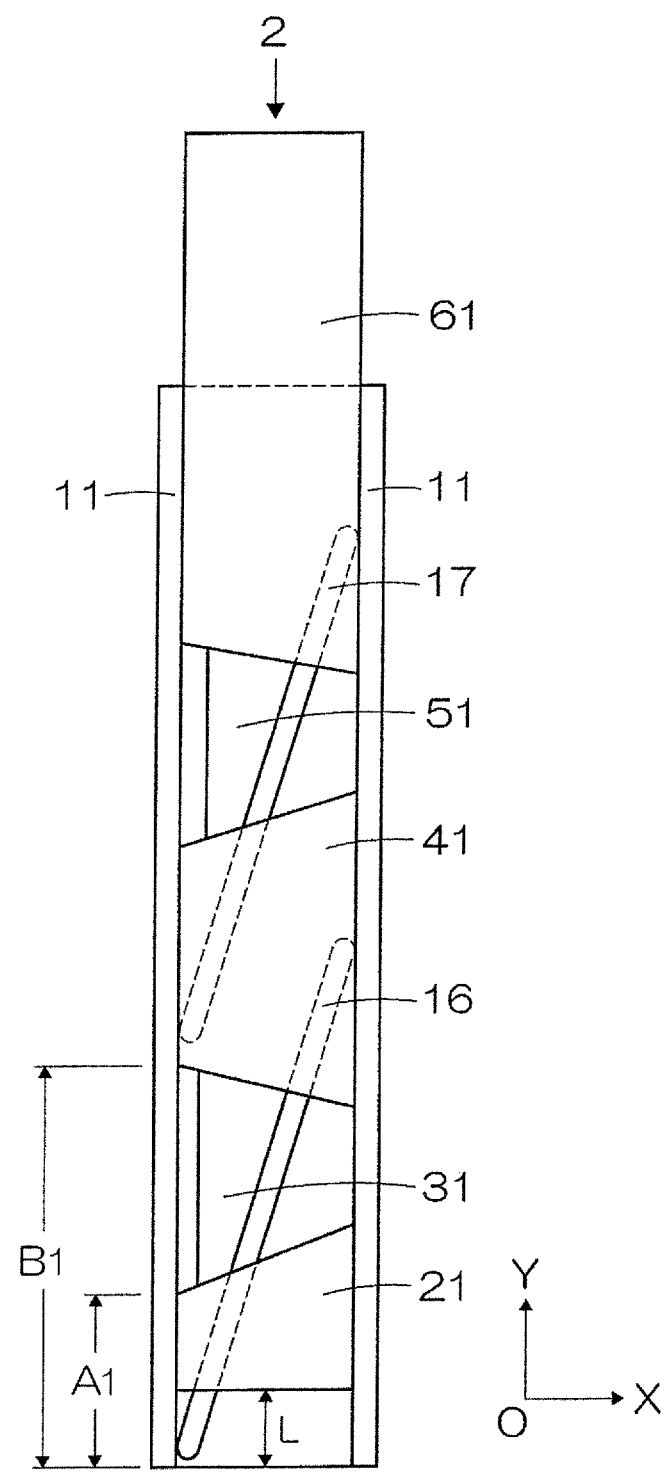

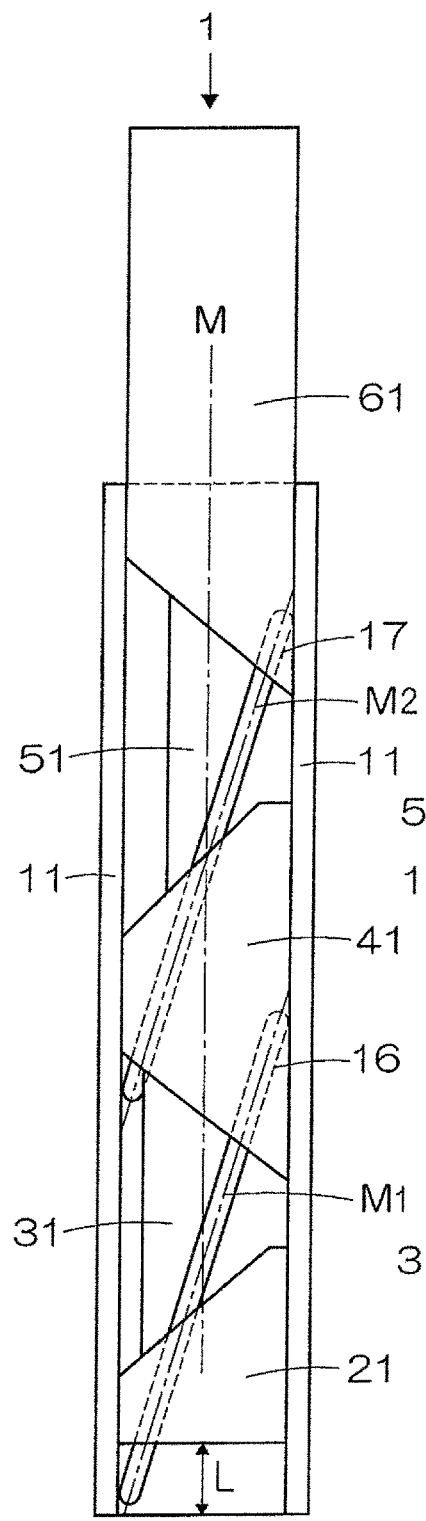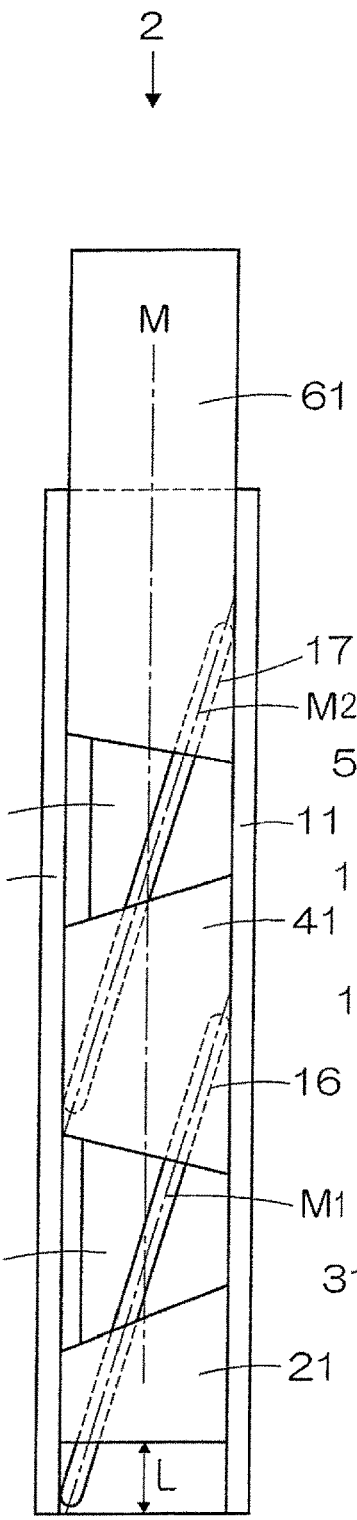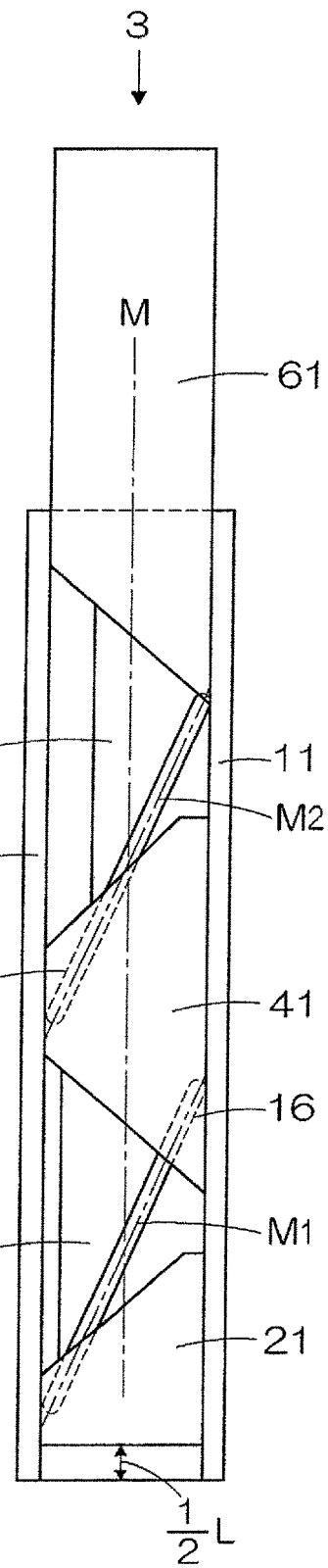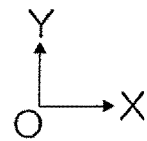
Fig. 7A Fig. 7B Fig. 7C

Fig. 12A
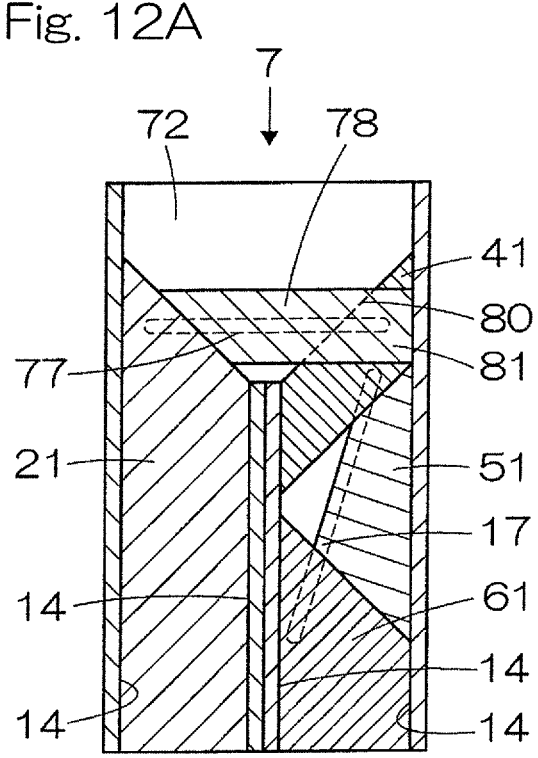
Fig. 12B
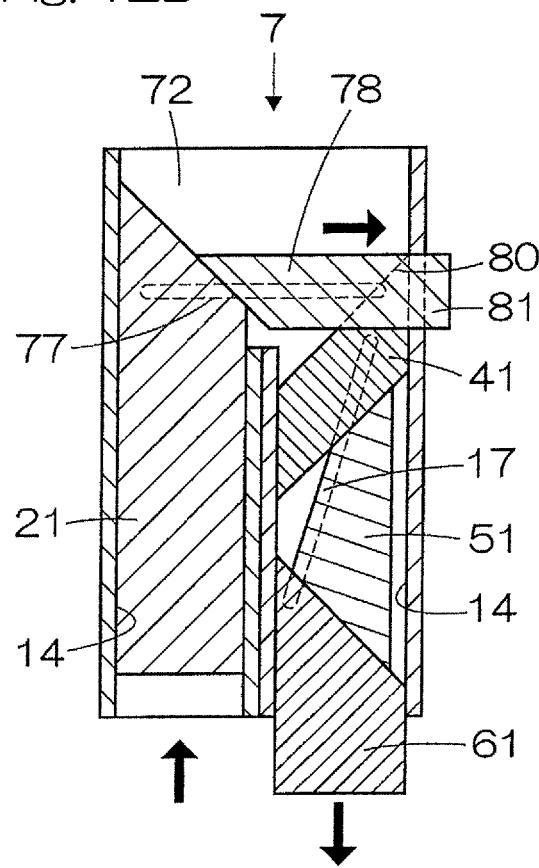
Fig. 12C
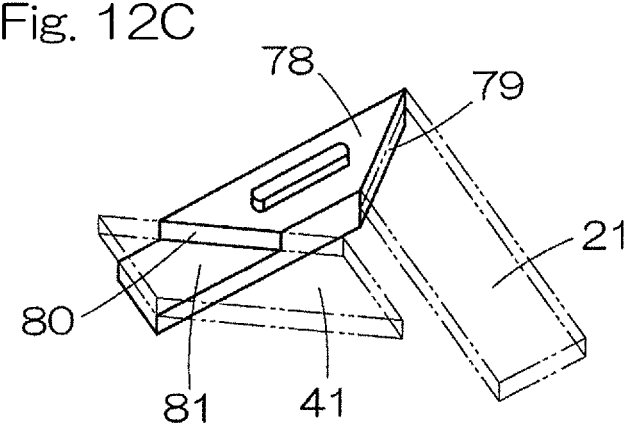
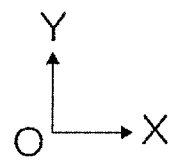

Fig. 13A
Fig. 13B
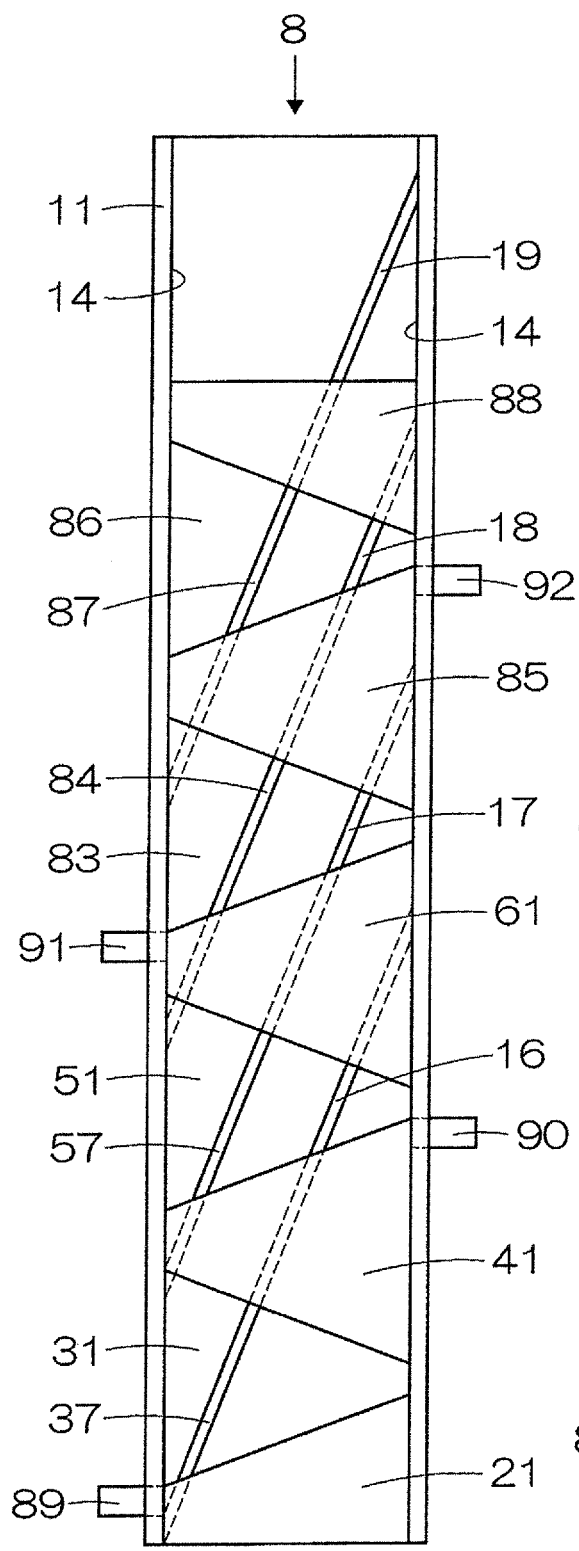
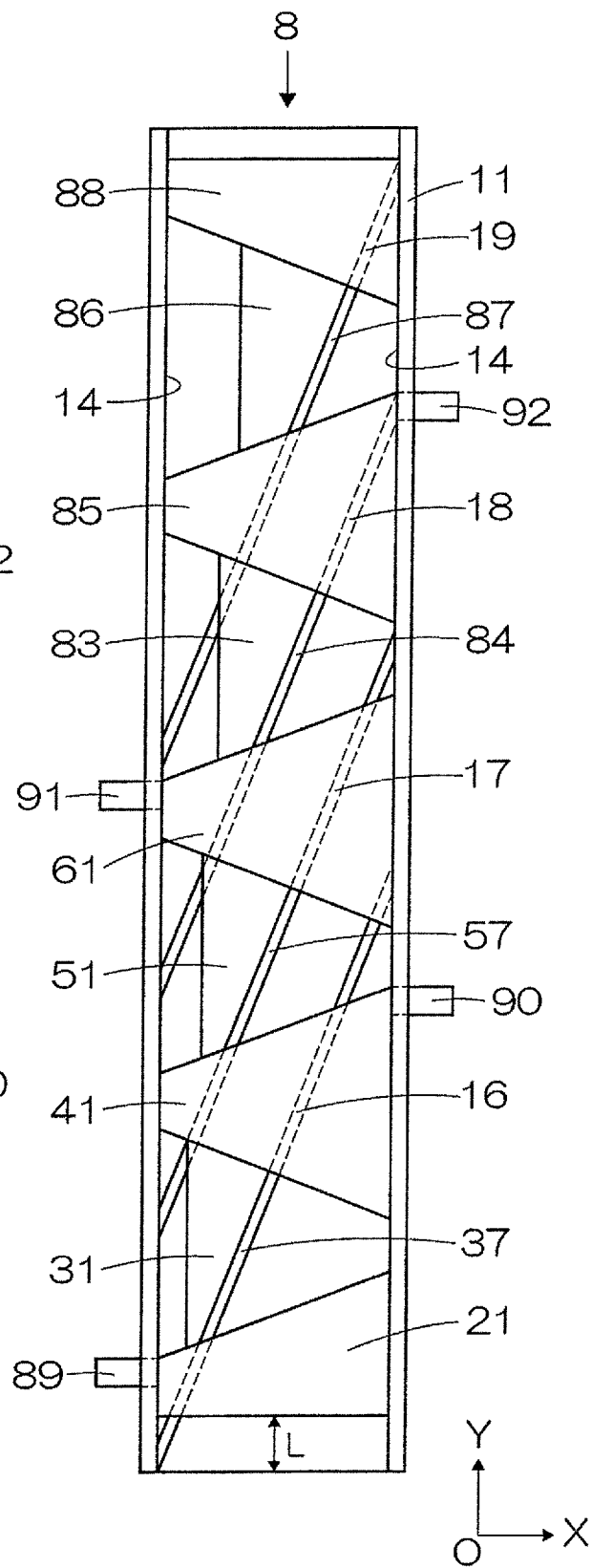

MOTION TRANSMITTING DEVICE, MOLD ASSEMBLY AND MACHINES

CROSS REFERENCE TO THE RELATED APPLICATION

This application is based on and claims Convention priority to Japanese patent application No. 2016-065928, filed Mar. 29, 2016, the entire disclosure of which is herein incorporated by reference as a part of this application.

BACKGROUND OF THE INVENTION

Field of the Invention

The present invention relates to a motion transmitting device that can be utilized in the form of an equipment incorporated in automotive vehicles, machine tools, transport devices, robots or the like, and also to mold assemblies and various kinds of machines utilizing such motion transmitting device.

Description of Related Art

As is well known to those skilled in the art, an actuator and a motion transmitting device (power transmitting device) have been developed in various forms and are utilized in forms of an equipment incorporated in an automotive vehicle, a machine tool, a transport device or the like. The motion transmitting mechanism makes use of a gear train, a cam mechanism, a link mechanism or a friction gearing. With respect to the input and output of the motion transmitting mechanism, as well as a device of a type in which input end and output end displace at equal speeds or displace an equal quantity relative to each other, various speed increasers and speed reducers capable of increasing or decreasing the speed of the output end relative to the input end have also been developed and made available in the related art.

For example, in the field of vehicles such as automotive vehicles, a suspension device equipped with a parallel link mechanism has been proposed as a sort of suspension device having an increased degree of freedom of a variable geometric control. In the parallel link mechanism, a member on a vehicle body side and a member on a vehicle wheel side are connected with each other through a plurality of linear actuators (For example, see Patent Document 1: JP Laid-open Patent Publication No. 2014-189242).

With respect to the motion transmitting device to be used in the form of an equipment in the automotive vehicle, the transport device, the robot or the like, various requirements have been made depending on the application thereof. Specifically, there is a strong demand for downsizing and weight reduction of the motion transmitting device, and various devices have been developed so as to satisfy these requirements. For example, a variable speed drive device which requires a minimized space for a pivotal motion of a shift arm, (such as disclosed in, for example, patent document 2: JP Laid-open Patent Publication No. 2009-243627) and a transport robot and a goods transport system, both of which can be downsized while maintaining their functions (such as disclosed in patent document 3: JP Laid-open Patent Publication No. 2010-269380) have been proposed in the art.

In the field of robots, in order to achieve downsizing and weight reduction of robotic arms, for example, patent document 4: JP Laid-open Patent Publication No. 2009-190117 has proposed a robotic arm that has an extension direction consistent with the direction of linear motion of the linear actuator, and that employs a motion transmitting mechanism where the rotation axis of the joint, rotation of which functions as the output, is perpendicular to the direction of linier motion of the linier actuator.

DISCLOSURE OF THE INVENTION

Although the downsized and weight saved motion transmitting devices have been proposed as discussed above, it is expected that the demand for further downsizing and weight reduction will be intensified in the near future. On the other hand, it is not easy to achieve downsizing and weight saving of a motion transmitting device, since the motion transmitting device is constituted of numerous component parts, as it is apparent, for example, in a speed reducer. In particular, the larger the deviation between the input end and the output end is, for example, due to driving the input end and the output end with different speeds, or due to making the input end and the output end have different direction, structure of the motion transmission mechanism is more complicated, making it difficult to reduce size and weight of the motion transmission mechanism.

In view of the foregoing, the present invention has been devised to provide a motion transmitting device of a kind in which downsizing and weight reduction can be easily accomplished with a construction, and also to provide a mold assembly and machines both utilizing such motion transmitting mechanism.

A motion transmitting device according to an aspect of the present invention is a motion transmitting device which includes at least one slider movable along a slider guide; at least one connecting body movable along a connecting body guide, where the slider and the connecting body are disposed in contact with each other, and contact surfaces of the slider and the connecting body are slidable with each other. An amount of displacement and/or a speed of displacement of an output end relative to an input end of the motion transmitting device can be reduced or can be made equal to each other or can be increased through setting of the angle of a center axis line of the slider guide about a center axis line of the connecting body guide and/or an inclination angle of the contact surfaces.

The above-described motion transmitting device may be constructed of one slider and one connecting body and downsizing and weight reduction can be accomplished easily. The motion transmitting device can be used as a speed reducing machine or a speed increasing machine since the amount of displacement and/or the speed of displacement of the output end relative to the input end can be varied by changing the inclination angle of the guide for guiding the movement of the connecting body and/or the inclination angle of the contact surfaces of the slider and the connecting body.

In the motion transmitting device referred to above, the number of the slider may be equal to or greater than n+1 (n being an integer equal to or greater than 1) and the number of the connecting body may be equal to or greater than n (n being an integer equal to or greater than 1), and the slider and the connecting body may be alternately disposed in contact with each other such that contact surfaces of adjacent slider and connecting body are slidable with each other. In this case, when the slider at one end portion is rendered to be an input end and an slider at the opposite end portion is rendered to be an output end, the amount of displacement and/or the speed of displacement of an output end relative to an input end can be reduced or can be made equal to each other or increased through setting of the angle of a center axis line of the slider guide about a center axis line of the connecting body guide and/or the inclination angle of the contact surface.

If the above-described motion transmitting device is used, the speed reducing machine or the speed increasing machine can be created with, for example, two sliders, which serves as the input end and the output end, and a connecting body disposed sandwiched between those two sliders. Thus, the motion transmitting device has a simple device structure and, therefore, downsizing and weight reduction are easy to achieve. Also, the motion transmitting device can take one of the various forms depending on the purpose of use since the amount of displacement and the amount of displacement of the output end relative to the input end can be varied by changing the inclination angle of the guide for guiding the movement of the connecting body and the inclination angle of the contact surface between the slider and the connecting body.

In the above-described motion transmitting device, the center axis line of the slider guide and/or the center axis line of the connecting body guide may have a straight shape, a curved shape or a shape having a combination of a straight line and/or a curved line.

According to the foregoing structural feature, the slider guide and/or the connecting body guide may have a linear shape, but also a curved shape and, therefore, the motion transmitting device may have one of various shapes. Thereby, downsizing and weight reduction become easy to achieve and incorporation of the motion transmitting device into a machine or device such as, for example, a robot can be accomplished easily.

In the motion transmitting device, at least one of the respective contact surfaces of the slider and the connecting body may be a slantwise surface, where the slantwise surface intersects with the center axis line of the slider guide.

According to the foregoing structural feature, it is acceptable that at least one of the contact surfaces of the slider and the connecting body is a slantwise surface. Therefore, for example, the slider may have a rod-like shape and may be held in point contact with the inclined surface of the connecting body. Thus, since the above-described motion transmitting device has high degree of freedom in selection of shapes, downsizing and weight reduction become easy to achieve and incorporation into the machine such as, for example, a robot and the device can become easy to achieve.

In the above-described motion transmitting device, the slider and/or the connecting body may have a block-like shape or a flat plate shape or a rod-like shape.

According to the foregoing structural feature, shapes of the slider and the connecting body may not be necessarily limited to specific shapes and, therefore, downsizing and weight reduction of the motion transmitting device can be easily accomplished and various forms can also be employed depending on the purpose of use, resulting in good handlability.

In the above-described motion transmitting device, the amount of displacement and/or the speed of displacement of the output end relative to the input end may be amplified or reduced by increasing the number of each of the slider and the connecting body.

The above-described motion transmitting device may have its basic structure constituted of the two sliders and the connecting body interposed therebetween. If the slider and the connecting body are further added, the amount of displacement and/or the speed of displacement of the output end relative to the input end can be amplified or reduced. Therefore, the amount of displacement and/or the speed of displacement of the output end relative to the input end can be set to an arbitrarily chosen ratio depending on the number of the sliders and the connecting bodies used in the motion transmitting device.

In the above-described motion transmitting device, the connecting body guide may include an angle changing mechanism by which the angle of the center axis line of the connecting body guide about the center axis line of the slider guide can be set arbitrarily.

According to the above described structural feature, angle of the connecting body guide can be set to an arbitrary value and, therefore, application of the motion transmitting device of the present invention becomes diversified. Also, since this motion transmitting device has a high degree of freedom in its form, downsizing and weight reduction become easy to achieve and incorporation of the device into the machine or device such as, for example, a robot is easily accomplished.

The above-described motion transmitting device may further include a direction converting connecting body for converting the direction of movement along the connecting body guide, where the direction converting connecting body brings about no effect to increase or decrease the amount of displacement and/or speed of displacement of the output end relative to the input end.

According to the above described structural feature, since the device includes the connecting body for direction conversion, the direction of the output end relative to the input end can be simply changed. Since the connecting body for direction conversion does not affect the increase or decrease of the amount of displacement and/or the speed of displacement of the output end relative to the input end, incorporation of this connecting body leads to achievement of the motion transmitting device of various shapes.

In the above-described motion transmitting device, an angle between the direction of movement of the output end and the direction of movement of the input end can be set to an arbitrary angle within the range of 0 to 180°, by setting disposition of the slider guide, disposition of the connecting body guide and the angle of the center axis line of the connecting body guide about the center axis line of the slider guide.

According to the foregoing structural feature, since the motion transmitting device can be set the angle between the direction of movement of the output end and the direction of movement of the input end to an arbitrary angle within the range of 0 to 180°, it is possible to set the direction of movement of the output end to any directions depending on arrangement of the motion transmitting device. Accordingly, the motion transmitting device may be easily incorporated into other device or machine such as a robot. Thus, the motion transmitting device can be used in the form of equipment in various devices.

In the above-described motion transmitting device, where the motion transmitting device includes plural number X of output ends (X being an integer equal to or greater than 2), said slider at the opposite end portion is rendered to be a first output end, and the other is rendered to be a second to X-th output end, the amount of displacement and/or the speed of displacement of the output end relative to the input end may differ for each output end.

According to the above-described structural feature, two or more output ends for one input end are provided and the amount of displacement and/or the speed of displacement of the output end relative to the input end varies for each output end and, also, setting can be accomplished to differentiate the direction of movement of each of the output end. Therefore, the motion transmitting device may be incorporated into any other device or machine such as, for example, robot.

The above-described motion transmitting device may also include a holder to accommodate the slider and the connecting body, where the slider guide to guide the slider and the connecting body guide to guide the connecting body may be provided within the holder, and the holder, the slider and the connecting body may be formed as one unit.

According to the foregoing structural feature, since the motion transmitting device is unitized, incorporation of the device into any other device or machine such as, for example, robot becomes easy, resulting in further improvement of handleability.

A mold assembly according to another aspect of the present invention is equipped with a quick returning device that returns an ejector plate, where the quick returning device is constituted by the motion transmitting device according to an aspect of the present invention referred to above.

In the above-described mold assembly, the motion transmitting device may be fitted as the quick returning device to a movable mold, where an ejector pin to eject the input end of the motion transmitting device is provided in the ejector plate and a return pin to eject the output end of the motion transmitting device is provided in a fixed mold, and the motion transmitting device referred to above has the amount of displacement of the output end that is greater than the amount of displacement of the input end.

In the above-described mold assembly, a recessed portion to accommodate a part of the motion transmitting device may be provided in the fixed mold, where a partial portion of the motion transmitting device is disposed so as to protrude from a parting surface of the movable mold, and the portion of the motion transmitting device that protrudes from the parting surface is accommodated within the recessed portion during a mold clamping.

As described above, the above-described motion transmitting device makes it possible to conveniently and compactly realize the increase of the amount of movement of the output end relative to the amount of movement of the input end. The mold assembly that is equipped with the above-described motion transmitting device as the quick returning device to return the ejector plate ensures quick returning of the ejector plate. In addition, the above-described constitution is desirable since the size of the mold assembly does not increase unnecessarily. If the motion transmitting device is unitized in advance, incorporation of the device into the mold assembly is easy to accomplish.

Machines according to another aspect of the present invention have a speed reducing machine or a speed increasing machine incorporated therein. In this case, the machine may be any one of a robot arm, a robot, a machine tool, a transport machine and an automotive vehicle, where the motion transmitting device according to an aspect of the present invention is used as the speed decreasing machine or the speed increasing machine.

According to the motion transmitting device according to an aspect of the present invention, it is easy to accomplish downsizing and weight reduction of the motion transmitting device. Thus, only a small space is required to incorporate the device into, for example, a robot or the like. Therefore, the motion transmitting device can be suitably used as a speed reducer or a speed increaser forming a part of the robot or the like.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

FIGS. 4A and 4B are diagrams used to explain the amount of displacement of the motion transmitting device 1 according to the first embodiment.

FIGS. 5A and 5B are diagrams used to explain relationship between the inclination angle and the amount of displacement of each of a slider and a connecting body both employed in the motion transmitting device 2 according to a first modification of the first embodiment.

FIGS. 7A, 7B, and 7C are comparative diagrams showing the respective amounts of displacement exhibited by the motion transmitting devices 1, 2 and 3 according to the first embodiment.

FIGS. 12A, 12B, and 12C are diagrams used to explain the operation of a motion transmitting device 7 according to a fifth embodiment of the present invention.

FIGS. 13A and 13B are structural diagrams of the motion transmitting device 8 according to a sixth embodiment of the present invention.

DESCRIPTION OF EMBODIMENTS

Figure 1:
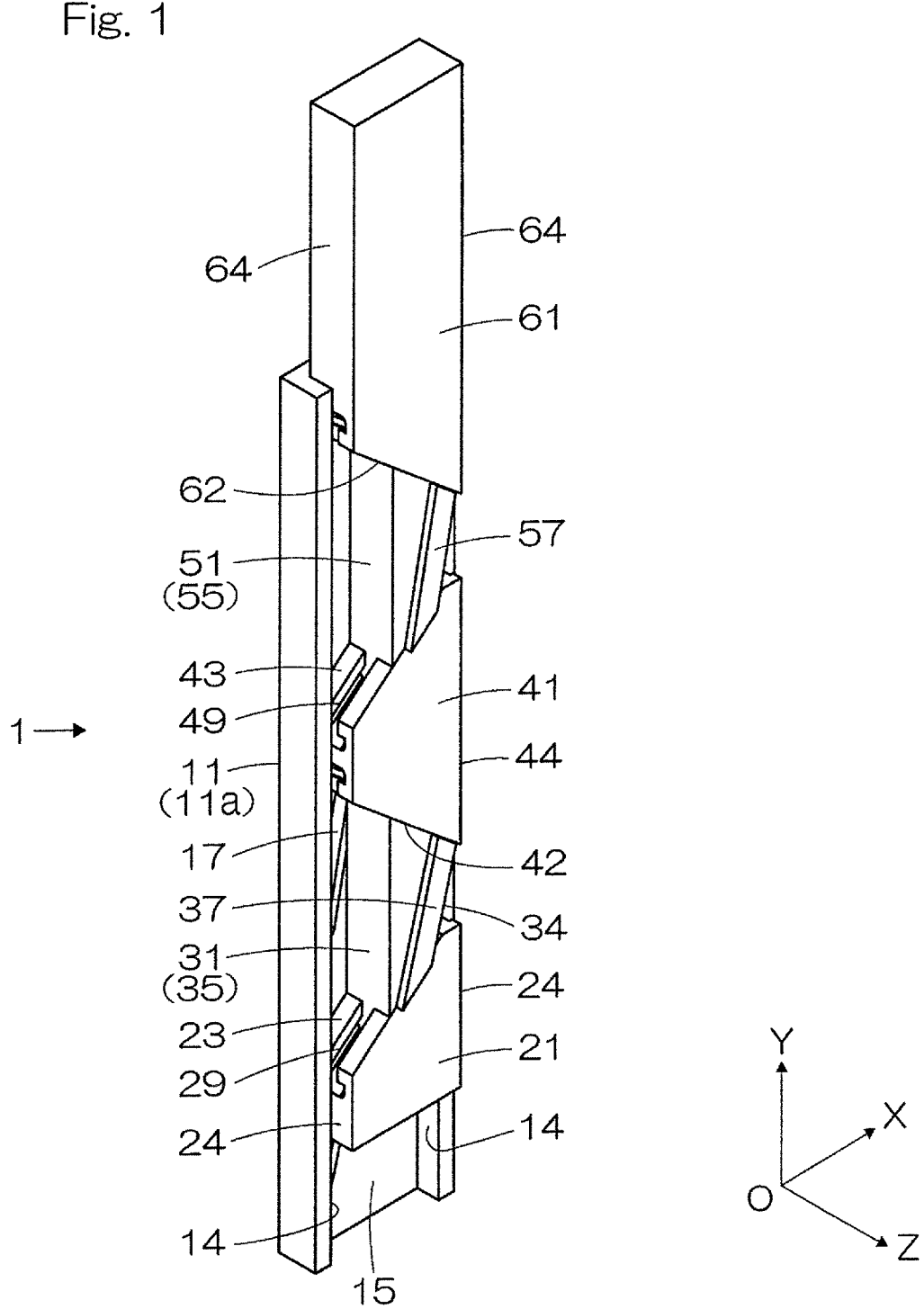
FIG. 1 is an overall view showing a structure of a motion transmitting device 1 according to a first embodiment of the present invention.
Figure 2:
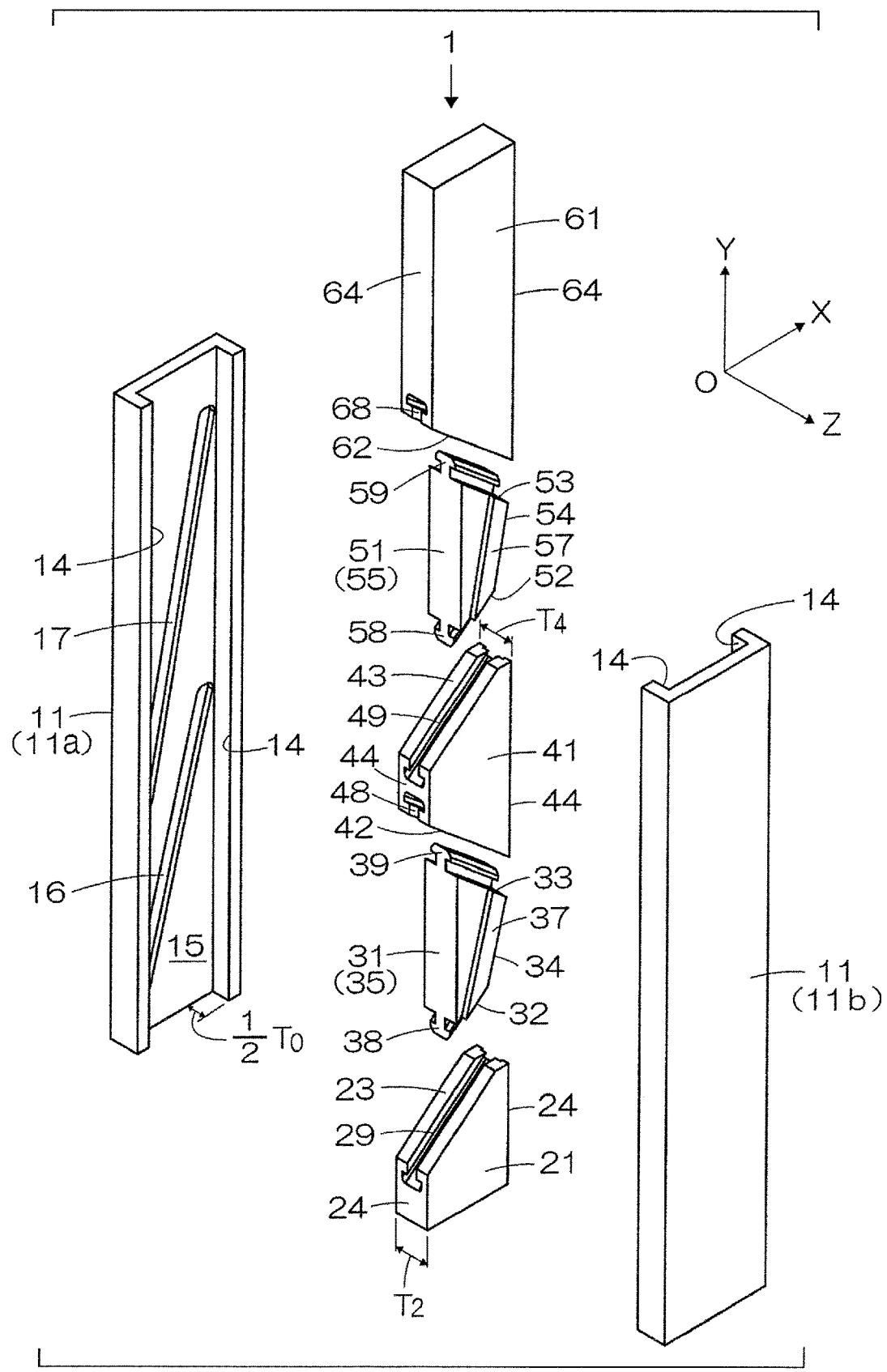
FIG. 2 is an exploded view showing the structure of the motion transmitting device 1 according to the first embodiment.
Figure 3A:
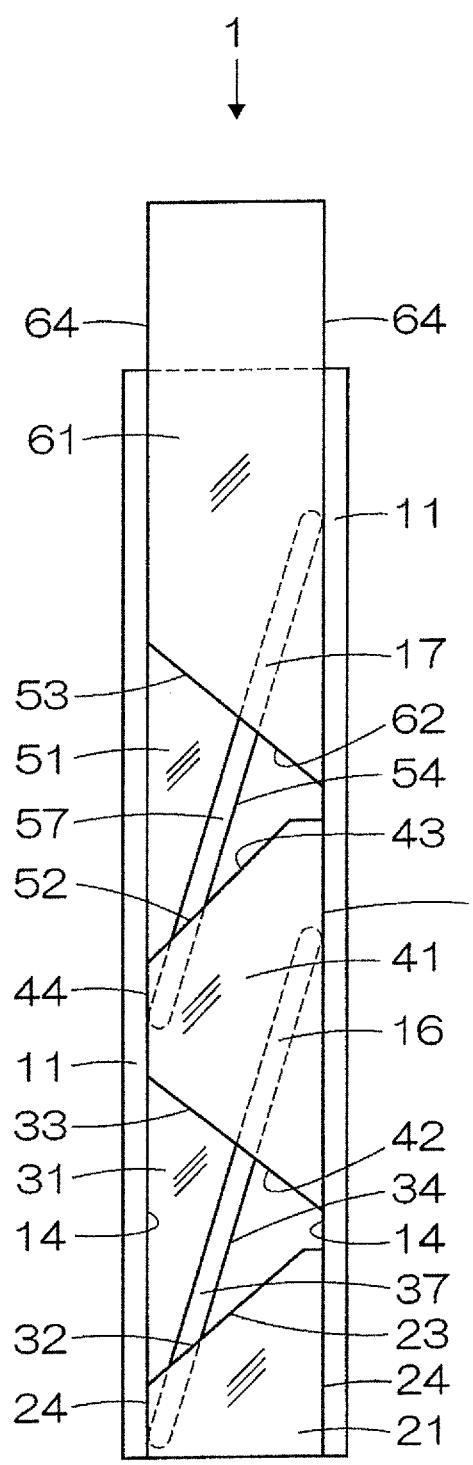
FIGS. 3A and 3B are diagrams used to explain the operation of the motion transmitting device 1 according to the first embodiment.
Figure 3B:
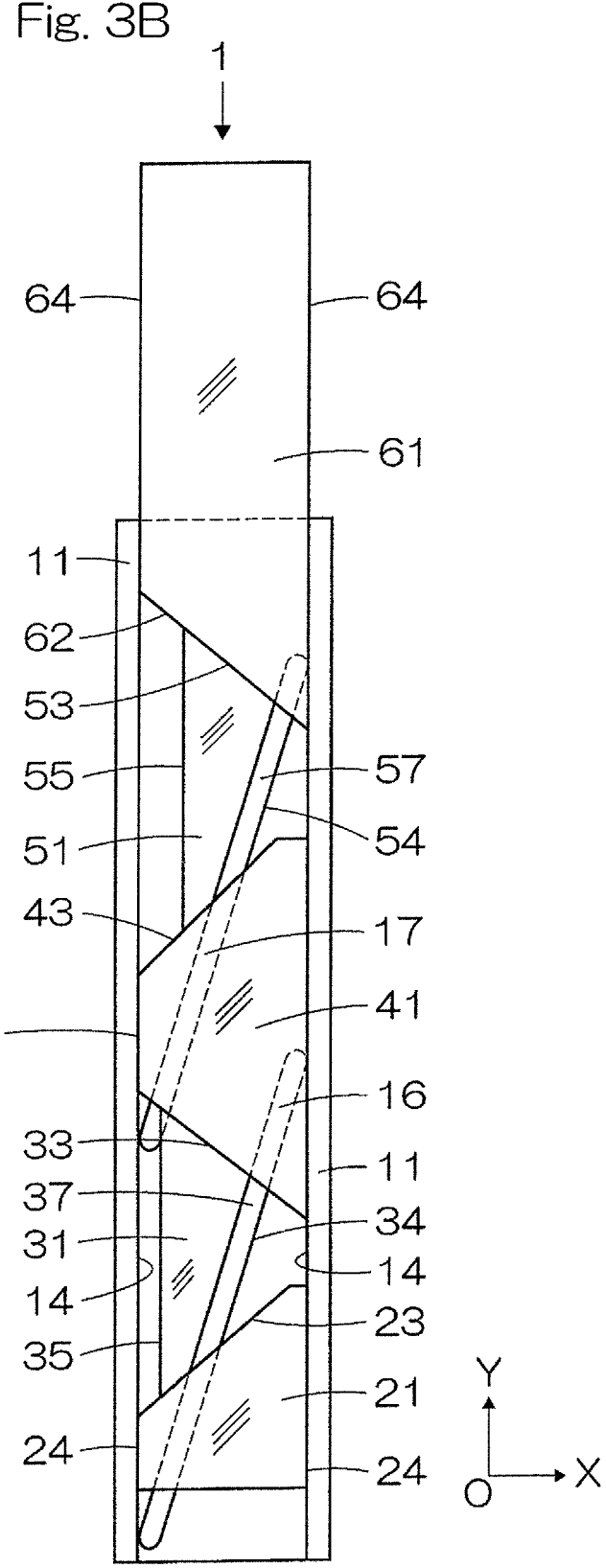
Figure 6A:
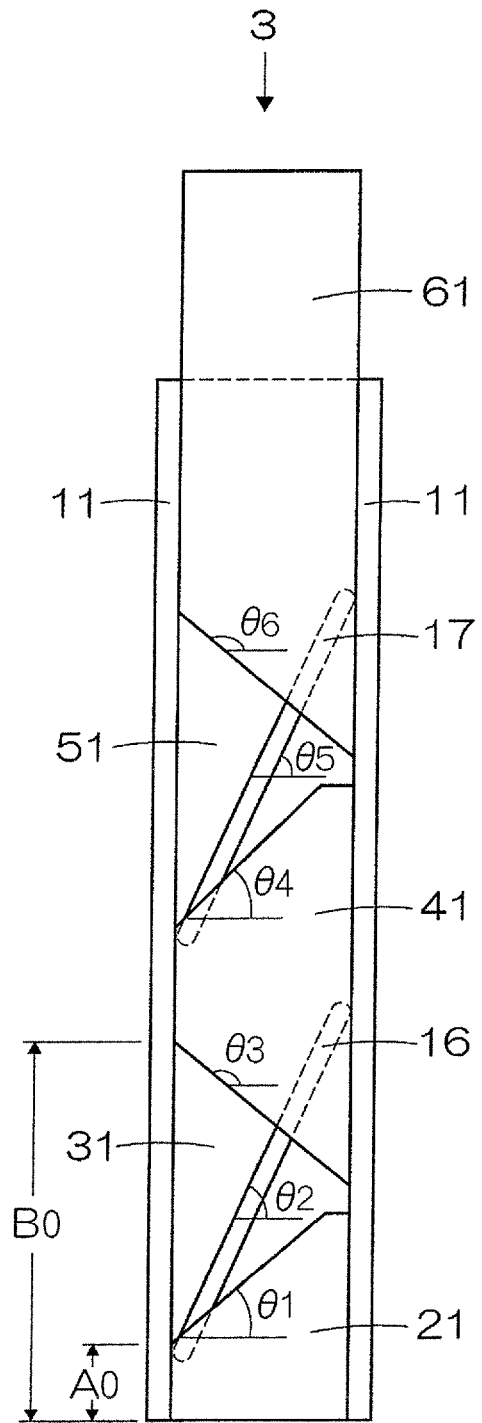
FIGS. 6A and 6B are diagrams used to explain the relationship between the inclination angle and the amount of displacement of each of slantwise grooves 16 and 17 employed in the motion transmitting device 3 according to a second modification of the first embodiment.
Figure 6B:
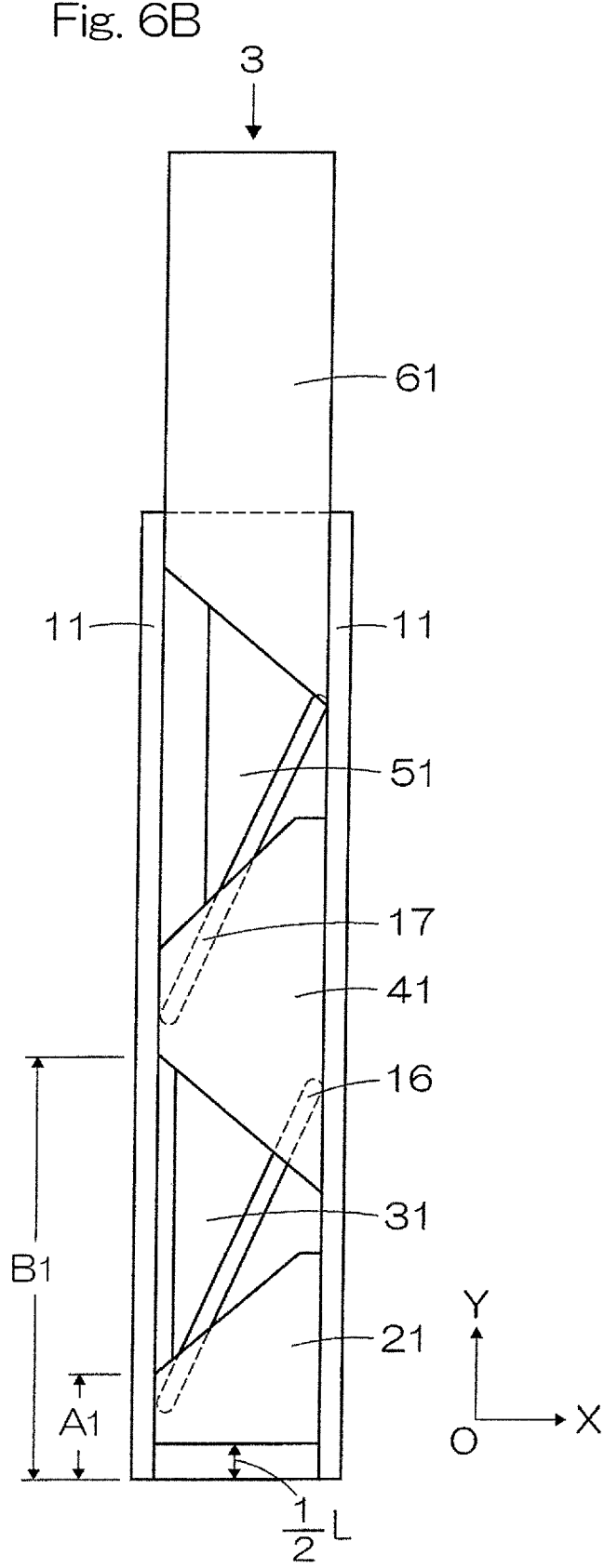

FIGS. 1 and 2 are an overall view and an exploded view, respectively, both showing the structure of a motion transmitting device 1 designed in accordance with a first embodiment of the present invention. FIGS. 3A and 3B are diagrams employed to explain the operation of the motion transmitting device 1 and consist of a front elevational view FIG. 3A showing a state before being projected and a front elevational view FIG. 3B showing a state after being projected. FIGS. 4A and 4B are diagrams employed to explain the amount of displacement of the motion transmitting device 1 and consists of a front elevational view FIG. 4A showing a state before being projected and a front elevational view FIG. 4B showing a state after being projected. FIGS. 5A, 5B, 6A, and 6B are diagrams employed to show a first and a second modifications, respectively, of the first embodiment of the present invention referred to above and each consists of a front elevational view FIG. 6A showing a state before being projected and a front elevational view FIG. 6B showing a state after being projected. FIGS. 7A, 7B, and 7C are diagrams for comparing the displacement amounts exhibited respectively in the motion transmitting devices 1, 2 and 3 all according to the first embodiment of the present invention. In the description of the operation, description will be made that the Y-axis direction is shown as depicted in an up and down direction, a slider 21 is shown as disposed below and a slider 61 is shown as disposed above, which slider 21 is shown as projecting in a slider 61 direction. It should be noted that half of a holder 11 is not shown in FIG. 1 and FIGS. 3A to 7C.

The motion transmitting device 1 is a device capable of accomplishing transmittance with the amount of displacement (amount of movement, amount of projection, hereinafter the same) of an input end being reduced or equalized or increased relative to the amount of displacement of an output end, and includes a holder 11 for accommodating a plurality of sliders and connecting bodies, three sliders 21, 41 and 61, and two connecting bodies 31 and 51.

In this embodiment, the sliders 21, 41 and 61 undergo a translatory movement along two inner wall surfaces 14 of the slider guide, where the inner wall surfaces 14 are parallel to YZ surfaces (surface containing both an Y-axis and a Z-axis) of holder 11 and are opposed to each other. For this reason, they can be referred to as translatory piece. Connecting bodies 31 and 51 are positioned between the slider 21 and the slider 41 and between the slider 41 and the slider 61, respectively, and are used to connect the two sliders together. The connecting bodies 31 and 51 are movable diagonally along slantwise grooves 16 and 17 which are provided in holders 11 and serve as connecting body guides. For this reason, they can be referred to as oblique pieces.

The holder 11 is a hollow member having an elongated rectangular space defined therein, where the space defines a path of movement of the slider and the connecting body. The holder 11 shown here has an appearance that is elongated and rectangular, but the appearance may not necessarily be limited to that described above. Similarly, the interior shape of the holder is not necessarily limited to straight shape, but may be curved such as appearing in the motion transmitting devices 301 and 351 designed respectively in accordance with eighth and ninth embodiments. Also, the holder 11 may have a sectional surface of a round shape or an oval polygonal shape.

The holder 11 is of a structure capable of being divided in a thicknesswise direction (Z-axis direction) into two split holders 11a and 11b by a fixture (not shown) such as, for example, externally threaded taper pins. It is, however, to be noted that the formation of the holder 11 is not necessarily limited to that described above, but the formation may be accomplished by closing a channel sectioned member with a lid, or members forming respective wall surfaces may be connected together in a connectable fashion or in an disconnectable fashion with the use of knock pin, bolts or the like.

The guide for guiding the movement of the slider and the connecting body is provided within the interior of the holder 11. Specifically, the two inner wall surfaces 14 opposed to each other and parallel to the YZ plane provide respective guides for the sliders 21, 41 and 61. Also, two inner wall surfaces 15 opposed to each other and parallel to the XY plane (plane containing the X-axis and Y-axis) are provided with slantwise grooves 16 and 17 for guiding respective movements of the connecting bodies 31 and 51. In the motion transmitting device 1, the two inner wall surfaces 14 opposed to each other and parallel to the YZ plane correspond to the slider guides and the slantwise grooves 16 and 17 correspond to the connecting body guides. A center axis line M of the two inner wall surfaces 14 and a center axis line $M_1$ of the slantwise groove 16 and a center axis line M of the two inner wall surfaces 14 and a center axis line $M_2$ of the slantwise groove 17 are so disposed as to intersect with each other (See FIGS. 7A, 7B, and 7C).

The two inner wall surfaces 14 opposed to each other and parallel to the YZ plane are disposed parallel to each other and the interval $W_0$ therebetween is so set as to be substantially equal to respective width $W_1$, $W_4$ and $W_6$ of the sliders 21, 41 and 61 (See FIGS. 4A and 4B). When the sliders 21, 41 and 61 accommodated within the holder 11 are moved in the Y direction, they are moved with opposite side surfaces 24 of the slider 21, opposite side surfaces 44 of the slider 41 and opposite side surfaces 64 of the slider 61 moving in sliding contact with the two inner wall surfaces 14.

Two inner wall surfaces 15 opposed to each other and parallel to the XY plane are also disposed parallel to each other. Those two inner wall surfaces 15 are spacedly provided with two, linear slantwise grooves 16 and 17 each having an upper portion inclined in the X-axis direction, and the holder 11 is provided with four slantwise groves. The slantwise groove 16 is so formed to have the same width in the lengthwise direction and serves as a guide for an inclined projection 37 formed in the connecting body 31. An inclined projection 17 is also formed in a manner similar to that described above and serves as a guide for an inclined projection 57 provided in the connecting body 51.

The inclination angle $\theta_2$ of the slantwise groove 16 and the inclination angle $\theta_5$ of the slantwise groove 17 may not be necessarily the same. Although the inclination angle $\theta_2$ of the slantwise groove 16 and the inclination angle $\theta_5$ of the slantwise groove 17 may not be necessarily limited respectively to specific angles, the angles $\theta_2$ and $\theta_5$ referred to above affect considerably on the amount of movement of the output end relative to the amount of movement of the input end. The details of this will be discussed later. It is, however, to be noted that the inclination angle referred to above and hereinafter means an angle about the X-axis as shown in FIGS. 4A and 4B. This equally applies to any other inclination angles.

The slider 21 is accommodated within the holder 11 so as to undergo the translatory movement in the Y-axis direction in the holder 11 with the inner wall surfaces 14 used as a guide therefor. This slider 21 is of such a shape that an upper portion of a rectangular parallelopiped body is cut slantwise with an upper surface thereof defining the slantwise surface 23. This slantwise surface 23, when viewed from front, has a gradient rising in the X-axis direction (See FIGS. 3A and 3B.). The opposite side surfaces 24 of the slider 21 are parallel to each other and the width $W_1$ therebetween is substantially equal to the width $W_0$ of the interior space of the holder 11 (See FIGS. 4A and 4B.).

The slider 21 has a thickness $T_2$ that is substantially equal to the height $T_0$ (in the Z-axis direction) of the interior space of the holder 11 (See FIG. 2). For this reason, the slider 21 accommodated within the holder 11 moves in the Y-axis direction with the inner wall surfaces 14 serving as a guide while held in sliding contact with the inner wall surfaces 15 opposed to each other. It is however to be noted that the thickness $T_2$ of the slider 21 is not necessarily limited to that specific value, but may be smaller than the above-described value. This description equally applies to the thickness of any other sliders 41 and 61.

The slantwise surface 23 is provided with a dovetail groove 29 in which a dovetail groove column 38 is slidingly engageable, where the dovetail groove column 38 is provided in a lower portion of the slantwise surface 32 of the connecting body 31. Although the inclination angle $\theta_1$ of the slantwise surface 23 is not specifically limited to a particular value, the inclination angle $\theta_1$ affects considerably on the amount of movement of the output end relative to the amount of movement of the input end. This will be discussed in detail later. In the slider 21, an end portion of the slantwise surface 23 is cut off so as to avoid collision with the slider 41. If the collision between the slider 21 and the slider 41 can be avoided, there is no need to cut the end portion of the slantwise surface 23 off (See FIGS. 5A and 5B). This equally applies to the slider 41.

The connecting body 31 is accommodated within the holder 11 and is adapted to be pushed out by the slider 21 to move upwardly in a forward diagonal direction within the holder 11 with the slantwise groove 16 being used as a guide. This connecting body 31 has slantwise surfaces 32 and 33 having its lower and upper portions inclined in opposite directions so that the connecting boy 31 has substantially trapezoidal shape when the connecting body 31 is viewed from front, where the parallel sides of the trapezoid is arranged vertically. Specifically, in a front view of the connecting body 31, the lower surface may define the slantwise surface 32 having a raising gradient in the X-axis direction while the upper surface may define the slantwise surface 33 having a falling gradient in the X-axis direction. Also, one side surface defines a slantwise surface 34 having its top inclined in the X-axis direction while the other side surface 35 is held parallel to the YZ plane. This connecting body 31 has a width $W_3$, the maximum width of which is smaller than the width $W_0$ of the interior space of the holder 11 (See FIGS. 4A and 4B).

Front and rear surfaces, which are surfaces of the connecting body 31 lying parallel to the XY plane, are parallel to each other and the inclined projection 37 referred to previously is provided on one side of each of the front and rear surfaces. The inclined projection 37 is an elongated convex element and is slidingly engageable in the slantwise groove 16. The inclined projection 37 is so set as to assume the same inclination angle as the inclination angle $\theta_2$ of the slantwise groove 16, and the connecting body 31 which has been pushed out by the slider 21 undergoes a movement with the inclined projection 37 engaged slidingly within the slantwise groove 16. On one side of the side surface 35 with respect to the inclined projection 37 in the front and rear surfaces has the same thickness as the thickness $T_2$ of the slider 21.

The slantwise surface 32 of the connecting body 31 has the dovetail groove column 38 defined therein for sliding engagement with the dovetail groove 29 provided in a slantwise surface 23 of the slider 21 and the slantwise surface 33 has a dovetail groove column 39 defined therein for sliding engagement with the dovetail groove 48 provided in an slantwise surface 42 of the slider 41. The dovetail groove columns 38 and 39 are each in the form of a convex projection.

Since the slantwise surface 32 of the connecting body 31 has a slidable relationship with the slantwise surface 23 of the slider 21, the inclination angle thereof becomes $\theta_1$. Similarly, since the slantwise surface 33 of the connecting body 31 has a slidable relationship with the slantwise surface 42 of the slider 41, the inclination angle thereof becomes $\theta_3$.

The slider 41 is accommodated within the holder 11 and is adapted to be pushed out by the slider 31 to undergo the translatory movement within the holder 11 with the inner wall surface 14 used as a guide. The slider 41 is of such a shape that an upper portion and a lower portion of a rectangular parallelopiped body is cut slantwise in opposite directions to allow it to represent a substantially trapezoidal shape when viewed from front, where parallel sides of the trapezoid is arranged vertically. More specifically, a lower surface when the slider 41 is viewed from front defines a slantwise surface 42 having a falling gradient in the X-axis direction while the upper surface defines a slantwise surface 43 having a raising gradient in the X-axis direction. The opposite side surfaces 44 of the slider 41 are parallel to each other and the width $W_4$ therebetween is substantially equal to the width $W_0$ of the interior space of the holder 11 (See FIGS. 4A and 4B). This slider 41 also has a thickness $T_4$ which is the same as the thickness $T_2$ of the slider 21 (See FIG. 2).

The slantwise surface 42 is provided with a dovetail groove 48 slidably engageable with a dovetail groove column 38 provided in the slantwise surface 33 of the connecting body 31. Similarly, the slantwise surface 43 is provided with a dovetail groove 49 slidably engageable with a dovetail groove column 58 provided in a slantwise surface 52 of the connecting body 51. It is sufficient that the slantwise surfaces 42 and 43 are so formed as to have respective directions of inclination that are basically opposite to each other, and the inclination angle $\theta_3$ of the slantwise surface 42 and the inclination angle $\theta_4$ of the slantwise surface 43 are not necessarily limited to particular values. It is, however, to be noted that the inclination angles $\theta_3$ and $\theta_4$ referred to above will widely affect the amount of movement of the output shaft relative to the amount of movement of the input shaft. The details of this will be discussed later.

The connecting body 51 is accommodated within the holder 11 and is adapted to be pushed out by the slider 41 to move diagonally in the forward direction within the holder 11 with the slantwise groove 17 being used as a guide. The basic construction is identical with that of the connecting body 31, in which slantwise surfaces 52, 53 and 54 correspond respectively to the slantwise surfaces 32, 33 and 34 of the connecting body 31, and a side surface 55 and a front surface correspond respectively to the side surface 35 and the front surface of the connecting body 31. The connecting body 51 has a width $W_5$ and a thickness, both of which can be regarded as the same as those of the connecting body 31.

An inclined projection 57 provided in the connecting body 51 corresponds to the inclined projection 37 in the connecting body 31 and the dovetail groove columns 58 and 59 correspond respectively to the dovetail groove columns 38 and 39 in the connecting body 31. The connecting body 31 may have the same shape as the connecting body 51. Provided that the basic structure remains the same, a different shape may be employed.

A slider 61 is accommodated within the holder 11 and is adapted to be pushed out by the connecting body 51 to undergo the translatory movement in the Y-axis direction within the holder 11 with the inner wall surface 14 being used as a guide. The slider 61 has such a shape similar to that in which top and bottom of the slider 21 is inverted with a lower surface thereof defining a slantwise surface 62 of a gradient falling in the X-axis direction. That opposite side surfaces of the slider 61 are parallel to each other and that the width and the thickness $W_6$ thereof are defined in the respective manners as those discussed in connection with those of the slider 21.

The slantwise surface 62 is provided with a dovetail groove 68 in which the dovetail groove column 59, provided in the slantwise surface 53 of the connecting body 51, is slidably engaged. The inclination angle $\theta_6$ of the slantwise surface 62 is not necessarily limited to a particular angle, but this inclination angle $\theta_6$ may widely affect the amount of movement of the output shaft relative to the amount of movement of the input shaft. This will be discussed in detail later.

The motion transmitting device 1 of the structure described hereinabove is so designed as to allow the inclined projections 37 and 57, respectively in the connecting bodies 31 and 51, to be incorporated engaged in the slantwise grooves 16 and 17 relative to the split holder 11a (11b) in a state in which the slider and the connecting body are connected with each other and the other split holder 11b (11a) is fitted subsequently.

The operation of the motion transmitting device 1 and the amount of movement of each of the slider and the connecting body will now be described. In this instance, the description will proceeds with the input and the output shafts represented respectively by the slider 21 and the slider 61.

When the slider 21 projects in the Y-axis direction from a state shown in FIG. 3A, the slider 21 undergoes the translatory movement with the opposite side surfaces 24 sliding along the inner wall surfaces 14 of the holder 11. The amount of movement of the slider 21, that is the amount L of projection, is expressed by $(A_1-A_0)$ according to FIGS. 4A and 4B.

The connecting body 31, when pushed by the slider 21, moves along the slantwise groove 16 with the inclined projection 37 sliding within the slantwise groove 16 provided in the holder 11. Since the slantwise groove 16 has an upper portion inclined in the X-axis direction, the connecting body 31 moves not only in the Y-axis direction but also in the X-axis direction.

The slider 41, when pushed by the connecting body 31, moves directly in the Y-axis direction with the opposite side surfaces 44 sliding along the inner wall surface 14 of the holder 11. At that time, the amount of movement of the slider 41 is expressed by $(B_1-B_0)$ according to FIGS. 4A and 4B, and this amount of movement is expressed by the following equation (1).

$$B_1-B_0=[(\tan\theta_2-\tan\theta_3)/(\tan\theta_2-\tan\theta_1)]\cdot L \quad (1)$$

in which $B_1-B_0$ represents the amount of movement of the slider 41; L represents the amount of projection of the slider 21; $\theta_1$ represents the inclination angle of the slantwise surface 23 in the slider 21; $\theta_2$ represents the inclination angle of the slantwise groove 16; and $\theta_3$ represents the inclination angle of the slantwise surface 42 in the slider 41.

From the equation (1), it will readily be understood that the amount of movement of the slider 41 is $[(\tan\theta_2-\tan\theta_3)/(\tan\theta_2-\tan\theta_1)]$ multiple of the amount of movement of the slider 21. In the case of the motion transmitting device 1 shown in FIGS. 4A and 4B, $[(\tan\theta_2-\tan\theta_3)/(\tan\theta_2-\tan\theta_1)]$ is greater than 1 since $\tan\theta_3$ is a negative value. In other words, the amount of movement of the slider 41 is increased relative to the amount of movement of the slider 21.

Also from the equation (1) above, the smaller the difference between the inclination angle $\theta_2$ of the slantwise groove 16 and the inclination angle $\theta_1$ of the slantwise surface 23 of the slider 21 is, the larger the difference between the inclination angle $\theta_2$ of the slantwise groove 16 and the inclination angle $\theta_3$ of the slantwise surface 42 of the slider 41 is, the amount of movement of the slider 41 can be increased. Those aspects will be described in detail in connection with the relationship between the inclination angles of the slider and the connecting body and the inclination angles of the slantwise grooves 16 and 17 and the amount of movement thereof, which will be discussed later.

The connecting body 51 moves in a manner similar to the connecting body 31, and the slider 61 moves in a manner similar to the slider 41. The amount of movement of the slider 61, can be determined in a manner similar to the amount of movement of the slider 41.

As can readily be understood from the capability of increasing the amount of movement of the slider 41 relative to the amount of projection of the slider 21, the motion transmitting device according to this embodiment can be basically constructed of the holder, the two sliders and one connecting body disposed between those two sliders. Also, when the number of the connecting body and the number of the slider are increased, the amount of movement of the output end can be further increased relative to the amount of movement of the input end.

The relationship between the inclination angles of the slider and the connecting body and the inclination angles of the slantwise grooves 16 and 17 will now be described. The motion transmitting device 2 shown in FIGS. 5A and 5B is a first modification to the motion transmitting device 1 and, when comparing with the motion transmitting device 1 shown in FIGS. 4A and 4B, the respective angles $\theta_2$ and $\theta_5$ of the slantwise grooves 16 and 17 remain the same, but the respective inclination angles $\theta_1$, $\theta_3$, $\theta_4$ and $\theta_6$ of the slantwise surfaces of the sliders 21, 41 and 61 are moderate. The motion transmitting device 3 shown in FIGS. 6A and 6B is a second modification of the motion transmitting device 1. Compared with the motion transmitting device 1 shown in FIGS. 4A and 4B, the angles $\theta_2$ and $\theta_5$ of the slantwise grooves 16 and 17 are gentle angles while the angles $\theta_1$, $\theta_3$, $\theta_4$ and $\theta_6$ of the slantwise surfaces of the sliders 21, 41 and 61 remain the same.

FIGS. 7A, 7B, and 7C illustrate diagrams where the amounts of movement of the output shaft relative to the amounts of movement (amount of projection) of the input shaft are compared. It is to be noted that the amount of projection of the input end in the motion transmitting device 3 manifests ½ L. FIGS. 5A, 5B and FIGS. 7A, 7B, and 7C make it clear that if the inclination angles $\theta_1$, $\theta_3$, $\theta_4$ and $\theta_6$ of the slantwise surfaces of the sliders 21 and 41 are set to moderate angles, the amount of movement of the slider 61 decreases.

Considering that in this motion transmitting device the connecting body 31 moves so as to run up along the slantwise surface 23 of the slider 21, if the inclination angle $\theta_1$ of the slantwise surface 23 is set to a small value as in the case of the motion transmitting device 2 shown in FIGS. 5A, 5B, and 5C, the amount of rise of the connecting body 31 becomes small. As a result, the amount of projection of the connecting body 31, becomes small.

Also, even in the motion transmitting device 2 shown in FIGS. 5A, 5B, and 5C, the connecting body 31 causes an slantwise surface 33 at an upper portion to slide along the slantwise surface 42 at a lower portion of the slider 41 and projects slider 41 upwardly as the connecting body 31 moves in the X-axis direction, but since the inclination angle $\theta_3$ of the slantwise surface 42 is moderate, the amount of rise of the slider 41, becomes small. Those similarly apply to the angles $\theta_4$ and $\theta_6$ of the slantwise surfaces.

From the foregoing, it will readily be understood that if the angles $\theta_1$, $\theta_3$, $\theta_4$ and $\theta_6$ of the respective slantwise surfaces of the sliders 21, 41 and 61 are chosen to be moderate value, the associated amount of movement of the slider 61 may decrease. It is to be noted that when each of the angles $\theta_1$, $\theta_3$, $\theta_4$ and $\theta_6$ of the respective slantwise surfaces of the sliders 21, 41 and 61 is chosen to be 0° (=180°), that is, each of the top and bottom surfaces is rendered to be horizontal in the X-axis, the amount of movement of the sliders 41 and 61 become equal to the amount of projection of the input end and does neither increase nor decrease.

On the other hand, FIGS. 6A, 6B and FIGS. 7A, 7B, and 7C make it clear that if the inclination angles $\theta_2$ and $\theta_5$ of the slantwise grooves 16 and 17 are chosen to have moderate values, the amount of movement of the slider 61 will increase. If the inclination angles $\theta_2$ and $\theta_5$ of the slantwise grooves 16 and 17 are chosen to be 90°, that is, the slantwise grooves 16 and 17 are made parallel to the inner wall surface 14 of the holder 11, the amount of movement of the sliders 41 and 61 will become equal to the amount of projection of the input end and will neither increase nor decrease.

Since the connecting body 31 moves along the slantwise groove 16 in the motion transmitting device, the amount of movement of the connecting body 31 in the X-axis direction increases where the angle $\theta_2$ of the slantwise groove 16 is set to be a small angle as in the motion transmitting device 3 shown in FIGS. 6A and 6B. As a result, the amount of projection of the connecting body 31 increases. This relationships equally applies to the inclination angle $\theta_5$ of the slantwise groove 17.

From the foregoing, it is clear that the amount of movement of the slider 61 can be increased if the angles $\theta_2$ and $\theta_5$ of the respective slantwise grooves 16 and 17 are chosen to have moderate values.

Thus, in the motion transmitting device according to this embodiment, it is possible to increase or equalize the amount of movement of the output end relative to the input end, by adjusting the inclination angle of the slantwise surface in the slider, which serves as a surface that slides along the connecting body, and by adjusting the inclination angle of the slantwise groove provided in the holder that guides the movement of the connecting body. Also, by increasing the number of the sliders and the connecting bodies, the amount of movement of the output end relative to the input end can also be increased. While in the above-described embodiment, the slantwise grooves 16 and 17 for guiding the connecting bodies 31 and 51 are provided to the holder 11, and the inclined projections 37 and 57 each in the form of a convex projection for slidably engaging the slantwise grooves 16 and 17 are provided to the connecting bodies 31 and 51, it is also acceptable that convex inclined projections for guiding the connecting body 21, and 51 are provided to the holder 1, and slantwise grooves that slidably engage with the inclined projections may be provided to the connecting bodies 31, 51.

Since in the foregoing description reference has been made to the use of the slider 21 as the input end and of the slider 61 as the output end and, accordingly, the amount of movement of the output end relative to the input end is increased. However, if the slider 61 is used as the input end and the slider 21 is used as the output end, it is quite natural that the amount of movement of the output end relative to the input end is decreased. Accordingly, the motion transmitting device of the present invention is effective to decrease, equalize or increase the amount of movement of the output end relative to the amount of movement of the input end.

Figure 8:
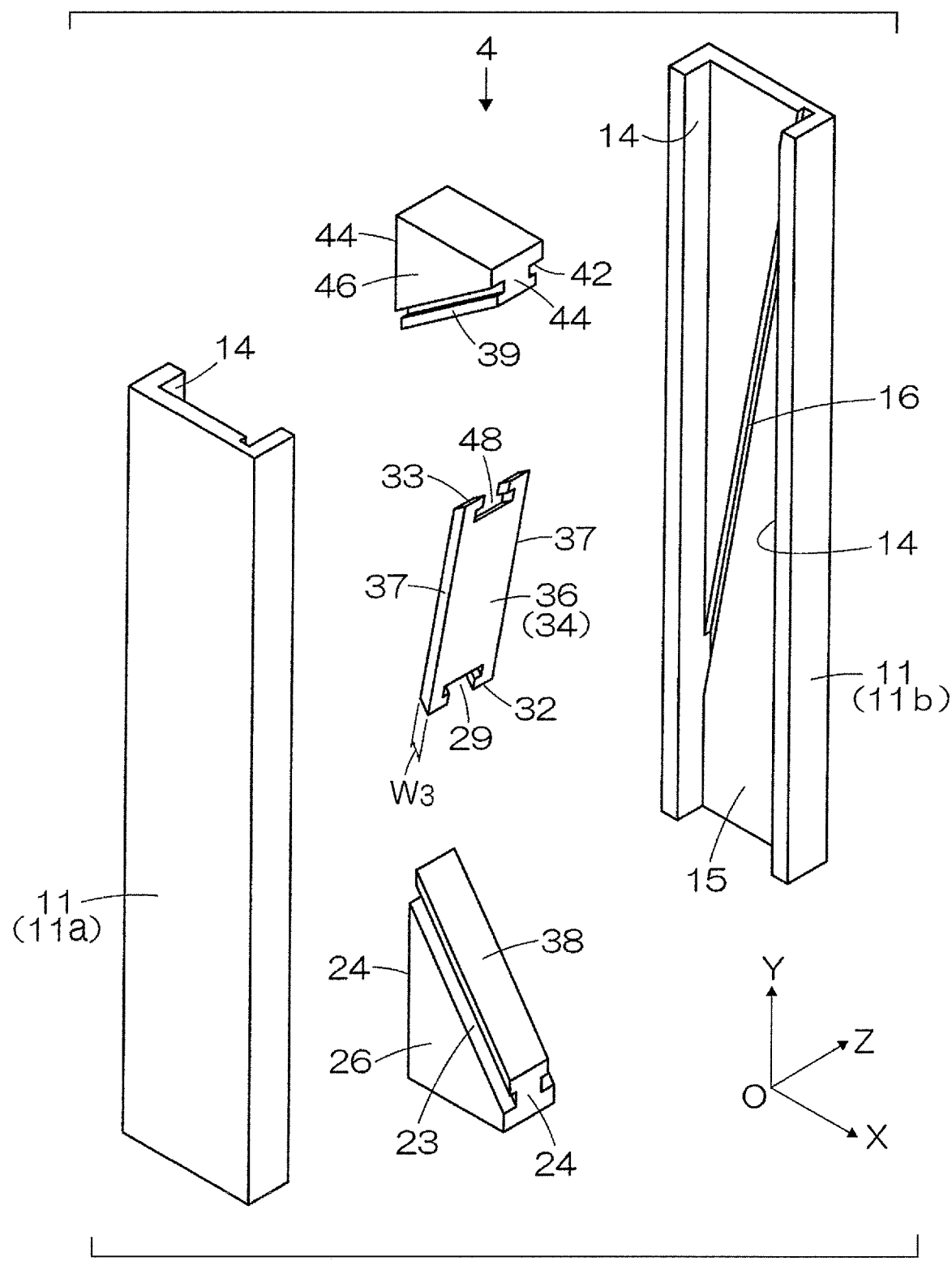
FIG. 8 is an exploded view showing the structure of a motion transmitting device 4 according to a second embodiment of the present invention.

FIG. 8 is an exploded view showing the structure of the motion transmitting device 4 according to a second embodiment of the present invention. Structures identical with those employed in any one of the motion transmitting devices 1, 2 and 3 according to the first embodiment shown in and described with reference to FIGS. 1 to 7C are designated by like reference numerals and, therefore, the details thereof are not reiterated.

The motion transmitting device 4 according to the second embodiment is a motion transmitting device utilizing a connecting body 36 of a flat plate shape. As compared with those of the motion transmitting device 1 shown and described in connection with the first embodiment, the motion transmitting device 4 according to the second embodiment makes use of a different shape of the connecting body 36 and different shapes and dispositions of sliders 26 and 46, but the technical idea thereof remains the same as that of the motion transmitting device according to the previously described first embodiment.

The motion transmitting device 4 is constructed of the holder 11, the sliders 26, 46 and the connecting body 36 and is designed such that the slantwise surface 23 of the slider 26 and the slantwise surface 42 of the slider 46 are inclined in a reverse direction as compared with those employed in the previously described motion transmitting device 1 so that the amount of movement of the output end relative to the amount of projection of the input end may be decreased, where the slider 26 is used as an input end and the slider 46 is used as an output end. Accordingly, the slantwise surfaces 32 and 33 of the connecting body 36 are also inclined in a reverse direction as compared with those in the previously described motion transmitting device 1.

The connecting body 36 is an oblique piece of a flat plate shape having a narrow width $W_3$ and is of such a shape as to cut the connecting body 31 of the motion transmitting device 1 while leaving only a portion of the inclined projections 37 with the dovetail grooves 29 and 48 subsequently formed therein. Although in the motion transmitting device 4 the dovetail groove column 38 is provided in the slantwise surface 23 of the slider 26, the dovetail grooves 29 and 48 are provided in the slantwise surfaces 32 and 33 of the connecting body 36, and the dovetail groove column 39 is provided in the slantwise surface 42 of the slider 46, the dovetail groove grooves 29 and 48 and the dovetail columns 38 and 39 may be provided in the same way as those in the motion transmitting device 1. The functional effects brought about by the motion transmitting device 4 designed according to the second embodiment of the present invention are similar to those of any of the motion transmitting devices 1, 2, 3 according to the first embodiment.

The connecting body disposed between the two sliders so as to act thereon as described hereinabove may have a flat plate shape. Also, the connecting body may have a rod-like shape. This equally applies to the connecting body 51 in the motion transmitting device 1 designed according to the first embodiment. In summary, it is satisfactory if the connecting body is adapted to be pushed by the slider in contact with one end thereof so as to move along a connecting body guide so that the slider then in contact with the other end may be pushed by the connecting body. While the connecting body of a flat plate shape is shown in this embodiment, the slider may also have a flat plate shape or a rod-like shape as shown in the below described embodiment.

The slider and the connecting body may respectively have an appropriate shape depending on the application, the magnitude of the amount of motion to be transmitted, or the like. Since a rod-like shape or a flat plate shape can be used for the slider and the connecting body, downsizing and weight reduction of the motion transmitting device can be accomplished easily and the usability is convenient since various shapes can be employed depending on the purpose of use.

Figure 9A:
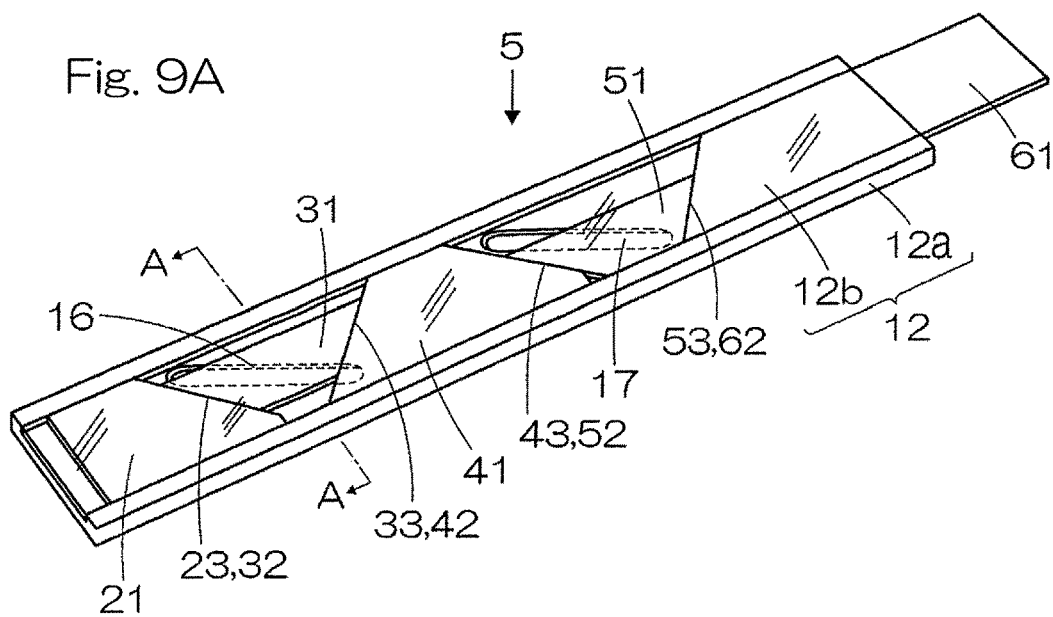
FIGS. 9A, 9B, and 9C are structural diagrams showing a motion transmitting device 5 according to a third embodiment of the present invention.
Figure 9B:
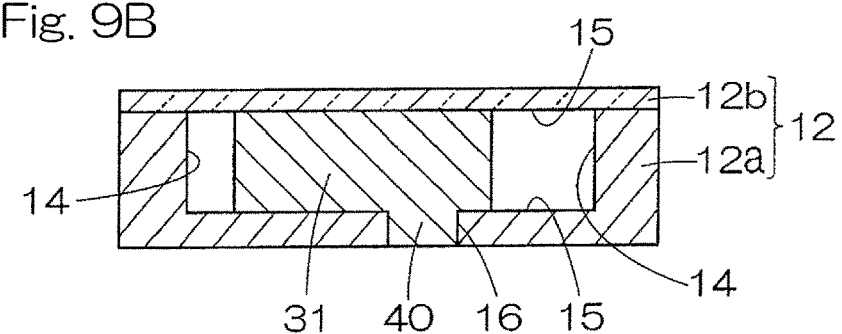
Figure 9C:
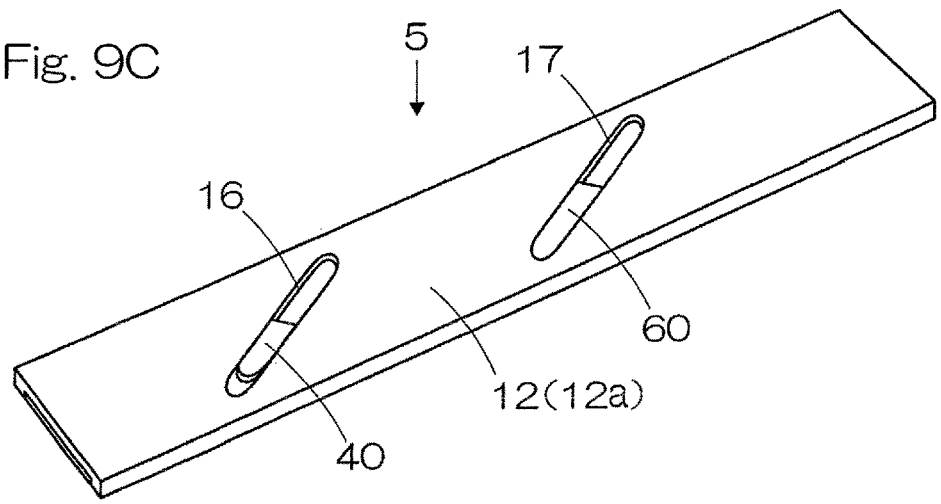

FIGS. 9A, 9B, and 9C are structural diagrams of the motion transmitting device 5 according to a third embodiment of the present invention, where (A) represents a perspective view as viewed from front, (B) is a cross sectional view taken along the line A-A, and (C) is a perspective view as viewed from rear. Structures identical with those employed in any one of the motion transmitting devices 1, 2 and 3 according to the first embodiment shown in and described with reference to FIGS. 1 to 7C and the motion transmitting device 4 according to the second embodiment, shown in and described with reference to FIG. 8, are designated by like reference numerals and, therefore, the details thereof are not reiterated.

The motion transmitting device 5 according to the third preferred embodiment, although it has the same basic construction as that of the motion transmitting device 1 according to the first embodiment, somewhat differs in shape and structure therefrom. The motion transmitting device 5 has a holder 12 constructed of a channel-sectioned plate member 12a having an open upper surface and a plate member 12b made of a transparent synthetic resin and covering over the upper surface thereof, the holder 12 accommodating therein the sliders 21, 41 and 61 and the connecting bodies 31 and 51. The slantwise grooves 16 and 17 are provided only in a rear surface (bottom surface) of the holder 12.

Unlike the sliders 21, 41 and 61 employed in the first embodiment, the sliders 21, 41 and 61 are not provided with any dovetail groove. Also, although the sliders 21, 41 and 61 have small thicknesses, other structure features than that are the same as the sliders 21, 41 and 61 employed in the first embodiment.

Unlike the connecting bodies 31 and 51 employed in the first embodiment, the connecting bodies 31 and 51 of this embodiment are not provided with any dovetail groove column. Also, slantwise columns 40 and 60 slidably engageable in the slantwise grooves 16 and 17 are provided only in the rear surface. Also, the thickness is thinned.

The motion transmitting device 5 of the structure described hereinabove is not provided with the dovetail groove and the dovetail groove column both operable to slidably connect the slider and the connecting body with each other. When the slider 21 is pushed, the slider 21 undergo a translatory movement, with the inner wall surface 14 serving as a guide, to slide the slantwise surface 23 mutually with the slantwise surface 32 of the connecting body 21, thereby pushing the connecting body 31 in a forward diagonal direction while guiding the connecting body 31 with the slantwise groove 16. Thus the slider and the connecting body are pushed out while slantwise surfaces of the slider and the connecting body are successively slid. As described above, the operation of the motion transmitting device 5 and the motion of the slider and the connecting body are the same as those in any of the motion transmitting device 1, 2 and 3 according to the first embodiment.

In the motion transmitting devices 1, 2 and 3 according to the first embodiment, the slider and the connecting body are slidably connected with each other through the dovetail groove and the dovetail groove column and, therefore, they do not come loose. For this reason, incorporation into a device or the like is easy to accomplish. On the other hand, in the motion transmitting device 5 designed according to the third embodiment, since the slider and the connecting body are not connected, incorporation into the device is limited, but it can be manufactured at an inexpensive cost because of its simple structure. Any one of the motion transmitting devices 1, 2, 3, 4 and 5 may be suitably selected depending on the application and the magnitude of motion to be transmitted. The size and thickness of the slider and the connecting body may be suitably selected depending on the magnitude of motion to be transmitted.

Figure 10A:
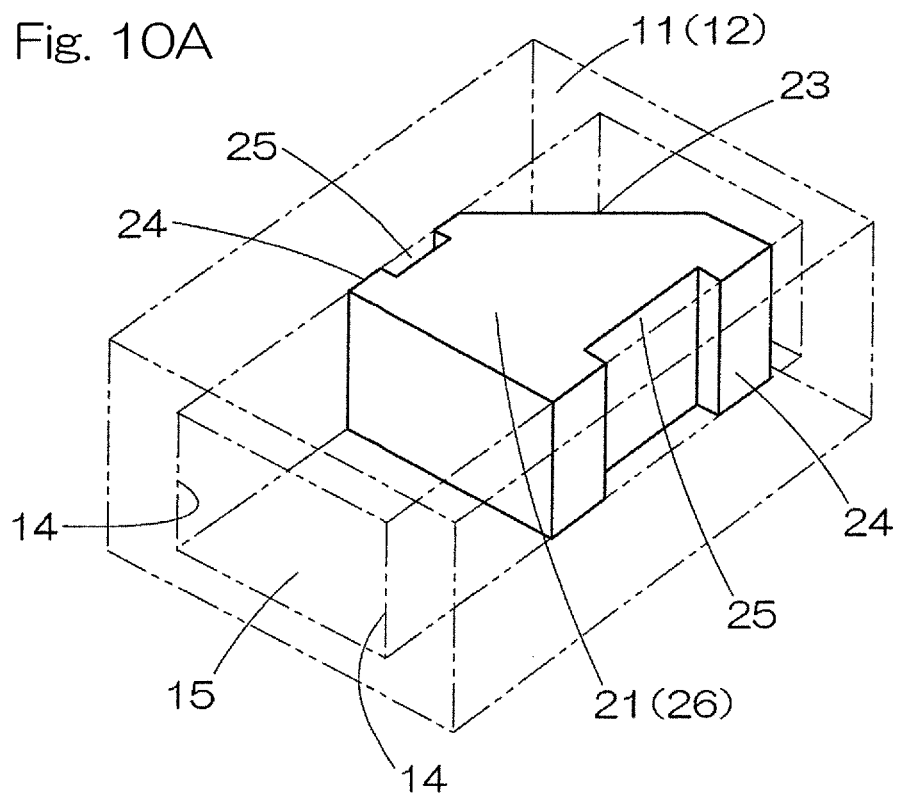
FIGS. 10A and 10B illustrate a modification of each of a holder 11 (12) and the slider 21 (26) that constitute the motion transmitting device according to the first to third embodiments of the present invention.
Figure 10B:
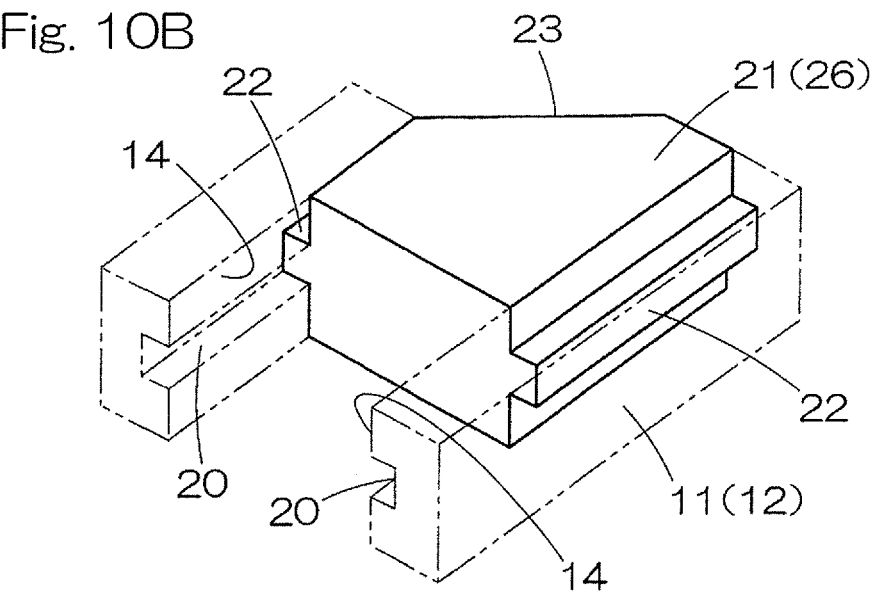

FIGS. 10A and 10B illustrate a modification of the holder 11 (12) and the slider 21 (26) forming respective parts of any one of the motion transmitting devices 1, 2, 3, 4 and 5 according to the first to third embodiments of the present invention. In any one of the motion transmitting devices 1, 2, 3, 4 and 5 designed according to the first to third embodiments, the opposite surfaces 24 of the slider 21 (26) in their entirety contact the inner wall surface 14 of each of the holders 11 and 12, but the slider 21 shown in FIG. 10A has its opposite side surfaces 24 formed with a recessed portion 25 positioned at a lengthwise direction intermediate portion thereof. The recessed portion 25 may be provided in only one side surface 24. By this constitution, the resistance at the time the slider 21 slides can be reduced. This description equally applies to the sliders 26, 41, 46 and 61.

The idea of reducing the contact surface area of the slide surface and reducing the resistance at the time of movement as shown in FIG. 10A can be applied not only to the opposite side surfaces of the sliders 21, 26, 41, 46 and 61, but also to any other slide surface such as, for example, wall surfaces of the slider and the connecting body which contact the connecting bodies 31 and 51 and the inner wall surface 15 of the holders 11 and 12.

In the holder 11 (12) employed in any of the motion transmitting devices 1, 2, 3, 4 and 5 according to the third embodiment, wall surfaces are provided in all lengthwise directions. Since portions of the holder 11 (12) which guides the slider 21 (26) are the opposite side surfaces, a groove 20 may be provided in each of the opposite side surfaces, and a projection 22, which slidably engages in the groove 20, may be provided in each of the opposite side surfaces 24 of the slider 21 (26), leaving a ceiling surface and a bottom surface open. This equally applies to the slider 61.

Figure 11A:
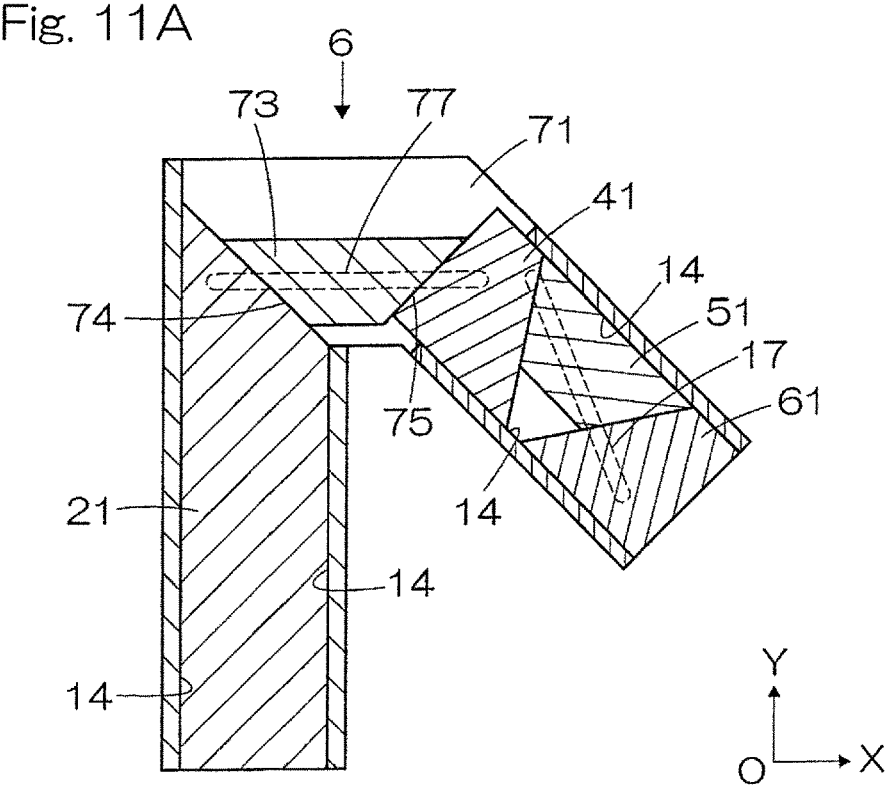
FIGS. 11A and 11B are diagrams used to explain the operation of a motion transmitting device 6 according to a fourth embodiment of the present invention.
Figure 11B:
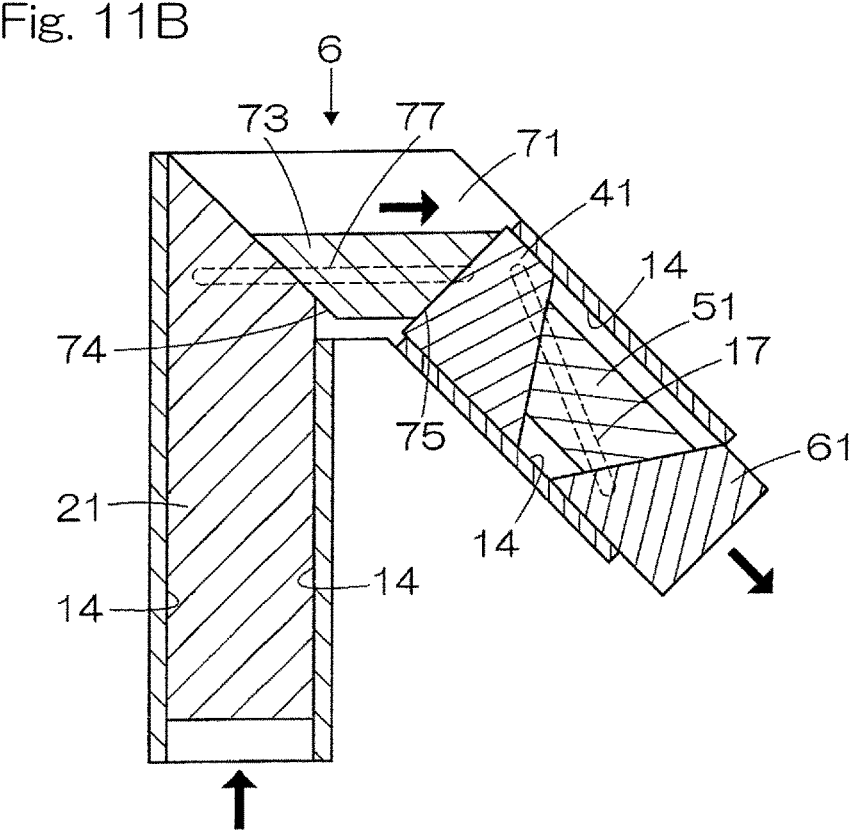

FIGS. 11A and 11B are diagrams used to explain the operation of the motion transmitting device 6 according to a fourth embodiment of the present invention. FIG. 11A represents a state before being pushed and FIG. 11B represents a state after the slider 21 has been pushed. Structures identical with those employed in any one of the motion transmitting devices 1, 2 and 3 according to the first embodiment shown in and described with reference to FIGS. 1 to 7C, the motion transmitting device 4 according to the second embodiment shown in and described with reference to FIG. 8, and the motion transmitting device 5 according to the third embodiment shown in and described with reference to FIGS. 9A, 9B, and 9C are designated by like reference numerals and, therefore, the details thereof are not reiterated.

The motion transmitting device 6 according to the fourth embodiment differs from the motion transmitting device 1 according to the first embodiment thereof in respect of the position of the output end relative to the input end and concomitantly makes use of the slider and the connecting body both of which are different in structure from those employed in the motion transmitting device 1 according to the first embodiment. Any of the motion transmitting devices 1, 2 and 3 according to the first embodiment of the present invention makes use of the holder 11 which is elongated straight in the lengthwise direction with the input and output ends disposed on the same line. In contrast thereto the motion transmitting device 6 according to the fourth embodiment makes use of a holder 71 which is of a generally inverted V-shape when viewed from front and in which the output end is positioned at a location spaced 135° relative to the input end.

As is the case with the motion transmitting device 1, however, the motion transmitting device 6 includes the three sliders 21, 41 and 61 and the two connecting bodies 51 and 73 with the sliders and the connecting bodies disposed alternately. A transverse groove 77 is a connecting body guide for the connecting body 73.

The connecting body 73 has opposed slantwise surfaces 74 and 75 that are inclined an angle of 45° relative to each other in respective reverse directions and the shape of the connecting body 73 when viewed from front is substantially the same as the connecting body 31, but the movement of the connecting body 73 is different from the connecting body 31. The connecting body 31 employed in the first embodiment is adapted to be pushed out by the slider 21 to move in the diagonal forward direction, but the connecting body 73 is adapted to be pressed by the slider 21 to move abeam (in the X-axis direction).

The holder 71 is provided with transverse grooves 77 parallel to the X-axis direction at respective positions corresponding to the slantwise grooves 16 in the holder 11. The connecting body 73 is provided with protruding columns each slidable in the transverse groove 77 in the same way as the connecting body 31 employed in the motion transmitting device 5 according to the third embodiment. This protruding columns intersect the slantwise surfaces 74 and 75 at an angle of 45°. Accordingly, the connecting body 73 is adapted to be pressed by the slider 21 to move in an orthogonal direction.

The connecting body 73 is a direction converting piece. Unlike the connecting body 31, the connecting body 73 has no function of increasing the amount of movement of the input end, but move in the X-axis direction by the same quantity as the amount of movement of the input end. The fact that the connecting body 73 has no function of increasing the amount of movement of the input end can readily be understood from the fact that the parameter $\theta_2$ assumes 90° in the equation (1) above.

The slider 41 that can slidably contact the connecting body 73 has a 90° end surface and, therefore, contacts at an angle of 45° relative to the connecting body 73. Accordingly, the slider 41 undergoes the translatory movement within the holder 71 at cosine 45° multiple of the amount of movement of the connecting body 73. Movements and functions of the slider 41, the connecting body 51 and the slider 61 are identical with those exhibited by the motion transmitting device 1 according to the first embodiment. It is, however, to be noted that the position (disposition) of the connecting body 73 for direction conversion is not necessarily limited to the position (disposition) of this embodiment.

FIGS. 12A, 12B, and 12C are diagrams used to explain the operation of the motion transmitting device 7 according to a fifth embodiment of the present invention. FIG. 12 A is a diagram showing that before being pushed, FIG. 12B is a diagram showing that after being projected and FIG. 12C is a diagram showing the connecting body 78 as viewed from bottom. Structures identical with those employed in any one of the motion transmitting devices 1, 2 and 3 according to the first embodiment shown in and described with reference to FIGS. 1 to 7C, the motion transmitting device 4 according to the second embodiment shown in and described with reference to FIG. 8, the motion transmitting device 5 according to the third embodiment shown in and described with reference to FIGS. 9A, 9B, and 9C, and the motion transmitting device 6 according to the fourth embodiment shown in and described with reference to FIGS. 11A and 11B are designated by like reference numerals and, therefore, the details thereof are not reiterated. It is to be noted that the hatching employed in the accompanying drawings are applied for the purpose of clarity of the structure.

Although the motion transmitting device 7 according to the fifth embodiment has a structure similar to the motion transmitting device 6 according to the fourth embodiment, the input end and the output end are in positional relationship of 180°. Also, in the motion transmitting device 7, an output end is also provided on the intermediate position such that two output ends is provided for one input end. Accordingly, the structure of the piece is also different.

In a manner similar to the motion transmitting device 6, the motion transmitting device 7 includes three sliders 21, 41 and 61 and two connecting bodies 51 and 78. The sliders and the connecting bodies are disposed alternately in the motion transmitting device 7, in a manner similar to that in the motion transmitting device 6. A transverse groove 77 serves as a connecting body guide for the connecting body 78.

The connecting body 78 has a thickness that is double the connecting body 73 employed in the fourth embodiment. Viewing the connecting body 78 while dividing the connecting body 78 to two portions in the thicknesswise direction, the connecting body 78 has a structure similar to that of the connecting body 73 in one side (upper side in FIG. 12 C), whereas the other side (lower side in FIG. 12C) has a rectangular plate-shaped member 81 that is elongated to cover a slantwise surface 80. This plate-shaped member 81 will serve as a second output end. A portion of the connecting body 78 adjacent the slantwise surface 79 represents an end surface that is the same as up and down and represents a thickness that is double the slantwise surface 74 of the connecting body 73.

The interior space of the holder 72 has a height $T_0$ that is identical with those of the sliders 21, 41 and 61 and the connecting body 51, but only a portion of the connecting body 78 has a height that is twice the $T_0$. As shown in FIG. 12C, the slider 21 accommodated within the holder 72 is in slidable contact with a slantwise surface 79 of the connecting body 78 and, also, the slider 41 is in slidable contact with the slantwise surface 80 of the connecting body 78. The relationships between the slider 41 and the connecting body 51 and between the connecting body 51 and the slider 61 are the same as those employed in the motion transmitting device 1 according to the first embodiment.

In the motion transmitting device 7, in the same manner as the motion transmitting device 6, the connecting body 78 is pressed by the slider 21 to move abeam (in the X-axis direction). In the same manner as the connecting body 73, the connecting body 78 is a direction converting piece and has no function of increasing the amount of movement of the input end, but can move in the X-axis direction by the same quantity as the amount of movement of the input end. For this reason, the plate shaped member 81, which is a second output end, projects the same amount as the input end.

The slider 41 in contact with the connecting body 78 moves the same quantity as the connecting body 78 in a minus X-axis direction because it contacts the connecting body 78 at an orthogonal angle. Respective movements and functions of the slider 41, the connecting body 51 and the slider 61 are the same as those employed in the motion transmitting device 1 according to the first embodiment. It is to be noted that the position (disposition) of the connecting body 78 for direction conversion is not necessarily limited to the position (disposition) employed in this embodiment.

Although in describing each of the motion transmitting device 4 according to the fourth embodiment and the motion transmitting device 7 according to the fifth embodiment the slider 21 has been shown and described as used as the input end and the slider 61 has been shown and described as used as the output end, it is possible to use it as the transmitting device in which the slider 61 may be used as the input end and the slider 21 is used as the output end.

With the use of the connecting body for direction conversion as hereinabove described, the direction of the output end relative to the input end can be easily changed. While reference has been made to an example in which the output end is converted 135° and 180° relative to the input end in the above-described embodiment, position of the output end relative to the input end can be disposed to an area of 0 to 180°, or to an area of 0 to −180° by reversing the front side and back side. Further, the output end may be directed to arbitrary direction by disposing the output end while turning the output end in a direction of YZ plane. Thus, the motion transmitting device of the present invention can be used in numerous applications and can be incorporated in various devices or the like.

The direction conversion of the output end relative to the input end can be accomplished by the use of the connecting body that slides slantwise together with the slider. In this case, the direction conversion can be accomplished while the amount of movement of the input end is increased or decreased. Although the connecting body for direction conversion has no function of increasing and decreasing the amount of movement of the input end, the direction conversion can be accomplished with the single connecting body, thereby enabling downsizing of the motion transmitting device.

The motion transmitting device employing two or more output ends relative to the single input end can be applied even as a motion transmitting device having a holder 11 that is straight in the lengthwise direction. FIG. 13 illustrates a structural diagram of the motion transmitting device 8 according to a sixth embodiment of the present invention, in which FIG. 13A is a diagram showing a state before being pushed and FIG. 13B is a diagram showing a state after the slider 21 projected. It is to be noted that in FIGS. 13A, 13B, and 13C, half of the holder 11 (the split holder 11*b*) is not shown. Structures identical with those employed in any one of the motion transmitting devices 1, 2 and 3 according to the first embodiment shown in and described with reference to FIGS. 1 to 7C are designated by like reference numerals and, therefore, the details thereof are not reiterated.

The motion transmitting device 8 is constituted of a holder 11 of a straight shape, sliders 21, 41, 61, 85 and 88, and connecting bodies 31, 51, 83 and 86 and, and have many sliders and connecting bodies compared with the motion transmitting device 1, while the operation and function are basically identical with those of the motion transmitting device 1 according to the first embodiment. In this motion transmitting device 8, the inner wall surface 14 of the holder 11 serves as a slider guide for the sliders 85 and 88 and the slantwise grooves 18 and 19 are connecting body guides as is the case with the slantwise grooves 16 and 17.

The holder 11 is provided, besides the slantwise grooves 16 and 17, with the slantwise grooves 18 and 19 that function in a manner similar to the slantwise grooves 16 and 17. The sliders 85, 88 are pushed towards the connecting body to undergo the translatory movement in the Y-axis direction with the inner wall surface 14 serving as a guide, in a manner similar to the sliders 21, 41 and 61. Operations and functional effects of the sliders 85 and 88 are identical with those of the sliders 21, 41 and 61 and, therefore, the detailed description thereof is not reiterated. The connecting bodies 83 and 86 are each provided, in a manner similar to the connecting bodies 31 and 51, with slantwise columns 84 and 87, which are protruding columns that slidably engage in the slantwise grooves 18 and 19. Operations and functional effects of the connecting bodies 83 and 86 are identical with those of the connecting bodies 31 and 51 and, therefore, the detailed description thereof is not reiterated.

A characteristic feature of the motion transmitting device 8 lies in the use of five output ends. The output ends referred to above are each formed in one side surface of the respective sliders 21, 41, 61 and 85 in the form of a convex portion. Specifically, when the slider 21 used as the input end and the slider 88 is used as a first output end, the convex portion 89 provided in the slider 21 can be rendered to be a fifth output end, the convex portion 90 provided in the slider 41 can be rendered to be a fourth output end, the convex portion 91 provided in the slider 61 can be rendered to be a third output end, and the convex portion 92 provided in the slider 85 can be rendered to be a second output end.

The convex portion 89, 90, 91 and 92 provided in the side surface of each of the respective sliders 21, 41, 61 and 85, which will become the corresponding second to fifth output ends, can be extracted to the outside of the holder 11 from a slit or groove provided in the holder 11.

In the motion transmitting device 8 of the structure hereinabove described, when the slider 21 is projected, the sliders and the connecting bodies are successively pushed out. The amount of movement of and the speed of movement of the output end at this time will become the first output end>the second output end>third output end>the fourth output end>the fifth output end. The amount of movement of the fifth output end is identical with the amount L of projection of the slider 21 and the amount of movement and the speed of movement of the output end increase as the number becomes small.

As hereinabove described, the motion transmitting device of the present invention as represented by each of the motion transmitting devices designed respectively according to the first and sixth embodiments is effective to form a speed reducing mechanism or a speed increasing mechanism with the two sliders movable along the slider guide, the connecting body movable along the connecting body guide sandwiched therebetween. For this reason, downsizing and weight reduction are easy to accomplish and only a minimized space is required at the time it is incorporated in any other device or machine such as a robot.

Also, the motion transmitting device of the present invention is capable of changing the amount of movement of the output end relative to the amount of movement of the input end by changing the inclination angle of the connecting body guide for guiding the movement of the connecting body and the inclination angle of the slantwise surface between the slider and the connecting body. Further, the ratio of the amount of movement of the input end and the amount of movement of the output end can be arbitrarily chosen according to the numbers of the slider and the connecting body, and, accordingly, the site of use and the field of application expand. It is to be noted that the motion transmitting device of the present invention is such that not only the amount of movement, but also the speed of movement of the output end relative to the speed of movement of the input end can be changed, and the ratio between the speed of movement of the input end and the speed of movement of the output end can be arbitrarily chosen according to the numbers of the sliders and the connecting bodies.

Also, in the motion transmitting device of the present invention, if the connecting body for direction conversion is used, the direction of movement of the output end relative to the input end can be conveniently changed. In addition, the motion transmitting device of the present invention can set the direction of the output end relative to the direction of the input end to all directions. Further, since the number of output end can be made two or more and the amount of movement of each of the output ends relative to the amount of movement of the input end can be so set as to be different, incorporation into any other device or machine such as, for example a robot is easy to accomplish. Therefore, the motion transmitting device can be used as an equipment incorporated in various devices. Moreover, since the motion transmitting device can be formed as a compact unit, the excellent handlability.

Although in describing the motion transmitting device according to any one of the first to sixth embodiments, the slider 21 and 26 accommodated within the holder 11, 12, 71 and 72 at one end has been described as the input end whereas the slider 46, 61 and 88 accommodated within the holder 11, 12, 71 and 72 at the opposite end portion has been described as the output end, the input end and/or the output end may not necessarily be the slider accommodated within the holder 11, 12, 71 and 72. For example, only the connecting body may be accommodated within the holder and the slider provided outside the holder may be used as the input end and the output end. Also, the motion transmitting device can be constructed even without the holder 11, 12, 71 and 72 where the slider guide and the connecting body guide, that guide the slider and the connecting body, are provided directly within the device. The slider guide and the connecting body guide are not necessarily formed in a single member, but they may be formed straddling over a plurality of members.

Figure 14A:
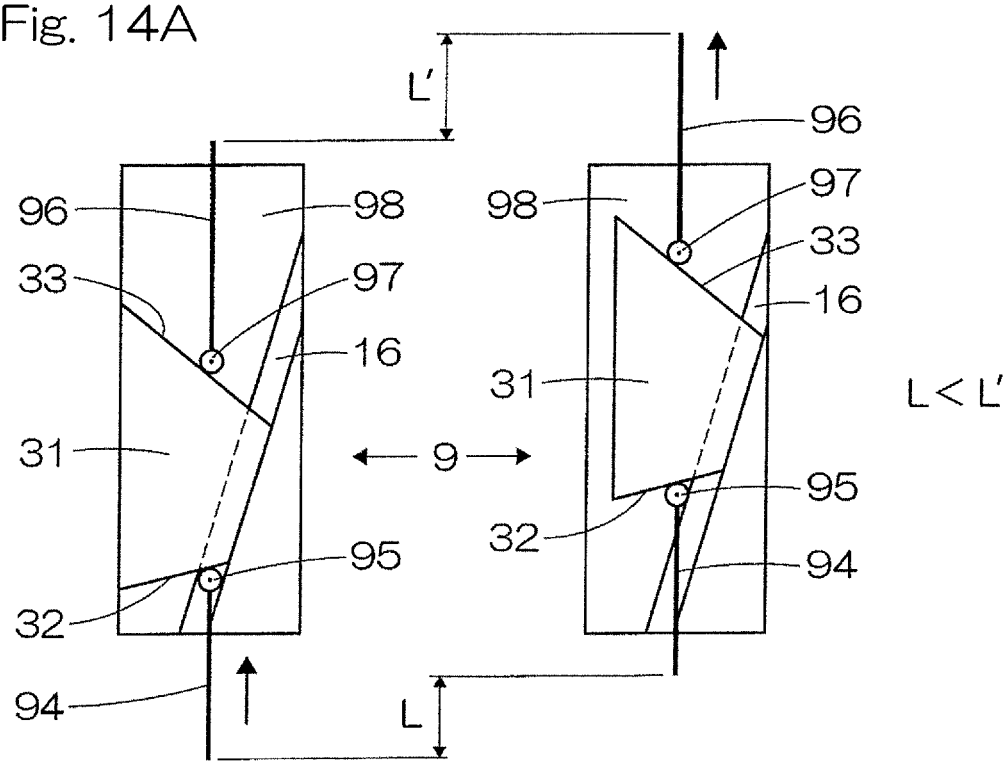
FIGS. 14A and 14B are diagrams used to explain the operation of the motion transmitting device 9 according to a seventh embodiment of the present invention.
Figure 14B:
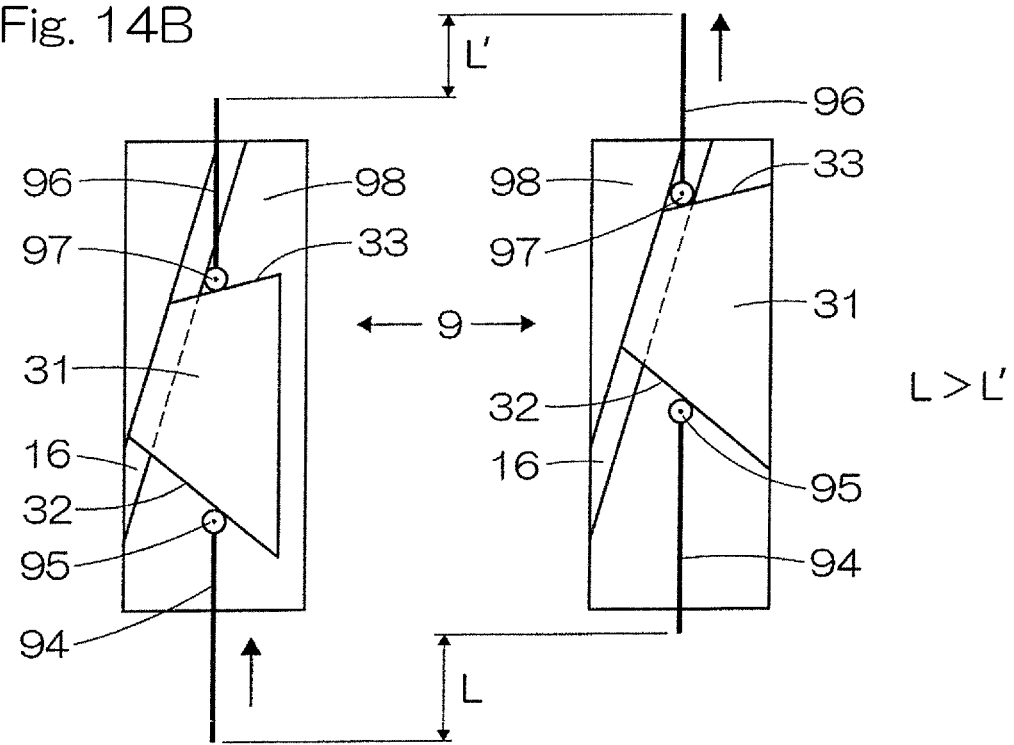

FIGS. 14A and 14B are diagrams used to describe the operation of the motion transmitting device 9 according to a seventh preferred embodiment of the present invention. Structures identical with those employed in any one of the motion transmitting devices 1, 2 and 3 designed in accordance with the first preferred embodiment of the present invention shown in and described with reference to FIGS. 1 to 7C are shown by like reference numerals and, therefore, the details thereof are not reiterated.

The motion transmitting device 9 according to the seventh embodiment includes a slider 94 for projecting the connecting body 31 and a slider 96 that is pushed by the connecting body 31 in place of the slider 21 and 41 employed in the motion transmitting device 1 according to the first embodiment. In this embodiment, the slider 94 corresponds to the input end whereas the slider 96 corresponds to the output end. The slider 94 and the slider 96 undergo the translatory movement along a slider guide not shown.

The slider 94 has a rotatable roller 95 at a tip end portion thereof and is held in sliding contact with the slantwise surface 32 of the connecting body 31. Similarly, the slider 96 has a rotatable roller 97 at a base end portion thereof and is held in sliding contact with the slantwise surface 33 of the connecting body 31. In the motion transmitting device 9, a plate shaped body of the holder 98 is formed with only the slantwise groove 16 which is a connecting body guide.

In FIG. 14A, when the slider 94 is projected a length L, the connecting body 31 slides along the slantwise groove 16 to allow the slider 96 to be projected a length L'. At this time, the relationship of L'>L establishes and the amount of movement of the output end relative to the amount of movement of the input end can be increased.

FIG. 14 B corresponds to a reversion of FIG. 14A. Referring now to FIG. 14B, when the slider 94 is pushed a length L, the connecting body 31 slides along the slantwise groove 16 to allow the slider 96 to be pushed a distance L'. At this time, the relationship of L'<L establishes and the amount of movement of the output end relative to the amount of movement of the input end can be decreased.

As discussed above, if the slider which is provided outside the holder and undergoes the translatory movement to slidably contact the connecting body is rendered to be the input end and the output end, the motion transmitting device of the present invention may be constructed of a single connecting body and a connecting body guide for guiding the connecting body in the forward slantwise direction. While the roller is employed at the tip end portion of the slider 94 and the base end portion of the slider 96 in this embodiment, it is sufficient that the tip end portion of the slider 94 and the base end portion of the slider 96 slidably contact the slantwise surfaces 32 and 33 of the connecting body 31, respectively, and therefore the roller may not necessarily be employed. Also, if the sliders 94 and 96 are prepared from respective members each having a slantwise surface of a large width like the slider 26 or 46 employed in the second embodiment described hereinbefore, the connecting body 31 can be used as an oblique piece of a narrow width such as the connecting body 36 employed in the second embodiment described above.

In the construction of the motion transmitting device of the present invention, considering that at least the input end or the output end that contacts the connecting body is necessary, the minimum construction of the motion transmitting device of the present invention may possibly include one slider and one connecting body. Even in this motion transmitting device of the minimum construction, the amount of displacement and/or the speed of displacement of the output end relative to the input end can be changeable, by changing the inclination angle of the guide for guiding the movement of the connecting body and the inclination angle of the contact surface between the slider and the connecting body, and, therefore, it can be used as a speed increasing machine or a speed reducing machine.

Figure 15:
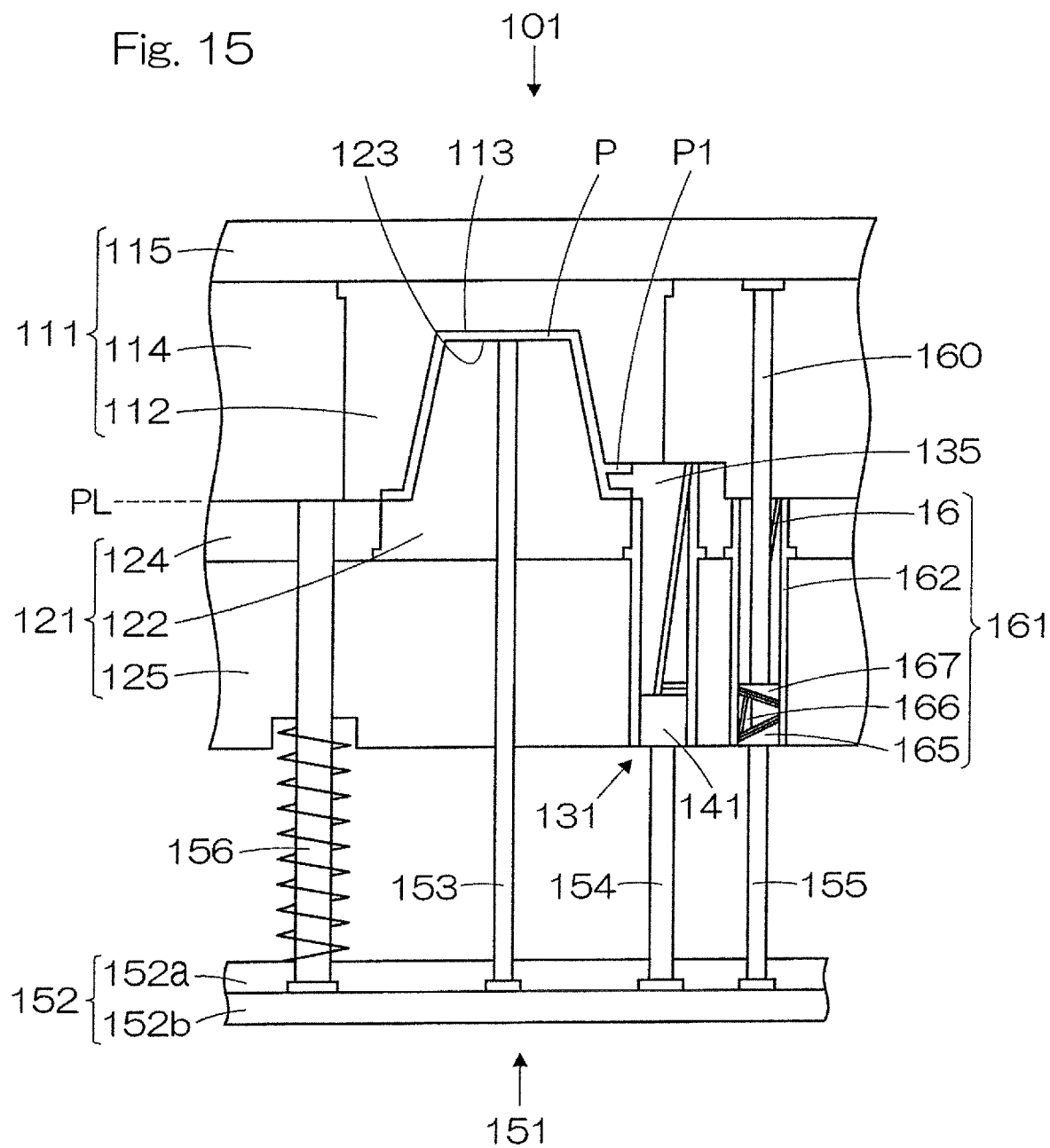
FIG. 15 is a fragmentary structural diagram showing a main section of mold assembly 101 in which the motion transmitting device according to an embodiment of the present invention is employed as a quick returning device 161 for an ejector plate.
Figure 16:
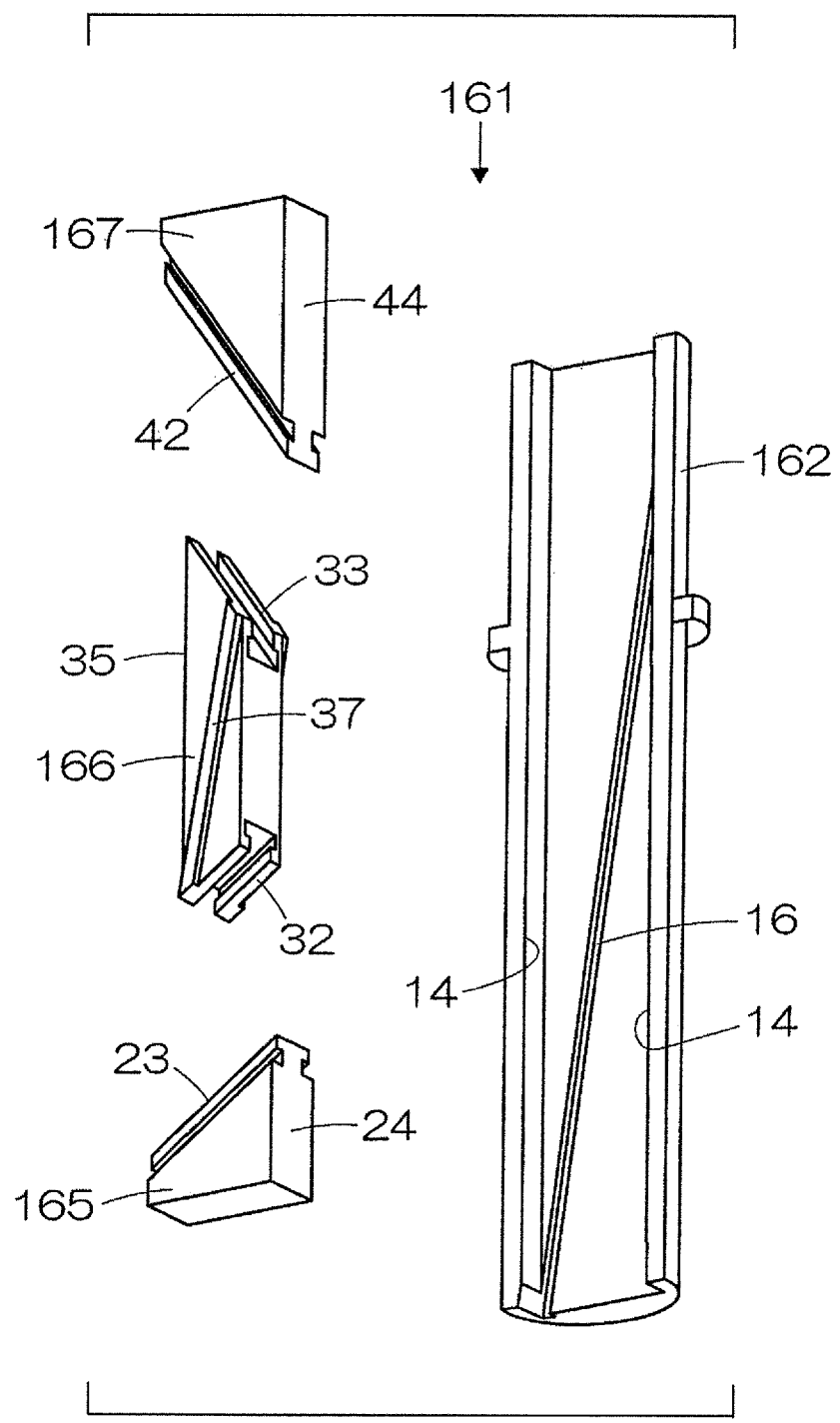
FIG. 16 is an exploded structural diagram showing the quick returning device 161 to return the ejector plate which is used in the mold assembly 101 shown in FIG. 15.

FIG. 15 illustrates a fragmentary structural diagram showing a main section of mold assembly 101 which makes use of the motion transmitting device of the present invention as a quick returning device 161 for an ejector plate, and FIG. 16 is an exploded structural diagram showing the ejector plate quick returning device 161. It is to be noted that half of the holder 162 is not shown in FIG. 16. FIGS. 17 to 21 are diagrams used to explain the operation of the mold assembly 101. Structures identical with those employed in any one of the motion transmitting devices 1, 2 and 3 designed according to the first embodiments of the present invention are shown by like reference numerals and, therefore, the details thereof are not reiterated.

The mold assembly identified generally by 101 is a die assembly used to mold a molded product P having an undercut P1 defined therein and includes a fixed mold (fixed die) 111, a movable mold (movable die) 121, an undercut processing mechanism 131, a pushing mechanism 151, and a quick returning device 161 for an ejector plate for returning an ejector plate 152 back to the original standby position prior to closure of a parting surface PL of the die. The mold assembly 101 according to this embodiment, the undercut processing mechanism 131 and the quick returning device 161 are incorporated in the movable mold 121.

The fixed mold 111 includes a inserter 112 having a cavity 113 defined therein which forms a molding surface, a fixed side molding plate 114 and a fixed side fitting plate 115. To the fixed mold 111, a return pin 160 for returning a piece of the quick returning device 161 to the standby position is fitted.

The movable mold 121 includes an inserter 122 having a core 123 which will define a molding surface, a movable side molding plate 124 and a molding side receiving plate 125. The movable mold 121 has the undercut processing mechanism incorporated therein and the undercut P1 of the molded product P is a projection protruding towards the cavity 113.

The undercut processing mechanism 131 includes a holder 132 accommodated within the movable mold 121, a retaining piece 141 fitted to a tip end of the ejector pin 154 and movable in a protruding direction within the holder 132, and a sliding piece 135 slidably engaged in and pushed out of the retaining piece 141 and movable in a pull-out direction (runout direction) of the undercut P1.

The holder 132 is provided with a slantwise groove (not shown) that is inclined in the pull-out direction of the undercut. The sliding piece 135 has a slantwise surface 137 defined therein which is straightly expanded from a base end portion towards a tip end portion, the base end portion thereof being narrowed to a value smaller than the holder 132. Also, this sliding piece 135 has an undercut forming portion 138 defined at a tip end portion thereof for forming the undercut. An inclined column 139 is provided on opposite sides of the slantwise surface 137 for sliding engagement in a slantwise groove defined in the holder 132. Also, the base end portion is provided with a dovetail groove (not shown) in which a dovetail groove column 142 provided in the retaining piece 141 is slidably engaged. The slantwise column 139 and the dovetail groove column 242 are each in the form of a convex protruding column.

The retaining piece 141 is fitted to a tip end of the ejector pin 154 and is pushed by the ejector pin 154 for sliding movement within the holder 132 in the push-out direction. This retaining piece 141 has an upper surface formed with a dovetail grove column 142 with which a dovetail groove provided in a base end portion of the sliding piece 135 is slidably engaged, in a direction coinciding with a pull-out direction (runout direction) of the undercut P1.

Although in the above-explained embodiment, the slantwise groove is provided in the holder 132 and the inclined column 139 is provided in the sliding piece 135, the inclined column 132 may be provided in the holder 132 and the slantwise groove may be provided in the sliding piece 135. Also, although in the above-explained embodiment, the dovetail groove is provided in the base end portion of the sliding piece 135 and the dovetail groove projection 142 is provided in the upper surface of the retaining piece 141, the dovetail groove projection may be provided in the base end portion of the sliding piece 135 and the dovetail groove may be provided in the upper surface of the retaining piece 141. In summary, it is sufficient if they are slidably engaged with each other.

A pushing mechanism 151 is a device for pushing the molded product P, the undercut processing mechanism 131 and the quick returning device 161 and includes an ejector plate 152, an ejector pin 153 for pushing the molded product P, an ejector pin 154 for pushing the undercut processing mechanism 131, an ejector pin 155 for pushing the quick returning device 161, and a return pin 156 for returning the pushing mechanism 151 to a position preceding an initial push-out.

The ejector plate 152 is constituted of two upper and lower plates 152a and 152b, and the ejector pins 153, 154 and 155 and the return pin 156 have their collar portions that are fixedly sandwiched by the upper and lower ejector plates 152a and 152b. The ejector pin 154 has defined therein a male threaded portion, which is threadingly engageable with the retaining piece 141 in the undercut processing mechanism 131, and the ejector pin 155 has defined therein a male threaded portion which is threadingly engageable with a slider 165 at a bottom portion of the quick returning device 161.

The quick returning device 161 makes use of a motion transmitting device of a construction, which is similar in structure to that of the motion transmitting device 1 according to the previously described first embodiment, and includes a holder 162 adapted to be accommodated within the movable mold 121, the slider 165 fitted to a tip end of the ejector pin 155 and adapted to be moved within the holder 162 in the push-out direction, a connecting body 166 slidably engaged with the slider 165 and movable in a forward diagonal direction relative to the push-out direction, and a slider 167 engageable with the connecting body 166 and movable in the push-out direction.

The holder 162, slider 165, connecting body 166 and slider 167 of the quick returning device 161 correspond respectively to the holder 11, slider 21, connecting body 31 and slider 41 of the motion transmitting device 1 according to the previously described first embodiment. When the quick returning device 161 and the motion transmitting device 1 are compared with each other, the numbers of the sliders and connecting bodies and the dispositions of the dovetail groove and the dovetail groove column are different, but the basic construction are identical to the quick returning device 161 and the motion transmitting device 1.

Figure 18:
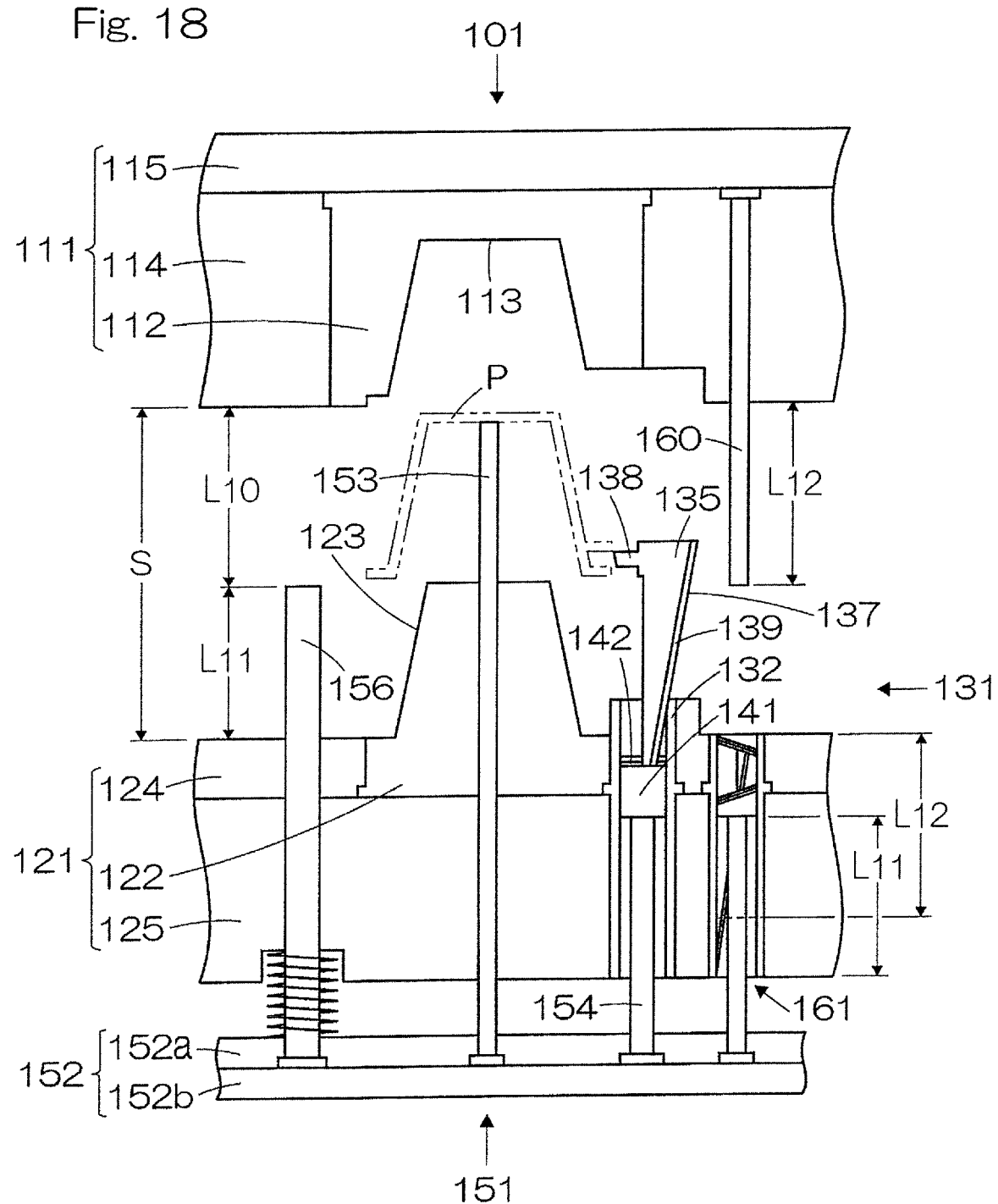
FIG. 18 is a diagram used to explain the operation of the mold assembly 101 shown in FIG. 15.
Figure 21:
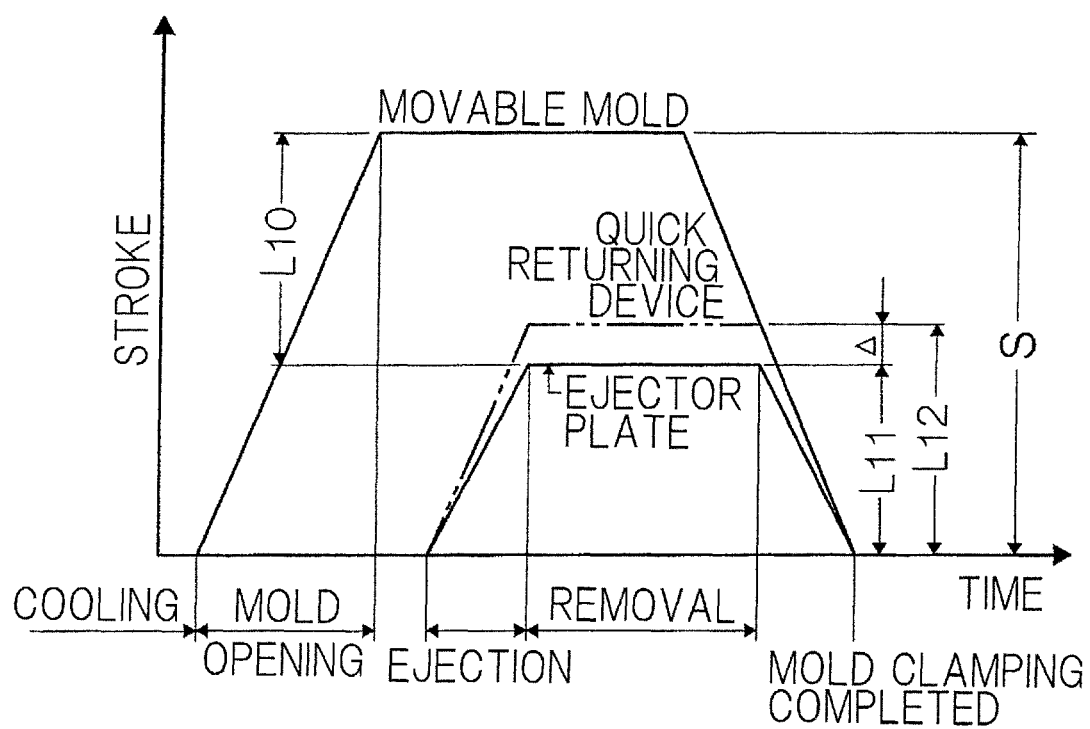
FIG. 21 is a diagram used to explain the operation of the mold assembly 101 shown in FIG. 15.

Assuming that the removal space is $L_{10}$, the ejecting stroke is $L_{11}$, the quick returning stroke is $L_{12}$, the mold opening stroke is S, the quick returning amount is A, and the stroke ratio is $L_{12}/L_{11}$, the relationship of them can be expressed by the following equations (2) to (4) (See FIGS. 18 and 21).

$$S = L_{10} + L_{11} \tag{2}$$

$$A = L_{12} - L_{11} \tag{3}$$

$$L_{12}/L_{11} > 1.0 \tag{4}$$

In the description that follows, using an example in which the mold assembly 101 is used as a mold assembly for injection molding, the operation of the mold assembly 101 and the quick returning device 161 will be described with particular reference to FIGS. 15 to 21.

Molten resin is filled in the mold assembly 101 that has been clamped. In the clamped state, the slider and the connecting body are in a most constricted state in the quick retuning device 161, where the slider and the connecting body are urged towards the ejector plate 152 by a return pin 160 which is fitted to the fixed mold 111 (See FIG. 15).

Figure 17:
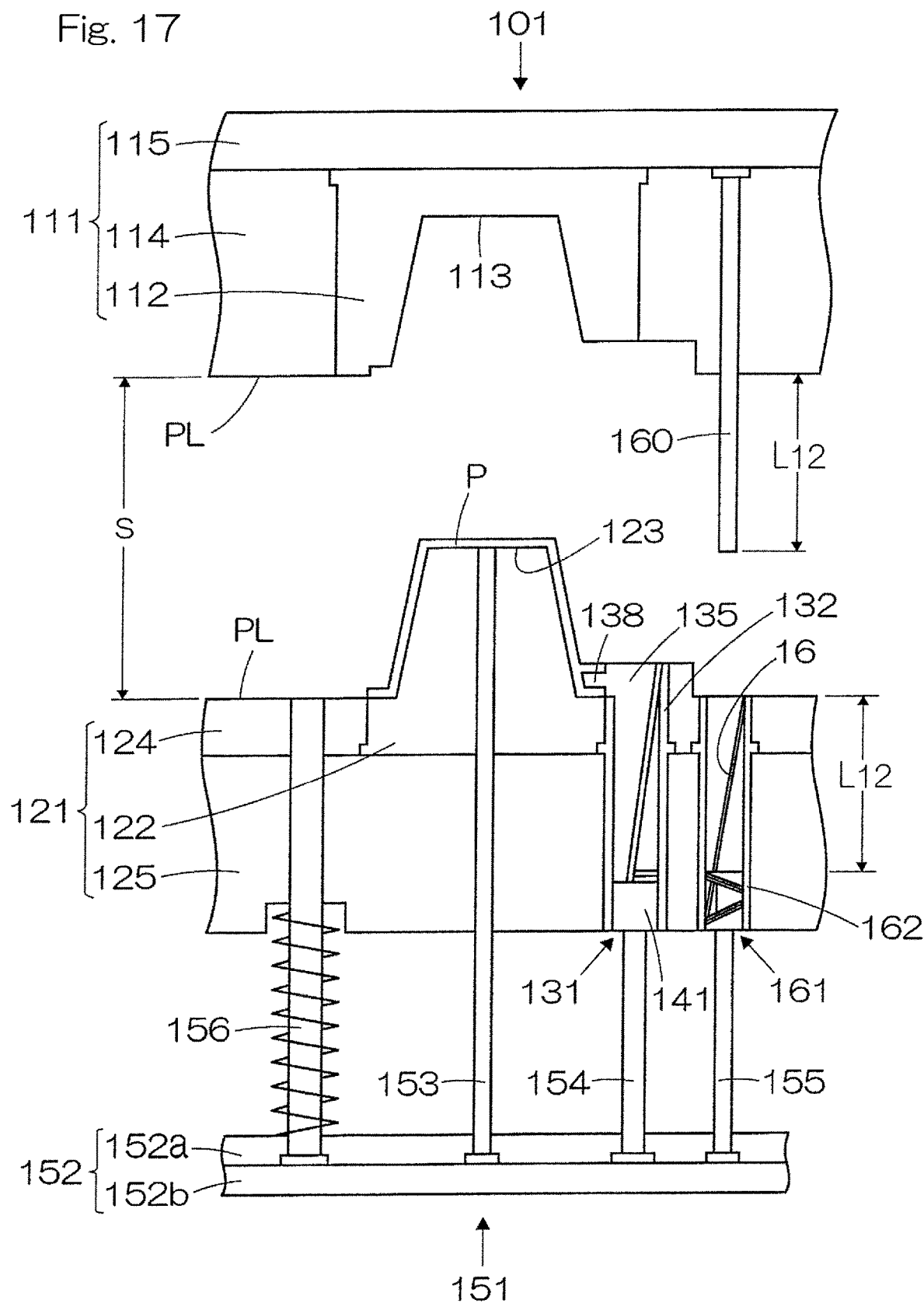
FIG. 17 is a diagram used to explain the operation of the mold assembly 101 shown in FIG. 15.

After cooling, the movable mold 121 is retracted to open the mold assembly (See FIG. 17). After the mold opening has taken place, the quick returning device 161 and the return pin 160 are separated, but the quick returning device 161 remains held in a state assumed when the mold assembly is clamped. No movement take place also in the undercut processing mechanism 131.

Thereafter, the pushing mechanism 151 operates to push the molded product P. Incident to the pushing operation, the molded product P separates from the core 123 and, at the same time, the undercut forming portion 138 goes away in a direction perpendicular to the pushing direction. Thereby, the removal of the molded product P can be carried out (See FIG. 18). Simultaneously, the quick returning device 161, too, is pushed out by the ejector pin 155 and the slider and the connecting body move in a direction towards the fixed mold 111.

When the slider 165 of the quick returning device 161 is pushed by the ejector pin 155, the connecting body 166 and the slider 167 are successively moved in a direction towards the fixed mold 111. The amount of movement of the slider 167 at this time has become larger than the amount of movement of the slider 165.

Figure 19:
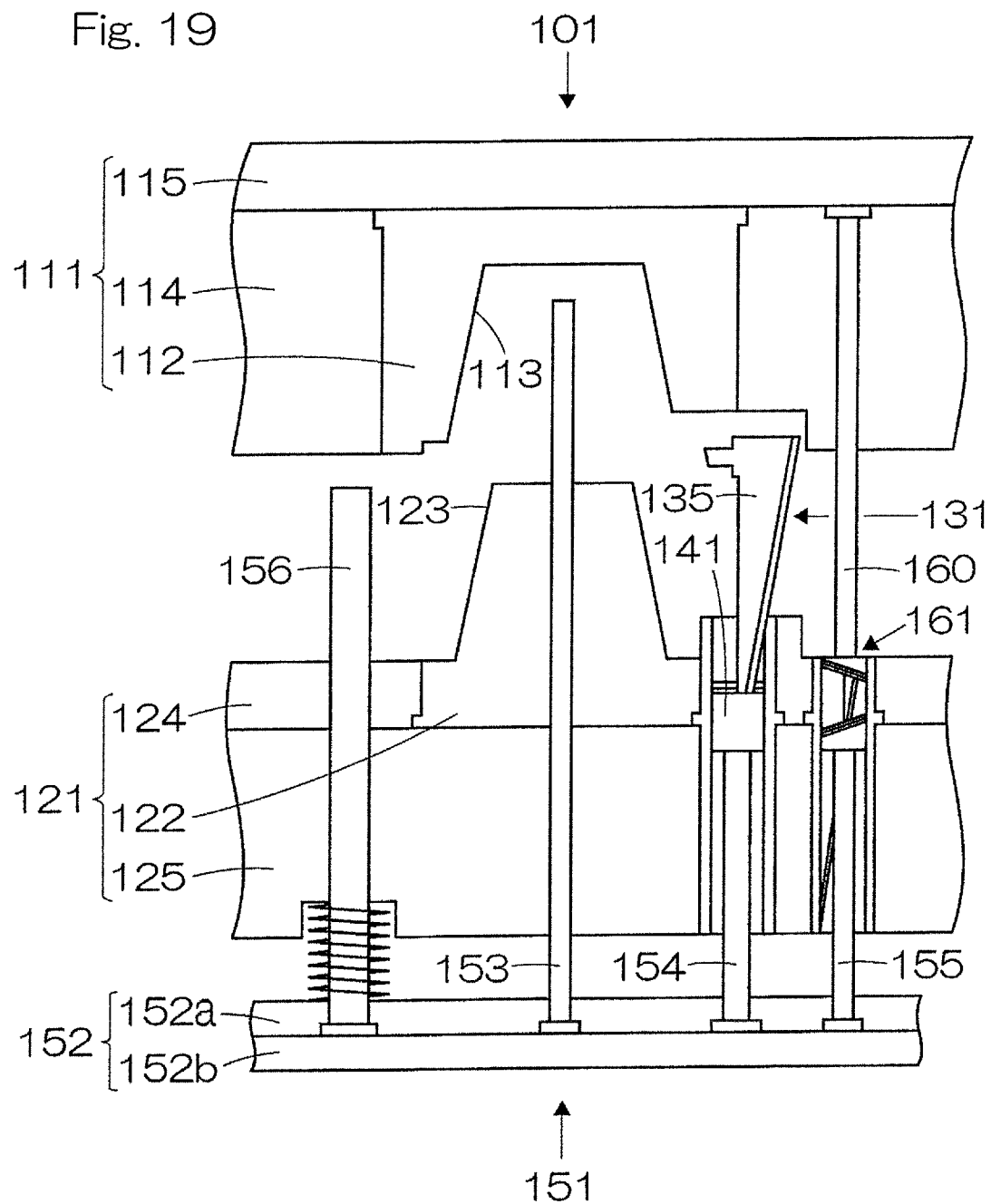
FIG. 19 is a diagram used to explain the operation of the mold assembly 101 shown in FIG. 15.
Figure 20:
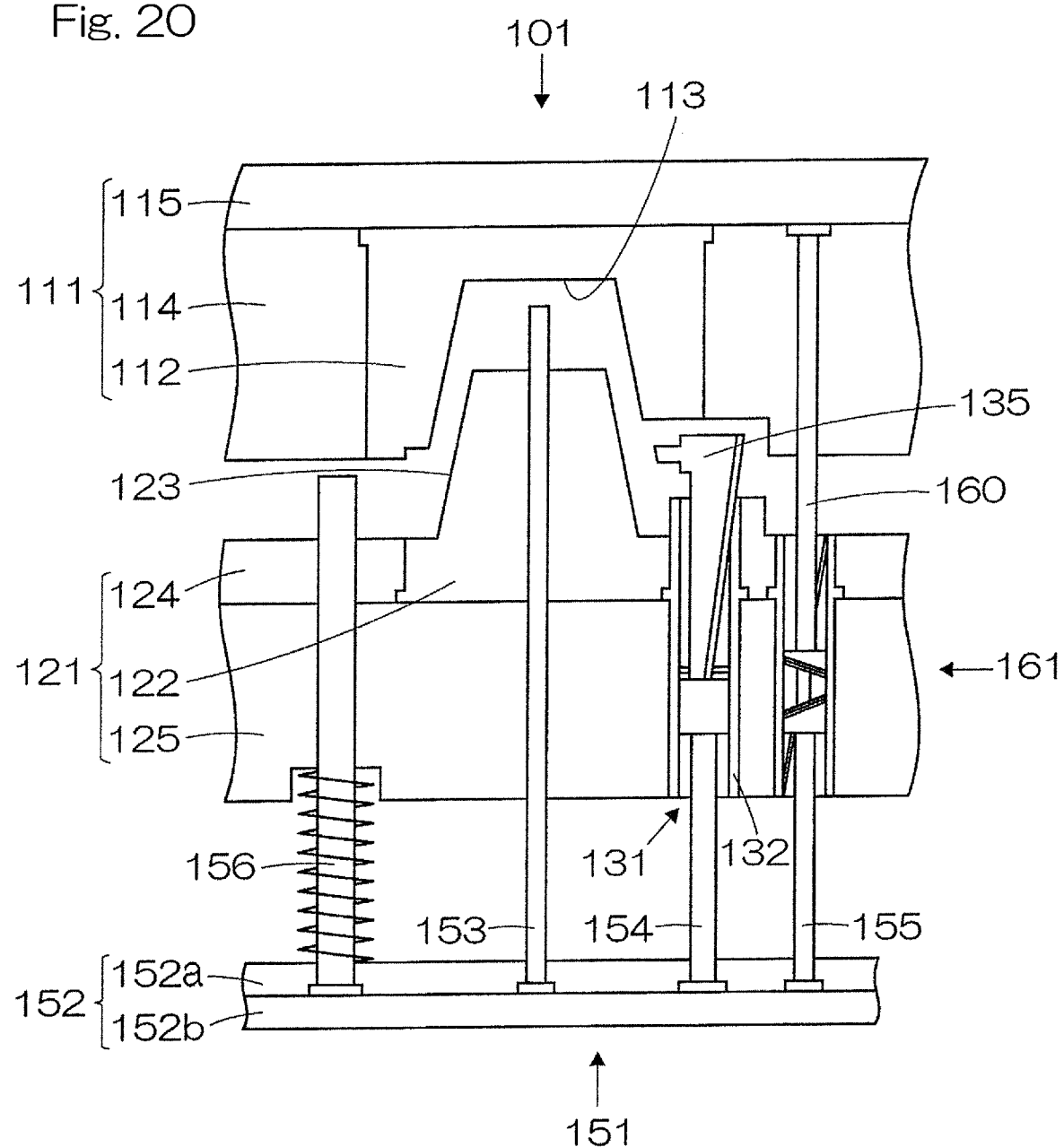
FIG. 20 is a diagram used to explain the operation of the mold assembly 101 shown in FIG. 15.

The mold assembly 101 is subjected to a mold clamping operation subsequent to the removal of the molded product P. FIG. 18 is a diagram showing a state immediately after the removal of the molded product P and FIG. 19 is a diagram showing the halfway of the mold clamping. During the mold clamping operation, as the movable mold 121 approaches the fixed mold 111, the tip end portion of the return pin 160 comes to contact the tip end portion of the slider 167 of the quick returning device 161. At this time, the tip end of the sliding piece 135 of the undercut processing mechanism 131, the ejector pin 153 and the return pin 156 do not contact the fixed mold 111.

This is because, when the quick returning device 161 causes the quick returning device 151 to operate in the manner described as hereinabove described, the undercut processing mechanism 131 moves the same quantity as the amount of movement of the ejector pin 154, whereas the slider 167 moves more than the amount of movement of the ejector pin 155.

Incident to the mold clamping, the slider and the connecting body of the quick returning device 161 are pushed back to the original positions by the return pin 160, but at the same time the ejector plate 152 is pushed back (See FIG. 20) through the ejector pin 155 connected with the slider 165. For this reason, by the time the mold clamping terminates completely, the tip end of the sliding piece 135 of the undercut processing mechanism 131 will not contact the fixed mold 111.

In the quick returning device 161, the amount of movement of the slider 165 which will become the output shaft is smaller than the amount of movement of the slider 167 which will become the input shaft during the operation of the mold clamping. For this reason, the space between the tip end of the sliding piece 135 of the undercut processing mechanism 131 and the fixed mold 111 is the largest when the tip end portion of the return pin 160 is brought into contact with the tip end portion of the slider 167, and this space gradually decrease with the mold clamping operation and will become zero upon completion of the mold clamping. The quick returning device 161, too, returns to the initial position at the time of completion of the mold clamping (See FIG. 21).

Where no quick returning device 151 exist, the sliding piece 135 of the undercut processing mechanism 131 is depressed downwardly with the tip end portion held in sliding contact with the fixed mold 111 and, therefore, it may possibly be damaged. In contrast thereto, the mold assembly 101 can cause the quick returning device 161 to return the undercut processing mechanism 131 to the initial position without contacting the fixed mold 111 and, therefore, any undesirable damage to the mold assembly can be avoided.

Figure 22:
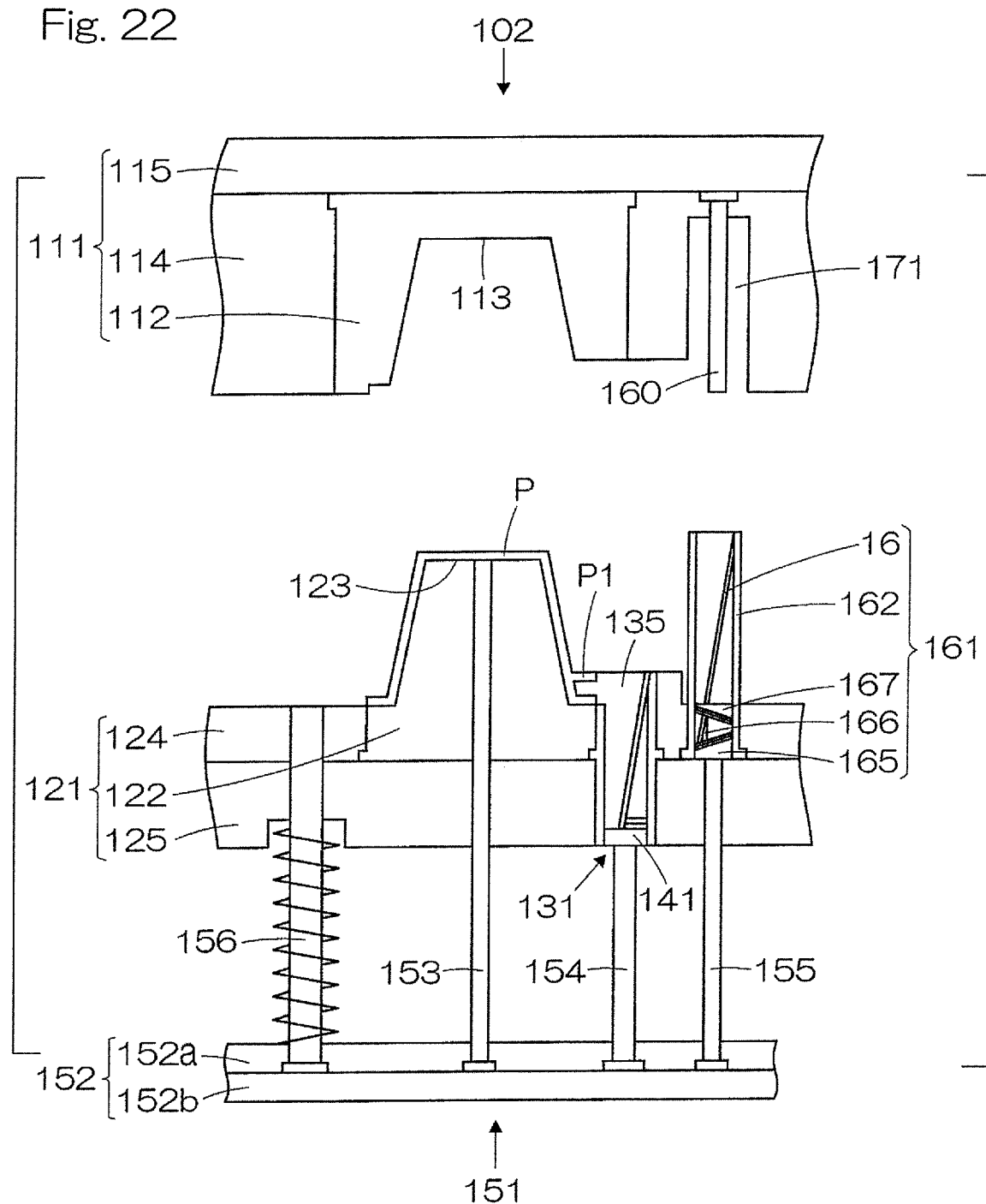
FIG. 22 is a fragmentary structural diagram showing a main section of the mold assembly 102 in which the motion transmitting device according to an embodiment of the present invention is used as the quick returning device 161 for the ejector plate.

FIG. 22 is a fragmentary structural diagram showing a main section of the mold assembly 101 equipped with the motion transmitting device of the present invention as a quick returning device 161 for the ejector plate. Structures identical with those of the mold assembly 101 shown in and described with reference to FIGS. 15 to 21 are shown by like reference numerals and, therefore, the details thereof are not reiterated.

The mold assembly 102 makes use of the quick returning device 161 for the ejector plate in a manner similar to the mold assembly 101. The mold assembly 102 is featured in that as compared with the mold assembly 101 the position of installation of the quick returning device 161 is altered and, also, the thickness of the movable mold 121 is reduced. Structures of the mold assembly 102 and the quick returning device 161 are identical with those of the mold assembly 101.

In the mold assembly 102, the holder 162 of the quick returning device 161 is such that a lower portion is accommodated within a movable side mold plate 124 and a portion upper than a center portion protrudes from the movable mold 121. Consequently, the fixed side mold plate 114 is provided with a recessed portion 171 for accommodating the holder 162 that protrudes from the movable mold 121. The mold assembly 102 functions in the same manner as the mold assembly 101.

Figure 23:
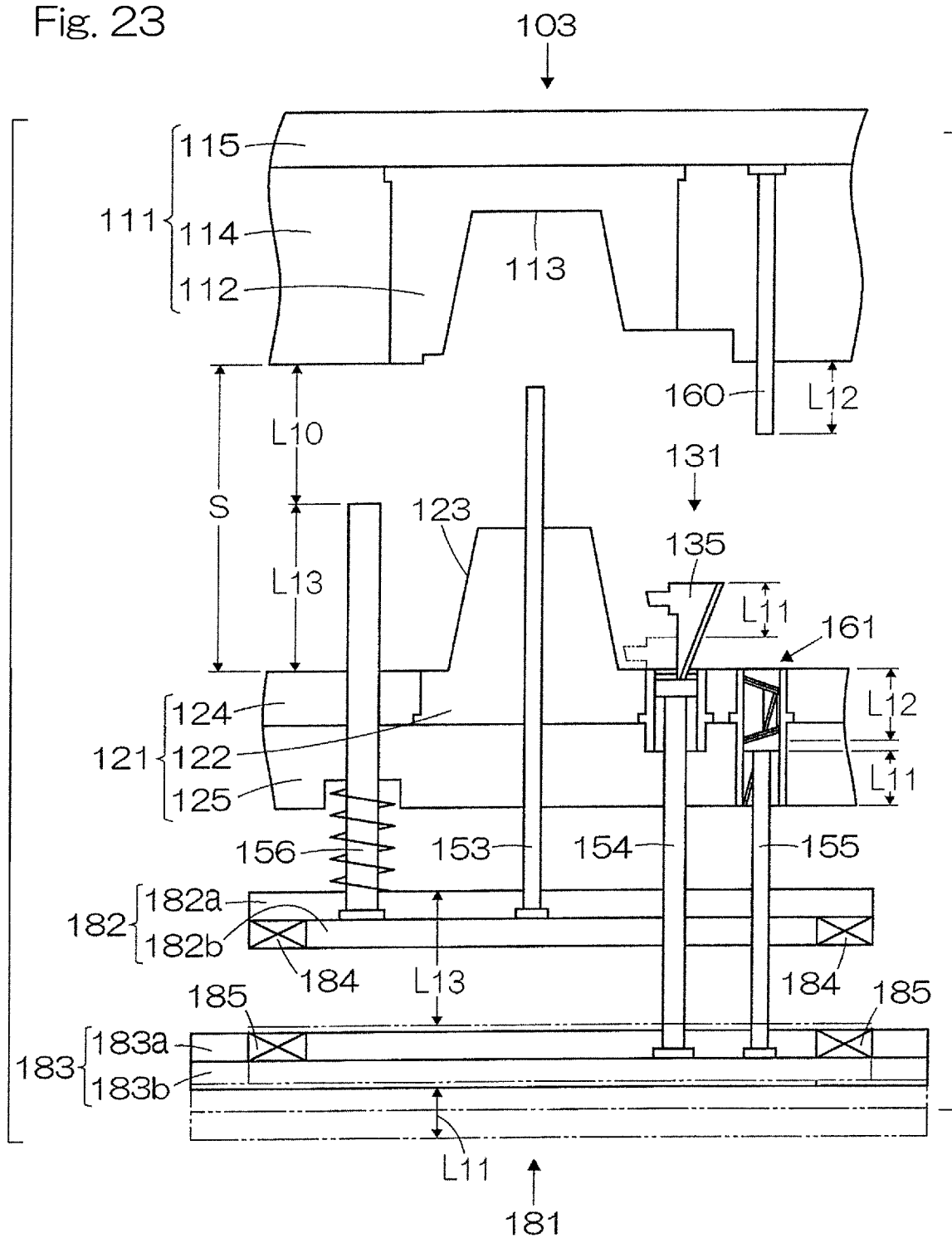
FIG. 23 is a fragmentary structural diagram showing a main section of the mold assembly 103 in which the motion transmitting device according to an embodiment of the present invention is used as the quick returning device 161 for the ejector plate.

FIG. 23 is a fragmentary structural diagram showing a main section of the mold assembly 103 in which the motion transmitting device of the present invention is employed as the quick returning device 161 for the ejector plate. Structures identical with the hose of the mold assembly 101 shown in and described with reference to FIGS. 15 to 21 are shown by like reference numerals and, therefore, the details thereof are not reiterated.

The mold assembly 103 is a mold assembly provided with a two stage ejecting mechanism 181 and, as is the case with the mold assembly 101, the motion transmitting device is used as the ejector plate quick returning device 161. Also, the mold assembly 103 is provided with the undercut processing mechanism 131 so that the molded produce P having an undercut P1 can be made, and other structures than the ejecting mechanism are the same as those in the mold assembly 101.

The two stage ejecting mechanism 181 is a magnet type two stage ejecting mechanism and includes upper and lower staged ejector plates 182 and 183. The ejector plate upper stage 182 and the ejector plate lower stage 183 are each constituted of two, i.e., upper and lower ejector plates 181a and 182b, 183a and 183b, and an ejector pin 153 and a return pin 156 are fixed with respective collar portions sandwiched by the upper and lower ejector plates 181a and 182b and the ejector pin 154 and the ejector pin 155 are fixed with respective collar portions fixedly sandwiched by the upper and lower ejector plates 183a and 183b.

The ejector plate upper stage 182 is provided with a throughhole (not shown) for passage of the ejector pin 154 and the ejector pin 155 therethrough. Also, the ejector plate 182b and the ejector plate 183a are fitted respectively with magnets 184 and 185 which magnetically attract with each other.

The operation of the two stage ejecting mechanism 181 is the same as that of the known magnet type two stage ejecting mechanism and the ejecting stroke $L_{11}$ and others are such as shown in FIG. 23. In this figure, $L_{11}$ represents the amount of ejecting stroke during the first stage, $L_{12}$ represents the amount of quick returning stroke, $L_{13}$ represents the amount of ejecting stroke during the second stage and S represents an amount of mold opening stroke.

As hereinbefore described, the mold assembly which utilizes the motion transmitting device of the present invention as the quick returning device for the ejector allows the mold assembly to be downsized since the motion transmitting device, which is the quick returning device for the ejector plate, is compact. Also, the motion transmitting device of the present invention is highly reliable because of its simple structure and simple operation mechanism, and thereby ensuring the quick returning of the ejector plate.

Figure 24A:
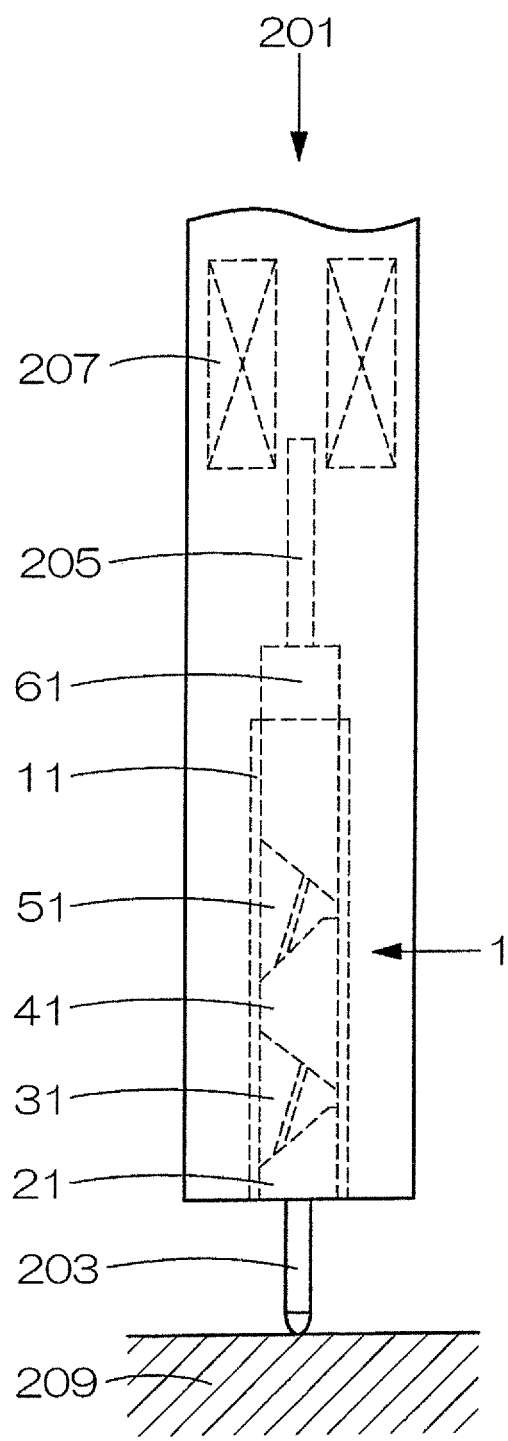
FIGS. 24A and 24B are diagrams showing a state of the motion transmitting device according to an embodiment of the present invention incorporated in a contact type displacement sensor 201.
Figure 24B:
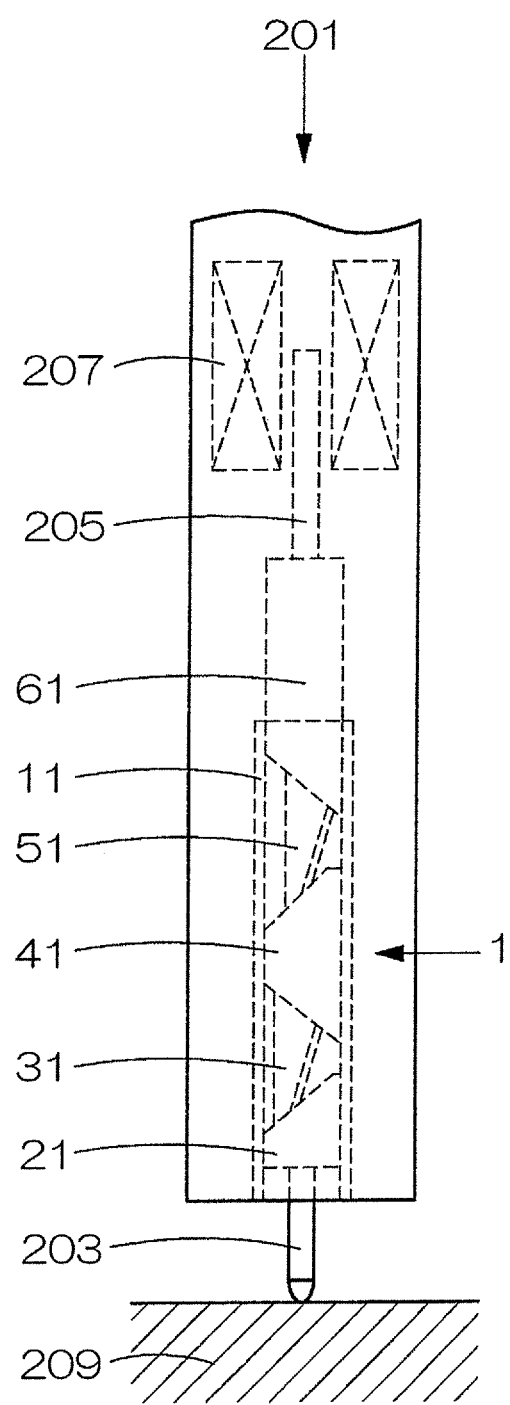

FIGS. 24A and 24B are diagrams showing the motion transmitting device of the present invention incorporated in a contact type display sensor assembly 201. Structures identical with those of any one of the motion transmitting device 1, 2 and 3 according to the first embodiment shown in and described with reference to FIGS. 1 to 7C, are shown by like reference numerals and, therefore, the details thereof are not reiterated.

The contact type displacement sensor assembly 201 is a so-called a contact type displacement sensor of a wrap transformer system and is operable to measure the amount of movement (displacement) of a measuring object 209 held in contact with a probe 203 provided at a tip end of the sensor. As shown in FIG. 24B, in the contact type displacement sensor assembly 201, in accordance with movement of the measuring object 209, probe 203 is pushed in to insert an inside core 205 into a coil 207. The, an amount of change of the impedance of the coil 207 corresponding to the amount of insertion of the core 205 into the coil 207 is converted into the amount of movement.

As shown in FIGS. 24A and 24B, when the motion transmitting device 1 according to the first embodiment is incorporated between the probe 203 and the core 205, the amount of insertion of the core increases relative to the amount of pushing in the probe 203. Accordingly, it becomes possible to improve the resolution of the contact type displacement sensor 201.

It is to be noted that the contact type displacement sensor 201 may not be necessary limited to the wrap transformer system. For example, the motion transmitting device of the present invention may be incorporated in a contact type displacement sensor of differential transformer system, an optical linear encoder and others. Thus, the contact type displacement sensor 201 can be used in, for example, measuring the amount of depressing a bicycle pedal.

Figure 25A:
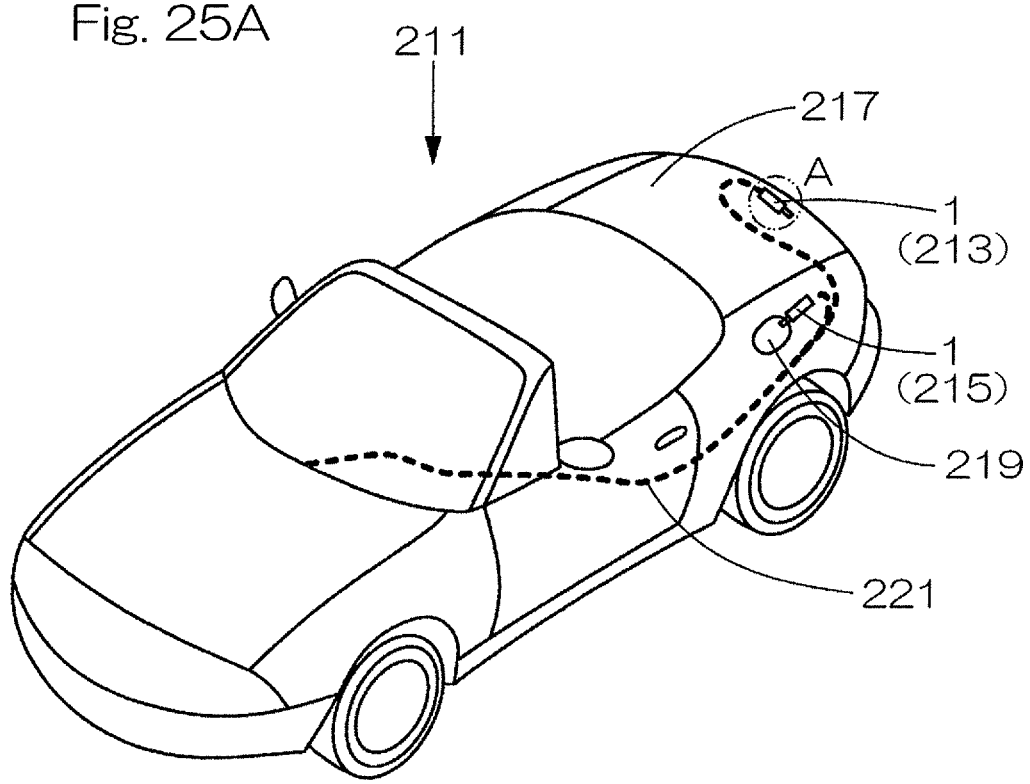
FIGS. 25A and 25B are diagrams showing a state of the motion transmitting device according to an embodiment of the present invention as incorporated in a trunk opener 213 and a fuel lid opener 215 both employed in an automotive vehicle 211.
Figure 25B:
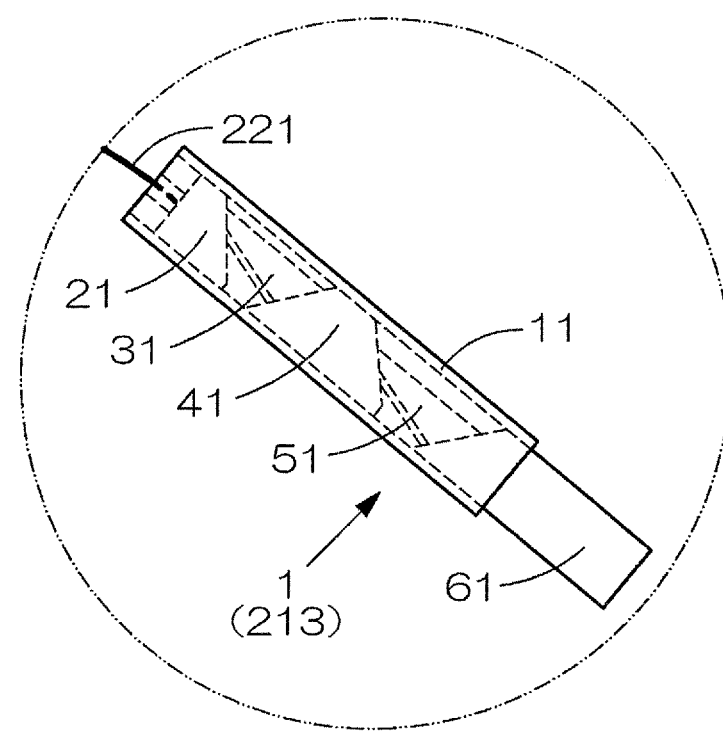

FIGS. 25A and 25B are diagrams showing a state in which the motion transmitting device of the present invention is incorporated in a trunk opener 213 and a fuel lid opener 215 of an automotive vehicle 211. FIG. 25B is a diagram showing an A portion of FIG. 25A. Structures identical with those of any one of the motion transmitting device 1, 2 and 3 according to the first embodiment shown in and described with reference to FIGS. 1 to 7C, are shown by like reference numerals and, therefore, the details thereof are not reiterated.

The trunk opener 213 and the fuel lid opener 215 are mechanisms for opening and closing a trunk 217 and a lid 219 for an oil filler port, respectively, and are so configured as to open the trunk 217 or the lid 219 of the oil filler port when a pull lever (not shown) in a driver seat is pulled.

The motion transmitting device 1 is used in a portion for locking the trunk 217 and the oil filler port lid 219. A wire 221 for transmitting a movement of the pull lever is fixed to the slider 21 on the base end side. The trunk 217 and the oil filler port lid 219 are locked by the slider 61 at the tip end side in a state with the slider 21 on the base end side pressed in. It is to be noted that a point ahead of the slider 61 at the tip end is provided suitably with a lock mechanism not shown.

When the pull lever is pulled, the slider 21 on the base end side is pulled through the wire 221 and, in driving association therewith, the slider 61 at the tip end is moved towards the base end side with the trunk 217 or the oil filler port lid 219 unlocked and, therefore, the trunk 217 or the oil filler port lid 219 is brought to an opened state. Since the slider 61 at the tip end considerably moves a quantity larger than the amount of movement of the slider 21 on the base end side, incorporation of the motion transmitting device 1 into the trunk opener 213 and the fuel lid opener 215 is effective to open the trunk 217 or the oil filler port lid 219 with a slight amount of movement of the pull lever.

While the slider undergoes the transitory movement along the slider guide in the motion transmitting device shown by the foregoing embodiment and the mold assembly and others incorporated with the motion transmitting device, the slider in the motion transmitting device of the present invention is not necessarily limited to that undergoing the transitory movement. In the following description, the motion transmitting device equipped with a slider that moves along a curved slider guide will be explained.

Figure 26A:
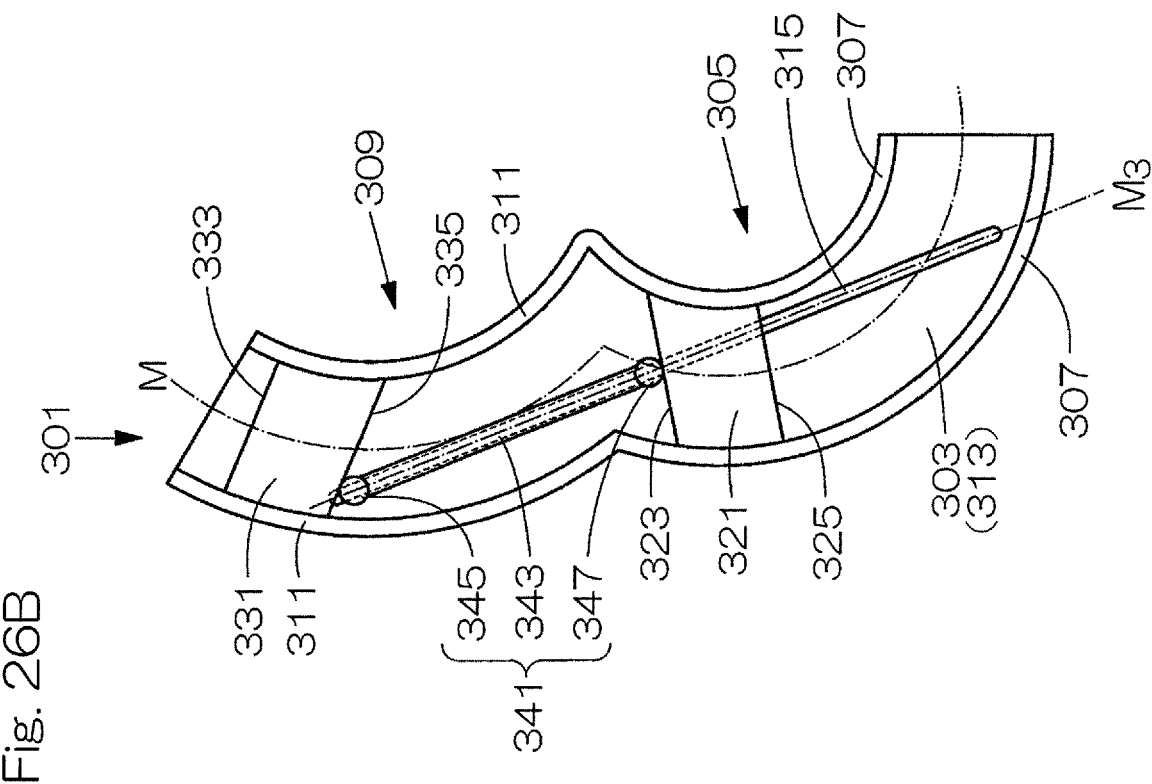
FIGS. 26A and 26B are structural diagrams showing the motion transmitting device 301 according to an eighth embodiment of the present invention.
Figure 26B:
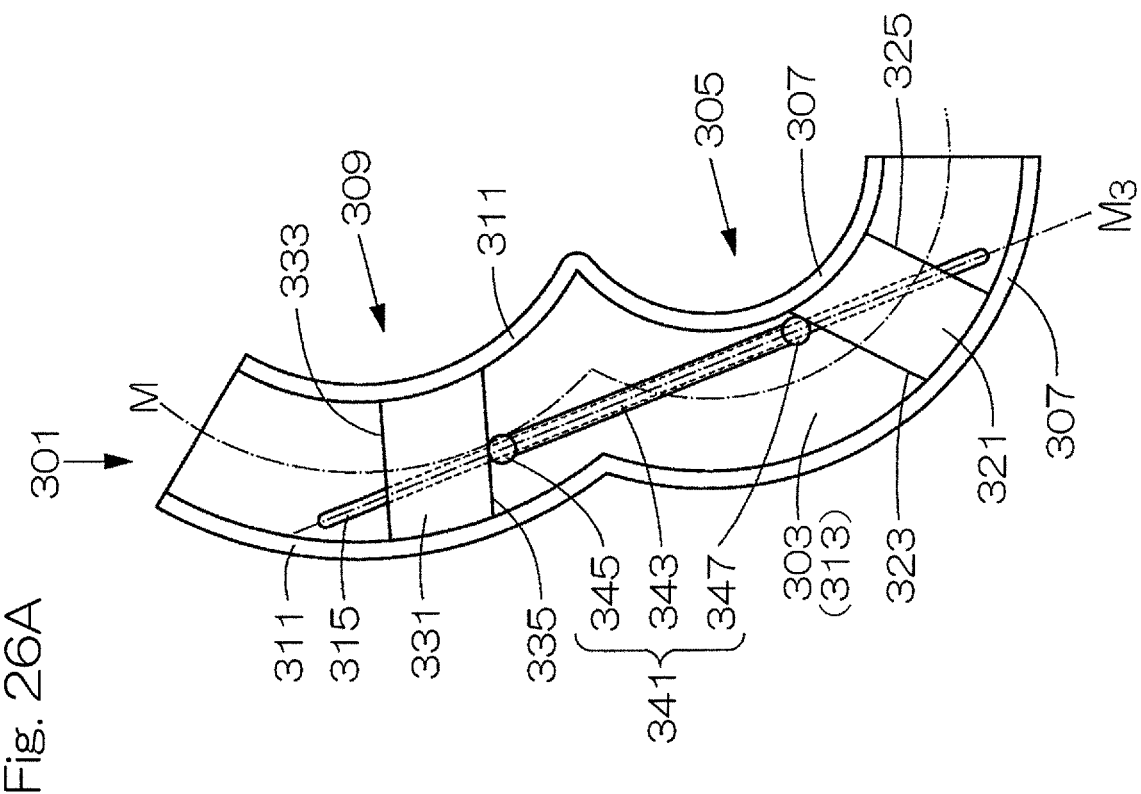

FIGS. 26A and 26B are structural diagrams showing the motion transmitting device 301 according to an eighth embodiment of the present invention, in which (A) illustrates a state before a slider 321 is moved and (B) illustrates a state after the slider 321 has been moved. In this instance, the description proceeds with the slider 321 used as the input end and a slider 331 used as the output end. Structures identical with those of any one of the motion transmitting device 1, 2, 3, 4, 5, 6, 7, 8 and 9 according to the first to seventh embodiments, are shown by like reference numerals and, therefore, the details thereof are not reiterated.

In a manner similar to the motion transmitting device 1 of the first embodiment, the motion transmitting device 301 includes a holder 303 for accommodating the slider and the connecting body, the sliders 321 and 331 movable within the holder 302 along the slider guide, and a connecting body 341 disposed between the slider 321 and the slider 331 for movement along the connecting body guide.

In the front view, the holder 303 has a shape in which two arcuate portions 305 and 309 are connected together. While the arcuate portion 309 has a radius of curvature that is larger than the radius of curvature of the arcuate portion 305 in this embodiment, the radius of curvature of the arcuate portion 309 and the radius of curvature of the arcuate portion 305 may be the same or, conversely, the radius of curvature of the arcuate portion 309 may be smaller than the radius of curvature of the arcuate portion 305.

The arcuate portion 305 has opposite side surfaces 307 that are parallel to each other and those side surfaces 307 form a slider guide for the slider 321. Similarly, the arcuate portion 309 also has opposite side surface 311 that are parallel to each other and those side surfaces 311 form a slider guide for the slider 331. Also, the holder 303 has a rear surface 313 provided with a slantwise groove 315 that forms a guide for the connecting body 341. In this embodiment, the slantwise groove 315, which is the connecting body guide, is of a straight shape and is so provided as to straddle between the two arcuate portions 305 and 309. A center axis line M of the opposite side surfaces 307 and a center axis line M of the opposite side surfaces 311 are arranged as to intersect a center axis line $M_3$ of the slantwise groove 315.

The slider 321 is a flat plate shaped member having a small thickness. The opposite side surfaces of the slider 321 when viewed from top is of an arcuate shape having the radius of curvature that is the same as the radius of curvature of the opposite side surface 307 of the holder 303 and an upper surface 323 and a lower surface 325 are of a straight shape. Similar to the slider 321, the slider 331 is also a flat plate shaped member having a small thickness and opposite side surfaces when viewed from top is of an arcuate shape having the radius of curvature that is the same as the radius of curvature of the opposite side surface 311 of the holder 303 and an upper surface 333 and a lower surface 335 are of a straight shape.

In the connecting body 341, a round sectioned columnar members 345 and 347 are fitted to upper and lower end portions, respectively, of a rod shaped member 343. Also, the rod shaped member 343 has a bottom surface provided with a convex projection (not shown) engageable in the slantwise groove 315 and the connecting body 341 moves with the convex projection sliding within the slantwise groove 315.

In the motion transmitting device 301, when the slider 321 is moved towards the slider 331, the slider 331 is pressed through the connecting body 341. The amount of movement or the speed of movement of the slider 331 relative to the amount of movement or the speed of movement of the slider 321 can be reduced, made equal to or be increased by changing the radius of curvature of the arcuate portions 305 and 309, or the angle of the center axis line $M_3$ of the connecting body guide about the center axis line M of the slider guide, or the inclination angle of the upper surface 323 and/or the lower surface 325 of the slider 321 relative to the connecting body 341, and the inclination angle of the upper surface 333 an/or the lower surface 335 of the slider 331 relative to the connecting body 341.

Figures 27A, 27B:
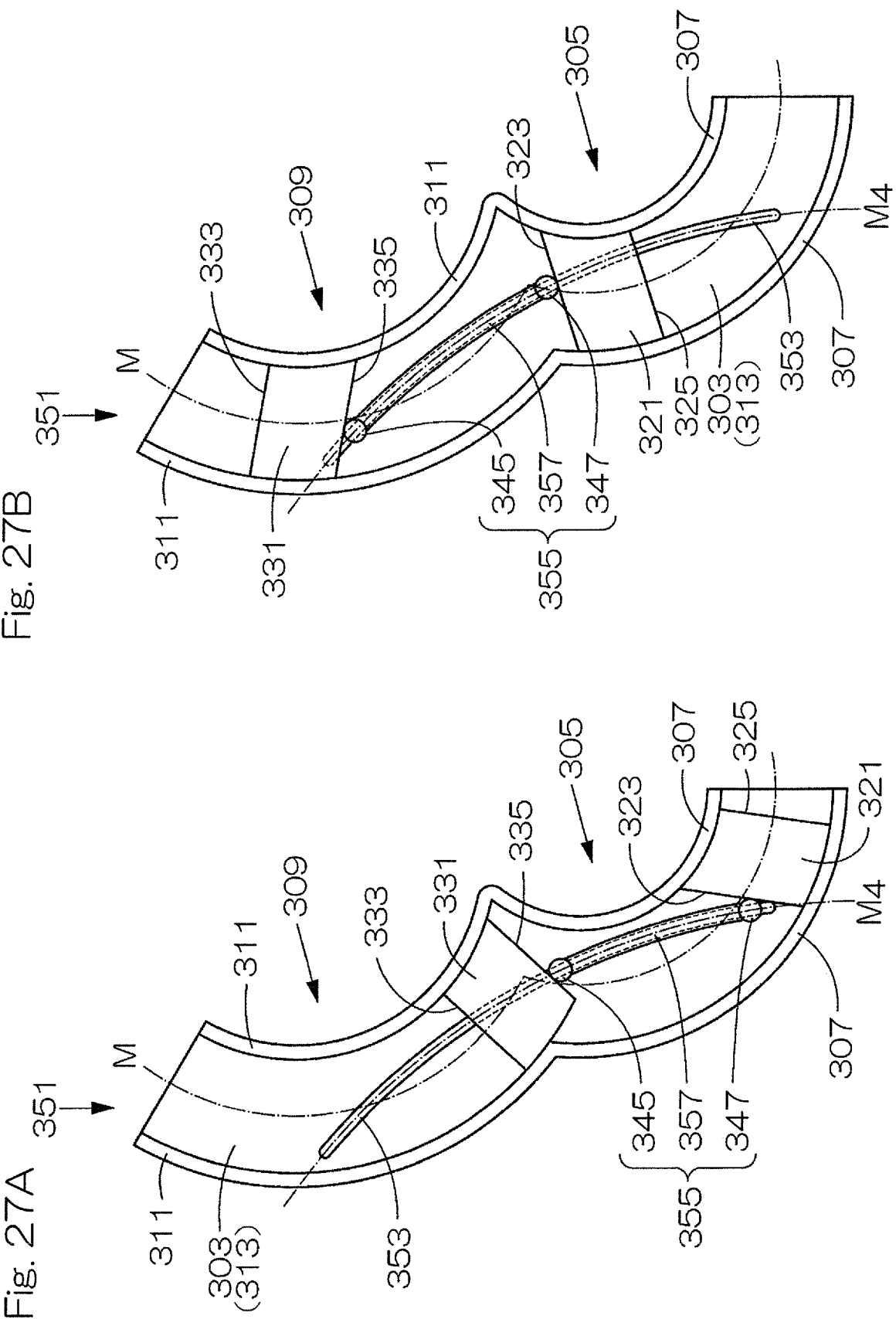
FIGS. 27A and 27B are structural diagrams showing the motion transmitting device 351 according to a ninth embodiment of the present invention.

FIGS. 27A and 27B are structural diagrams showing the motion transmitting device 351 according to a ninth embodiment of the present invention, in which (A) illustrates a state before the slider 321 is moved and (B) illustrates a state after the slider 321 has been moved. In this instance, the description will proceeds with the slider 321 used as the input end and the slider 331 used as the output end. Structures identical with those of the motion transmitting device 301 according to the eighth embodiment of the present invention are shown by like reference numerals and, therefore, the details thereof are not reiterated.

The basic structure of the motion transmitting device 351 according to the ninth embodiment is the same as those of the motion transmitting device 301 according to the eighth embodiment. The difference between the motion transmitting device 351 and the motion transmitting device 301 lies in the shape of the connecting body 355 and that of the connecting body guide. While the connecting body guides employed in the motion transmitting devices of the present invention including the motion transmitting device 301 are all straight in shape and the connecting bodies move linearly, the connecting body guide used in the motion transmitting device 351 is curved and the connecting body moved curvilinearly along the connecting body guide.

The connecting body guide in the motion transmitting device 351 is formed of a groove 353 of a curved shape (curved groove) and the rod shaped member 357 of the connecting body 355 is also curved. A rear surface of the rod shaped member 357 is provided with a curved convex projection (not shown) engageable in the curved groove 353. Although the connecting body guide is curved and the connecting body moves curvilinearly in the motion transmitting device 351, the operation and functional effects of the motion transmitting device 351 are the same as the operation and functional effects delivered by the motion transmitting device 301 according to the eighth embodiment described previously.

Although the holder is of a curved shape and the slider moves curvilinearly in the motion transmitting devices 301 and 351 according to the eighth and ninth embodiments, the basic operation and functional effect do not change from those of the motion transmitting device of a type in which the slider moves linearly as is the case with the motion transmitting device 1 according to the first embodiment. Also, there is no difference in respect of the design in which the amount of displacement and/or the speed of displacement of the output end relative to the input end is decreased, made equal to each other or is increased through the setting of the angle of the center axis line of the connecting body guide about the center axis line of the slider guide and the inclination angle of the slider in the surface that contacts the connecting body, The motion transmitting device of the type in which the holder is of the curved shape and the slider moves curvilinearly can be suitably used as a transmission in which the input end and the output end undergo a circular motion (rotary motion). While the holder have a shape in which two arcuate portions 305 and 309 are connected in front view of the above described motion transmitting devices 301 and 351, the holder may be of a shape in which an arcuate portion and a rectangular portion are connected together. Since the motion transmitting device of the present invention can be used as a transmitting device for not only a linear movement, but also a circular movement and, also, a combination of a linear movement and a round movement, it can be widely used in a broad field.

Figure 28A:
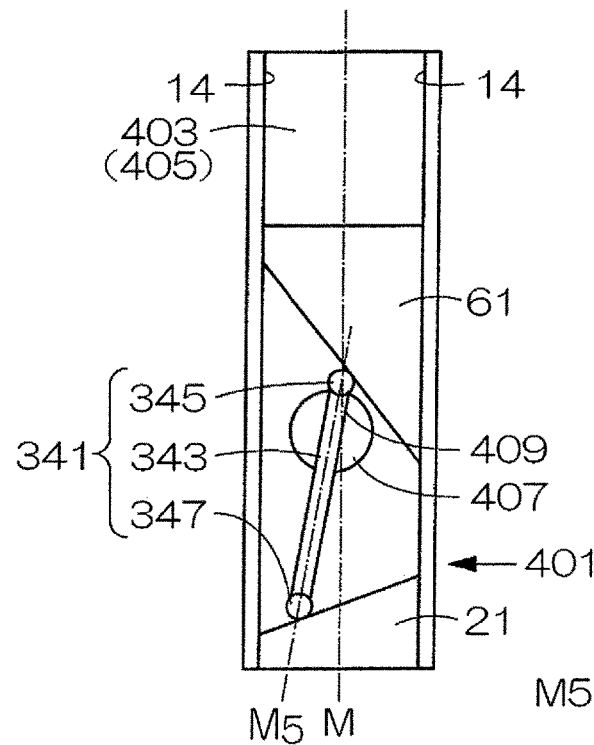
FIGS. 28A, 28B, 28C, and 28D are structural diagrams showing the motion transmitting device 351 according to a tenth embodiment of the present invention.
Figure 28B:
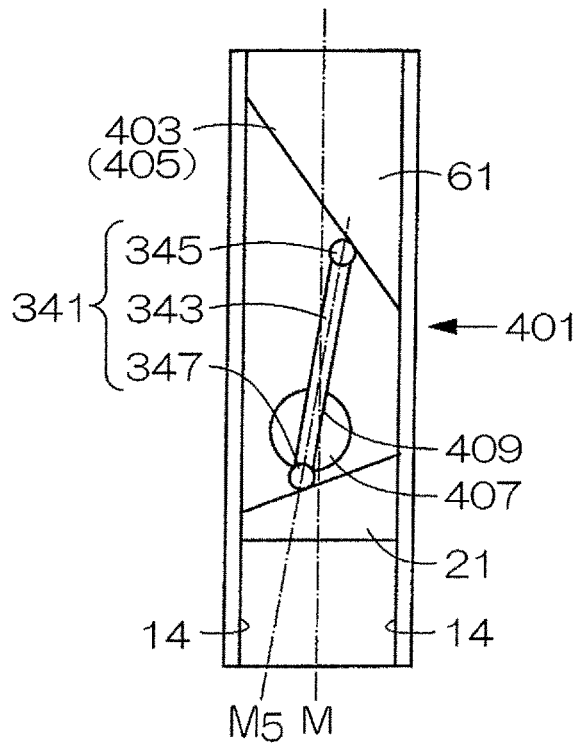
Figure 28C:
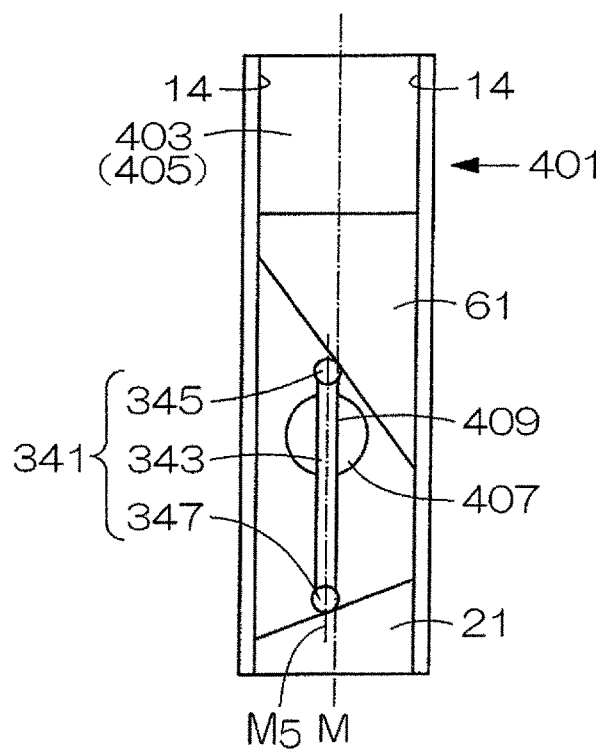
Figure 28D:
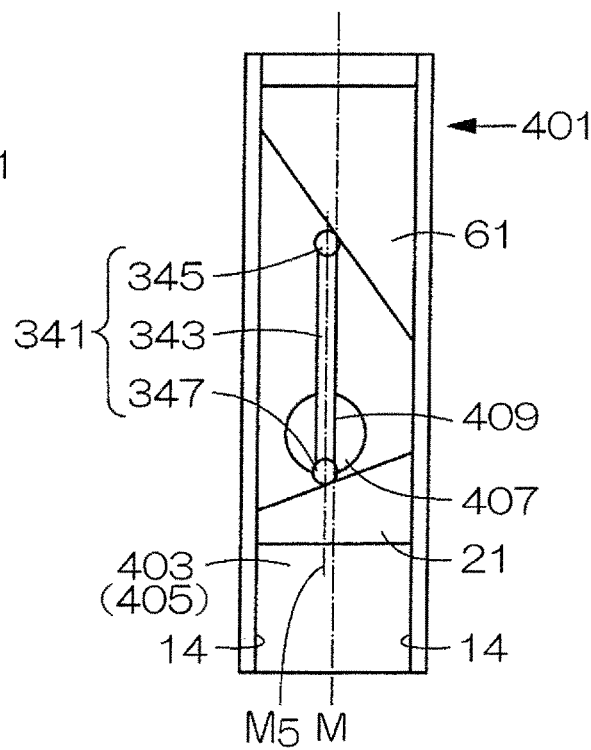

FIGS. 28A, 28B, 28C, and 28D are structural diagrams showing the motion transmitting device 401 according to a tenth embodiment, where FIGS. 28A and 28B illustrate a case in which the use is made with the center axis line $M_5$ of the connecting body 341 inclined relative to the center axis line M of the slider, and FIGS. 28C and 28D illustrate a case in which the use is made with the center axis line $M_5$ of the connecting body 341 rendered parallel to the center axis line M of the slider. Structures identical with those in any one of the motion transmitting devices 1, 2, 3, 4, 5, 6, 7, 8 and 9 according to the previously described first to eighth embodiments are designated by like references and, therefore, the details thereof are not reiterated.

The motion transmitting device 401 includes, in a manner similar to the motion transmitting device 1 according to the first embodiment, a holder 403 of a linear shape, a slider 21, a connecting body 341 and a slider 61. The motion transmitting device 401 greatly differs from the other types of motion transmitting devices in respect that the connecting body 341 is fitted to the holder 40 such that an angle of the connecting body 341 can be changed.

The holder 403 has a rear surface 405 to which a rotatable rotary shaft 407 is fitted, and the rotary shaft 407 has an upper surface provided with an engagement groove 407 for guiding the connecting body 341. The engagement grove 409 is a groove in which the rod shaped member 343 of the connecting body 341 is slidably engaged, and serves as the connecting body guide for guiding the movement of the connecting body. The rotary shaft 407 is provided with a fixture (not shown) and can therefore be used in a state fixed at an arbitrarily chosen position.

The motion transmitting device 401 is capable of adjustably changing the angle of the connecting body 341 relative to the holder, but that the connecting body 341 moves along the connecting body guide is similar to that in the motion transmitting device 1 and others, the operation and functional effects of the motion transmitting device 401 are basically the same as those of the motion transmitting device 1. While the rotary shaft 407 is incorporated in the holder 403 in the motion transmitting device 401 of this embodiment, the rotary shaft and the holder may be separated each other.

The motion transmitting device of the type in which the angle of the connecting body guide relative to the center axis line M of the slider guide is adjustable is utilizable in various ways as compared with the motion transmitting device in which the angle of the connecting body guide relative to the center axis line M of the slider guide is fixed. It is to be noted that the mechanism for adjustably changing the angle of the connecting body guide relative to the center axis line M of the slider guide is not necessarily limited to that employed in the tenth embodiment. Also, the mechanism for adjustably changing the angle of the connecting body guide relative to the center axis line M of the slider guide can be employed in the other embodiment, for example, the motion transmitting device 301 designed according to the eighth embodiment in which the holder is curved.

Although the motion transmitting device according to any of the various embodiments of the present invention has been fully described, the motion transmitting device of the present invention is not necessarily limited thereto and those skilled in the art will readily conceive numerous changes and modifications within the framework of obviousness upon the reading of the specification herein presented of the present invention. Also, the mold assembly and the undercut processing mechanism are not necessarily limited to those employed in the previously described embodiments of the present invention and, in particular, the mold assembly may not be limited to that for use in injection molding. Yet, material of the motion transmitting device may not be necessarily limited to a particular material, but one or two or more of a metallic material, a synthetic resin material, an inorganic material, a composite material can be selected depending on, for example, application.

Where the holder, the slider or the connecting body is required to have a large size, for example, so as to manufacture a large sized motion transmitting device, it each of the holder, the slider or the connecting body may be formed while dividing them into two or more components.

The motion transmitting device of the present invention can be suitably used as a speed reducing machine or a speed increasing machine in various machines such as, for example, robot arms, robots, machine tools, transport machines, and automotive vehicles that require the use of the speed reducing machine or the speed increasing machine.

Although the present invention has been fully described in connection with the preferred embodiments thereof with reference to the accompanying drawings which are used only for the purpose of illustration, those skilled in the art will readily conceive numerous other changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:
1. A motion transmitting device comprising:
at least two sliders movable along a slider guide;
at least one connecting body movable along a connecting body guide; and a holder to accommodate the slider and the connecting body, wherein each of the sliders and the connecting body consists of a single body, the sliders and the connecting body are alternatively disposed in contact with each other, contact surfaces of the slider and the connecting body are slidable with each other, and the slider guide to guide the sliders is provided to form two opposed inner wall surfaces of the holder such that the sliders including a first slider and a second slider are guided by the same two opposed inner wall surfaces while being in slidable contact with the two opposed inner wall surfaces, the connecting body guide to guide the connecting body is provided as a groove or an elongated convex element in another inner wall surface of the holder, and the connecting body has an elongated convex element or a groove that is slidably engaged in the groove or the elongated convex element of the connected body guide, wherein when a slider at one end portion is rendered to be the input end and a slider at the opposite end portion is rendered to be the output end, the amount of displacement and/or the speed of displacement of the output end relative to the input end can be reduced or can be made equal to each other or can be increased through setting of the angle of a center axis line of the slider guide about the center axis line of the connecting body guide and/or the inclination angle of the contact surfaces.

2. The motion transmitting device as claimed in claim 1, wherein the center axis line of the slider guide and/or the center axis line of the connecting body guide has a straight shape, a curved shape or a shape having a combination of a straight line and/or a curved line.

3. The motion transmitting device as claimed in claim 1, wherein at least one of the respective contact surfaces of the slider and the connecting body is a slantwise surface, the slantwise surface intersecting with the center axis line of the slider guide.

4. The motion transmitting device as claimed in claim 1, wherein the slider and/or the connecting body has a block-like shape or a flat plate shape or a rod-like shape.

5. The motion transmitting device as claimed in claim 1, wherein the amount of displacement and/or the speed of displacement of the output end relative to the input end can be amplified or reduced by increasing the number of each of the slider and the connecting body.

6. The motion transmitting device as claimed in claim 1, wherein, by setting disposition of the slider guide, disposition of the connecting body guide, and the angle of the center axis line of the connecting body guide about the center axis line of the slider guide, an angle between the direction of movement of the output end and the direction of movement of the input end can be set to an arbitrary angle within the range of 0 to 180°.

7. The motion transmitting device as claimed in claim 1, wherein the amount of displacement and/or the speed of displacement of the output end relative to the input end differ for each output end when the number of the output end is employed in a number X (X being an integer equal to or greater than 2) and the slider at the other end portion is rendered to be a first output end and each of the other sliders is rendered to be a second to X-th output end.

8. A mold assembly comprising a quick returning device for an ejector plate, the quick returning device being comprised of the motion transmitting device as defined in claim 1.

9. The mold assembly as claimed in claim 8, wherein the motion transmitting device as the quick returning device is fitted to a movable mold;

an ejector pin to eject the input end of the motion transmitting device is provided in the ejector plate, and a return pin to eject the output end of the motion transmitting device is provided in a fixed mold, where the motion transmitting device has the amount of displacement of the output end that is greater than the amount of displacement of the input end.

10. The mold assembly as claimed in claim 8, wherein a recessed portion to accommodate a part of the motion transmitting device is provided in the fixed mold, the motion transmitting device is disposed such that a partial portion of the motion transmitting device protrudes from a parting surface of the movable mold, and the portion of the motion transmitting device protruding from the parting surface is accommodated within the recessed portion during a mold clamping.

11. Machines having a speed reducing machine or a speed increasing machine incorporated therein, the machines being any one of a robot arm, a robot, a machine tool, a transport machine and an automotive vehicle, wherein the motion transmitting device as defined in claim 1 is used as the speed reducing machine or the speed increasing machine.

* * * * *